US011531652B2

(12) United States Patent
Fender et al.

(10) Patent No.: US 11,531,652 B2
(45) Date of Patent: Dec. 20, 2022

(54) DATABASE MODULARIZATION OF PLUGGABLE GUEST LANGUAGES

(71) Applicant: Oracle International Corporation, Redwood Shores, CA (US)

(72) Inventors: Pit Fender, Union City, CA (US); Harshad Kasture, Sunnyvale, CA (US); Alexander Ulrich, Freiburg (DE); Benjamin Schlegel, Merced, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 16/556,847

(22) Filed: Aug. 30, 2019

(65) Prior Publication Data

US 2021/0064588 A1    Mar. 4, 2021

(51) Int. Cl.
   *G06F 16/21*    (2019.01)
(52) U.S. Cl.
   CPC .................................. *G06F 16/212* (2019.01)
(58) Field of Classification Search
   CPC ..... G06F 16/212; G06F 16/2443; G06F 9/541
   See application file for complete search history.

(56) References Cited

U.S. PATENT DOCUMENTS

| | | | | |
|---|---|---|---|---|
| 4,894,771 A | * | 1/1990 | Kunii | ........................ G06F 8/41 |
| 4,930,071 A | | 5/1990 | Tou et al. | |
| 5,761,493 A | * | 6/1998 | Blakeley | ................. G06F 8/315 |
| 5,826,077 A | * | 10/1998 | Blakeley | ............. G06F 16/2438 |
| 5,893,104 A | * | 4/1999 | Srinivasan | .......... G06F 16/2228 |
| 5,987,463 A | * | 11/1999 | Draaijer | ............ G06F 16/24553 |
| 5,995,974 A | * | 11/1999 | Anton | ................. G06F 16/2438 |
| | | | | 713/2 |

(Continued)

OTHER PUBLICATIONS

Yu et al., "Query Compilation in PostgreSQL by Specialization of the DBMS Source Code", Programming and Computer Software Consultants Bureau, vol. 43, No. 6, dated Dec. 16, 2017, pp. 353-365.

(Continued)

*Primary Examiner* — Hares Jami
*Assistant Examiner* — Zuheir A Mheir
(74) *Attorney, Agent, or Firm* — Hickman Becker Bingham Ledesma LLP; Brian N. Miller

(57) ABSTRACT

Herein are techniques that extend a software system to embed new guest programming languages (GPLs) that interoperate in a transparent, modular, and configurable way. In embodiments, a computer inserts an implementation of a GPL into a deployment of the system. A command registers the GPL, define subroutines for the GPL, generates a guest virtual environment, and adds a binding of a dependency to a guest module. In an embodiment, a native programing language invokes a guest programing language to cause importing intra- or inter-language dependencies. An embodiment defines a guest object that is implemented in a first GPL and accessed from a second GPL. In an embodiment, dependencies are retrieved from a virtual file system having several alternative implementation mechanisms that include: an archive file or an actual file system, and a memory buffer or a column of a database table.

20 Claims, 19 Drawing Sheets

(56) References Cited

U.S. PATENT DOCUMENTS

| | | | | |
|---|---|---|---|---|
| 6,115,704 | A * | 9/2000 | Olson | G06F 16/284 |
| 6,236,997 | B1 * | 5/2001 | Bodamer | G06F 16/258 |
| 6,360,228 | B1 * | 3/2002 | Sundara | G06F 16/2365 |
| | | | | 707/999.102 |
| 6,725,213 | B1 * | 4/2004 | Chiocca | G06F 16/2438 |
| 7,206,805 | B1 * | 4/2007 | McLaughlin, Jr. | G06F 9/466 |
| | | | | 707/999.01 |
| 7,308,460 | B2 * | 12/2007 | Venkatesh | G06F 7/00 |
| 9,135,293 | B1 | 9/2015 | Kienzle et al. | |
| 10,061,872 | B1 | 8/2018 | Raman et al. | |
| 10,120,926 | B1 | 11/2018 | Gupte | |
| 10,983,815 | B1 * | 4/2021 | Barry | G06F 8/35 |
| 2003/0195893 | A1 * | 10/2003 | Kasao | G06F 16/24532 |
| 2005/0119988 | A1 * | 6/2005 | Buch | G06F 16/256 |
| 2007/0038662 | A1 * | 2/2007 | Bendel | G06F 16/21 |
| 2007/0220020 | A1 * | 9/2007 | Goto | G06F 16/2452 |
| 2008/0270455 | A1 * | 10/2008 | Bendel | G06F 16/21 |
| 2008/0288822 | A1 * | 11/2008 | Wu | G06F 21/577 |
| | | | | 714/E11.02 |
| 2013/0054649 | A1 | 2/2013 | Potapov et al. | |
| 2013/0263116 | A1 | 10/2013 | Haupt et al. | |
| 2014/0282549 | A1 * | 9/2014 | Young | G06F 9/541 |
| | | | | 718/1 |
| 2016/0328488 | A1 * | 11/2016 | Lytle | G06F 16/252 |
| 2017/0161325 | A1 | 6/2017 | Rastogi et al. | |
| 2018/0136959 | A1 * | 5/2018 | Vyas | G06F 9/5055 |
| 2018/0189328 | A1 * | 7/2018 | Frazier | G06F 16/25 |
| 2018/0336347 | A1 * | 11/2018 | Bendel | G06F 21/6218 |
| 2019/0065552 | A1 | 2/2019 | Brantner et al. | |
| 2020/0210157 | A1 * | 7/2020 | Munaganuru | G06F 16/2282 |
| 2021/0064588 | A1 | 3/2021 | Fender | |
| 2021/0064619 | A1 | 3/2021 | Fender et al. | |

OTHER PUBLICATIONS

Sipek M. et al., "Exploring Aspects of Polyglot High-Performance Virtual Machine GraalVM", dated 2019 42nd International Convention on Information Technology, dated May 20, 2019, pp. 1671-1676.

Wurthinger et al., "Practical Partial Evaluation for High-Performance Dynamic Language Runtimes", PLDI'17, Jun. 18-23, 2017, Barcelona, Spain, 15 pages. Wimmer, Christian, Oracle, "One VM to Rule Them All", VM Research Group, Oracle Labs, dated 2016, 130 pages.

Wanderman-Milne, Skye, "Building a Modern Database Using LLVM", dated Nov. 6, 2013, 27 pages.

Steuwer et al., "Lift: A Functional Data-Parallel IR for High-Performance GPU Code Generation", University of Edinburgh, United Kingdom, IEEE, dated 2017, 13 pages.

Marr, Stefan, "Tracing vs. Partial Evaluation", OOPSLA'15 Oct. 25-30, 2015, Pittsburgh, PA, USA, 20 pages.

Hagedon et al., "High Performance Stencil Code Generation with Lift", CGO'18, Feb. 24-28, 2018, Vienna, Austria, 14 pages.

Github, "Writing a Language in Truffle. Part 1: A Simple, Slow Interpreter", dated Oct. 13, 2014, 17 pages.

Franklin, Christopher, "A Guide to Java 9 Modularity", https://www.baeldung.com/java-9-modularity, dated May 12, 2019, 14 pages.

Fehrenbach, Stefan, "Just-in-time Compilation for Generalized Parsing", dated Sep. 1, 2014, 41 pages.

Fender, U.S. Appl. No. 16/556,760, filed Aug. 30, 2019, Non-Final Rejection, dated Oct. 1, 2021.

Fender, U.S. Appl. No. 16/555,974, filed Aug. 29, 2019, Non-Final Rejection, dated Oct. 26, 2021.

\* cited by examiner

DATABASE MODULARIZATION OF PLUGGABLE GUEST LANGUAGES

FIELD OF THE INVENTION

The present invention relates to polyglot programing of a software system such as a database management system (DBMS). Herein are techniques that extend the software system to embed new guest programing languages that interoperate in a transparent, modular, and configurable way.

BACKGROUND

Modern programming languages like JavaScript and Python benefit from a rich and vast ecosystem of publicly available libraries and add-on components. However, database systems have little or no support for multiple programing languages. For example with JavaScript and Python, package management and package imports have discrepant approaches that may be difficult or impossible to reconcile.

In the JavaScript ecosystem, use of codebase bundling tools is common. Those tools resolve package dependencies imposed by a require statement by in-lining of the source code of the dependencies. The result of those bundling techniques is a monolithic source file containing all necessary source logic. For other language ecosystems, those bundling tools are not available.

Package management often relies on versioning. Package managers like NPM or Pip are capable of handling package versions. NPM deals with versioning by organizing different package versions through different directories and appending a version number to the package name. In Python a different approach is used. A tool such as Pip can be used to construct and manage a deployment, such that only one package version is installed. However, those approaches do not readily transfer to a relational database. In general database systems do not support different object versions.

Different projects might run with different object versions and different language settings or options, which can cause library interference or malfunction. Database systems possess different characteristics not typically found in programing language ecosystems, such as:

Schemata: Database objects are always created in a specific schema. If an object is created without specifically specifying a schema, it is created in the schema of the current user account. A database object is fully qualified when both object name and schema are specified. If an object is not fully qualified in a SQL query, the query optimizer will need to resolve it. Thus, the same query without a fully qualified object reference might lead to different results if executed by different user accounts, such as when there exists different versions of an object that share a same name but are located in different schemas. That may raise technical challenges such as where source code should be deployed and, once deployed, how source code can be shared.

Privileges: Database systems implement a rich privilege model. The privileges model is much more fine grained in comparison to the typical file system privilege model. There are read, create, execute, drop and alter privileges on a system-wide, system schema, user schema, and individual database object level. In addition to the question of where to store source code, there is a question of if and how to protect access to source code, and which privileges may the source code exercise.

DETAILED DESCRIPTION

Figure 1:
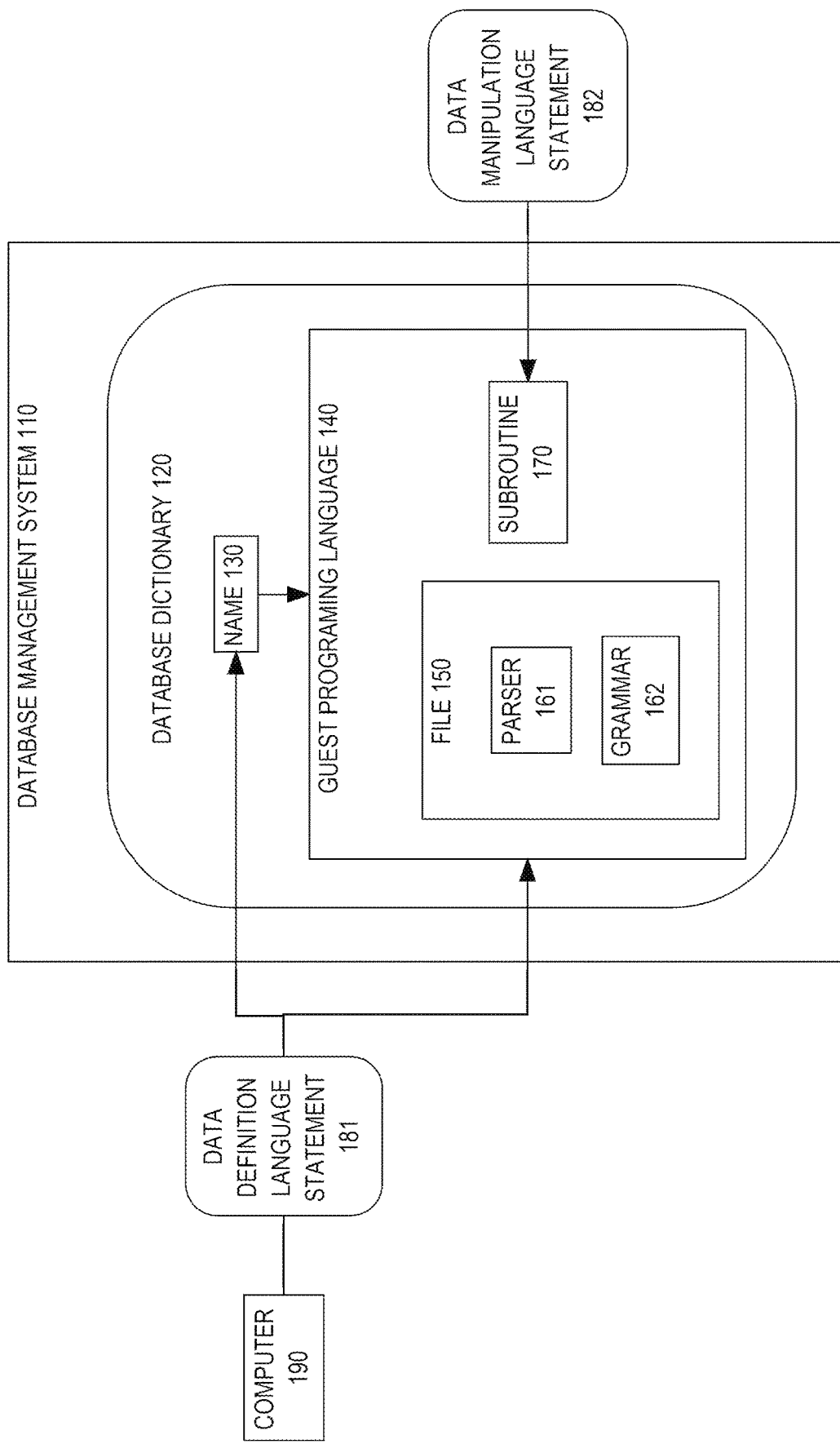
FIG. 1 is a block diagram that depicts an example computer system for processing a data definition language (DDL) statement that uploads an implementation of a new guest programing language into a database management system (DBMS)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein facilitate accessing, such as from a data manipulation language (DML), (e.g. custom) guest objects such as stored procedures and user-defined functions that are written in modern programming languages like JavaScript and Python. In an embodiment, all programming language source code is executed by the same high-performance engine, called GraalVM. For example, guest programing languages may have implementations that are based on the Truffle Framework. GraalVM executes those guest programing languages in the address space of a database management system (DBMS) for maximum efficiency and performance, but runs the source code sandboxed so that no unauthorized memory access or system calls are possible.

Deploying guest source code to a database happens through user defined packages called guest modules. Each guest module is associated with a single guest programing language, and the guest module's contents and structure are specific to that guest programing language. A guest object such as logic in a guest module can be accessed in various ways, such as:

Subroutines defined by a guest module may be invoked from DML such as PL/SQL through call specifications.

A guest module may be imported by another guest module of a same guest programing language using language-specific import mechanisms.

A guest module may be imported by another guest module of a same or different guest programing language using application programing interfaces (APIs) that are implemented by a multilingual engine (MLE) of a DBMS, which facilitates subroutines in the imported module to be called directly from the importing module.

Herein are example MLE architectures for executing guest subroutines based on guest modules. An MLE can execute stored procedures or user defined functions (UDFs) in programing languages other than PL/SQL, such as dynamic languages such as JavaScript, Ruby, Python and/or R. An MLE is in not limited to the execution of dynamic languages, as it also can run more or less static languages such as Java.

An MLE may contain several layers. A top layer may implement guest programing language(s). Each guest programing language implementation that runs on the MLE may be based on Oracle Truffle. Truffle is a language implementation framework to build high-performance abstract syntax tree (AST) interpreters that run on a virtual machine (VM) such as a Java VM (JVM). Each node in a Truffle AST has an execute method in which it executes its children and returns its own result, such as for partial evaluation. The main advantage of a Truffle AST interpreter is that it is self optimizing by using profiling information and partial evaluation.

Those profiles are collected during the execution of a guest language program. Significant optimizations may include type specializations, rewriting indirect function calls, polymorphic inline caches, branch eliminations, and speculative function in-lining, such as discussed herein. If speculative assumptions turn out to be wrong, the specialized AST can be reverted to a more general version that provides functionality for more general cases.

When an execution count of a Truffle node reaches a predefined threshold, Truffle triggers partial evaluation by a call to Graal. Graal is a dynamic compiler that composes another MLE layer. Graal may be an MLE's just-in-time compiler (JIT) that can perform partial evaluation of parts of the AST, which may entail Futamura projection as discussed herein. Graal's output may be highly optimized machine code with deoptimization points. Those points may be implemented as check points where deoptimization has to be triggered in case speculative assumptions do not hold anymore. Deoptimization means that control is transferred back from the compiled code to the AST interpreter, where specialized AST nodes are then reverted to a more generic version.

Yet another layer of the MLE is the VM. For example, the MLE may use Oracle's Substrate VM (SVM) which is an embeddable VM that provides services such as code caching or garbage collection. The MLE may use a same VM for all language implementations that the MLE contains.

One goal may be to provide future extensibility without a need of code changes. The MLE may provide a pluggable after-market language approach, such as for general purpose languages, legacy languages, and/or domain specific languages (DSLs). For example, a customer that has implemented its own guest programming language on top of the Truffle framework can plug that language into the MLE according to an API provided by the MLE, which can be done without code changes to neither MLE nor the DBMS. The MLE provides a uniform way of deploying and managing codebase units such as packages and modules.

A guest module is a unit of (e.g. source) logic deployed into a database. Each guest module is implemented with a single respective guest programing language. The contents and structure of the guest module may be specific to that guest programing language. Herein is a new data definition language (DDL) statement to deploy source logic as guest module(s) to the database.

Herein are MLE extensions such as guest modules and guest virtual environments that let all guest programing languages share a same infrastructure for activities such as storage and lookup. Additionally, database privileges can be used to control access to such components. The MLE may also contain virtual file systems with which source logic such as guest scripts can be distributed over several files in a nested directory structure that may be bundled up and stored in a container format such as a zip file. Such a source bundle can be supplied as a binary large object (BLOB) or file and provided to the MLE such as by a DDL statement.

The MLE provides an architecture for intra- and inter-language module imports. A guest virtual environment may provide mappings between module names and schema objects that hold module contents. That mechanism may hide differences in module/package import specifications for different guest programing languages. An ability to import other guest modules provides several benefits:

The ability of separating source logic into several independent modules.

Re-usability of source logic. By breaking up code into modules, certain modules can be reused. Libraries can be provided as separate guest modules and imported from other guest modules that belong to different projects. Thus, each guest module may have a more or less independent maintenance schedule, such as according to a software development lifecycle (SDLC).

Ease of patching. Without inter-module-imports, monolithic (i.e. large) guest modules would need to be redeployed although only a small piece of the underlying source code needs to be changed. By partitioning code into small guest modules, only a subset of the modules need to be redeployed. An MLE may also provide built-in modules, such as a structured query language (SQL) driver.

Import mechanism(s) for guest programming languages may have logic for consulting the environment when loading modules. For JavaScript, for example, modules are imported through a require statement, which the MLE may intercept and specially handle, including resolving dependency module names via the environment. Similar techniques are extended to other guest programing languages such as Python.

The language agnostic mechanisms for guest modules and guest virtual environments present a unified API for source logic management inside the database. That leaves much freedom for tooled deployment that can be adapted to the specific needs of the programming language ecosystem. For example, version resolution can be more or less left to client-side tools, and the resolved versions mapped using guest virtual environments inside the database.

In an embodiment, a computer inserts an implementation of a guest programming language into a deployment of a DBMS. A DDL statement is executed to register the guest programing language in the DBMS. The guest programing language is invoked in the DBMS by executing a DML statement.

In an embodiment, a single DDL statement is executed to define a plurality of subroutines for the guest programing language in the DBMS. A second DDL statement registers a particular subroutine as a user defined function (UDF) or a stored procedure in the DBMS, which a DML statement can invoke.

In an embodiment, a DML statement invokes a guest programing language to cause: executing an import request that is native to the guest programing language to access a dependency, and resolving the dependency based on: the import request that is native to the guest programing language, and a mapping defined in the DBMS. As discussed later herein, defining an object in a DBMS may entail storing data and/or metadata of the object into a database schema and/or database dictionary in the DBMS or in a database of the DBMS, where the metadata defines properties, characteristics, or configuration of an object.

An embodiment defines, in the DBMS, a guest object that is implemented in a first guest programming language. The DBMS contains: a native data manipulation language (DML), the first guest programing language, and a second guest programing language. The second guest programing language is invoked from the native DML, causing execution of an access request from the second guest programing language to access the guest object that is implemented in the first guest programing language.

In an embodiment, a first DDL statement generates a guest virtual environment in the DBMS. A second DDL statement adds, to the guest virtual environment, a binding of a dependency to a guest module. A guest programing language issues a request to access the dependency. Based on the request and the binding, the guest module is accessed.

In an embodiment, a DML statement invokes a guest programming language to cause:
 executing a request that is native to the guest programing language to access a dependency, and
 retrieving the dependency from a virtual file system having a plurality of alternative implementation mechanisms that include: a first implementation mechanism based on an archive file or an actual file system, and a second implementation mechanism based on a memory buffer or a column of a database table.

1.0 Example Computer System

FIG. 1 is a block diagram that depicts an example computer system 100, in an embodiment. Data definition language (DDL) statement 181 uploads an implementation of a new guest programing language into database management system (DBMS) 110. Computer system 100 contains one or more computers, such as 190, each of which may be a rack server such as a blade, a personal computer, a mainframe, a virtual computer, or other computing device. When computer system 100 contains multiple computers, the computers are interconnected by a communication network.

Computer system 100 contains DBMS 110 that may be hosted by computer 190, a different computer (not shown) or, for distributed and/or multi-instance databases, hosted by multiple computers. DBMS 110 supports polyglot (i.e. multilingual) programmable databases, such as with a multilingual engine (MLE) software layer that can embed, for multiple guest programing languages, respective interpreters and/or virtual machines, such as a Java virtual machine (JVM), a JavaScript interpreter, individually, or as a combination such as in Oracle's Graal MLE. For example, an MLE may interpret text scripts, generate bytecode, interpret bytecode, and/or compile bytecode into native machine instructions such as by just in time (JIT) compilation. For example, an MLE may contain a JVM that executes bytecode generated from source logic of multiple guest programing languages.

DBMS 110 is extensible by adding guest programing languages, such as 140, that are not native to DBMS 110. Guest programing language 140 may be added after market for use in DBMS 110, such as a general purpose programing (e.g. scripting) language or a domain specific language (DSL). For example, guest programing language 140 need not be originally provided with DBMS 110 and need not be available from the original equipment manufacturer (OEM) (e.g. independent software vendor, ISV) of DBMS 110.

Addition of guest programing language 140 is performed by data definition language (DDL) statement 181. For example, DDL may be a proprietary language or an administrative dialect of a database language such as structured query language (SQL) that is native to DBMS 110. DDL typically writes metadata into DBMS 110, such as within a database schema and/or a database dictionary in a database in DBMS 110, as discussed later herein. A native database language such as SQL is originally built into DBMS 110 and need not be separately added to DBMS 110 such as is needed for guest programing language 140. In an embodiment, DDL statement 181 may be "CREATE MLE LANGUAGE MYLANGUAGE;", where MYLANGUAGE is a name that identifies guest programing language 140.

DBMS 110 may receive DDL statement 181 from a client, such as an ad hoc database tool or other software application, such as with text through an open database connectivity (ODBC) connection, which may entail inter-process communication or networking, such as when computer 190 is a remote client. In another scenario, DDL statement 181 is internally generated by DBMS 110. Execution of DDL statement 181 more or less completely adds guest programing language 140 into DBMS 110.

For example, guest programing language 140 may be based on implementation files, such as 150, such as class files and/or resource files, which may be loose files and/or bundled into archive files such as a Java archive (JAR) file. In embodiments, implementation file 150 may contain: a) grammar 162 that formally defines syntax of guest programing language 140, such as for tokenizing and/or parsing, and/or b) parser 161, also for parsing, such as based on grammar 162, such as for constructing a parse tree (not shown). In an embodiment, different guest programing languages may each have their own respective grammar, such as 162, but share same parser 161. Other (e.g. shareable) language components may include a semantic analyzer, an optimizer, a (e.g. intermediate or machine) code generator, and/or a linker or loader that locates cross referenced resources. For example, Graal provides many such components that may be shared and/or customized, such as cooperating compiler/interpreter layers such as Truffle as a frontend and Substrate as a backend.

In an embodiment, implementation files of guest programing language 140 are (e.g. manually) staged (i.e. placed) into a codebase or other filesystem of DBMS 110, such as before DDL statement 181 is submitted, such as by a database administrator (DBA), a system administrator, or other user with access to a command shell and/or filesystem of a computer that hosts DBMS 110. In another embodiment, execution of DDL statement 181 automatically causes the implementation files to be staged into DBMS 110, which may entail copying implementation files within a same filesystem, copying implementation files between multiple filesystems, (e.g. symbolic) linking of files, or uploading implementation files from a remote client. For example, a remote client may use a Java ODBC (JDBC) driver that includes hypertext transport protocol (HTTP) or Java remote method protocol (JRMP) for uploading file(s) from the remote client to a subsystem of DBMS 110 such as common gateway interface (CGI) such as by a HTTP post. For example, DDL statement 181 may include a uniform resource locator (URL) of a JAR file that contains an embeddable implementation (e.g. interpreter) of guest programing language 140.

Execution of DDL statement 181 causes guest programing language 140 to be (e.g. publicly) registered within database dictionary 120, or other metadata repository, that is part of DBMS 110. Database dictionary 120 comprises metadata that defines database objects of DBMS 110 and other configuration aspects. Database dictionary 120 may comprise multiple data structures that store database metadata. Database dictionary 120 may, for example, comprise multiple files and tables. Portions of the data structures may be cached in main memory of a database server of DBMS 110.

A subset of the metadata that defines a particular database object of DBMS 110 or a particular aspect of the configuration of DBMS 110 is referred to herein as a metadata definition or simply definition. A definition may also include multiple data structures and tables. A definition of a particular database object may include definitions of constituent data objects. For example, a definition of a table may include multiple definitions of the table's columns.

Metadata in database dictionary 120 that defines a procedure may specify a name of the procedure, the procedure's arguments, the return data type, and the data types of the arguments, and may include source code and a compiled version thereof. A database object may be defined by database dictionary 120, but the metadata in database dictionary 120 itself may only partly specify the properties of the database object. Other properties may be defined by data structures that may not be considered part of database dictionary 120. For example as discussed later herein, a user defined function (UDF) implemented in a Java class may be defined in part by database dictionary 120 by specifying the name of the user's Java function and by specifying a reference to a file containing the source code of the Java class (i.e. ava file) and the compiled version (i.e. bytecode) of the class (i.e. .class file).

A binding may be a definition that is directly associated with another object, such as a name, in database dictionary 120. For example, database dictionary 120 may contain key-value pairs, such as in a lookup table or hash table. For example, database dictionary 120 may be an implementation of a database namespace, and/or may contain database objects such as a relational schema. A DDL statement may be used to write a definition and/or a binding into database dictionary 120 or a database schema.

An entry in data dictionary 120 may be accessed by a retrieval key such as name 130. Objects (i.e. values) may be stored directly in content storage of database dictionary 120, or indirectly by reference such as a pointer that addresses a memory location that stores the object outside of database dictionary 120. Thus, components shown inside of database dictionary 120, such as guest programing language 140, may actually reside elsewhere in the memory of DBMS 110 and are instead referenced by respective entries (e.g. key-value pair) of database dictionary 120.

Name 130 may be the same language name, such as MYLANGUAGE, that occurs in DDL statement 181 as explained above. For example, DDL statement 181 may immediately cause guest programing language 140 to be generated in memory of DBMS 110, such as by executing initialization logic from staged implementation files of guest programing language 140. In an embodiment, memory initialization for guest programing language 140 may lazily occur, such as upon later demand, such as when name 130 is later used to access guest programing language 140. Regardless of whether initialization of guest programing language 140 is lazy or eager, name 130 is immediately bound by DDL statement 181 to guest programing language 140 in database dictionary 120.

Later, DBMS 110 may receive or generate data manipulation language (DML) statement 182, such as a database query, that causes logic to execute within guest programing language 140. For example, DML may be a proprietary language or a data access dialect of a database language such as SQL that is native to DBMS 110. DML is designed to create, read (e.g. query), update, and delete (CRUD) ordinary data in a database of DBMS 110. Whereas, DDL is designed for writing (i.e. create, update, and delete), but for metadata (i.e. definitions) instead of database data. Query by example (QBE) (e,g, JavaScript object notation, JSON) and path expressions (e.g. XPath) may be examples, in whole or in part, of DML.

DML statement 182 may contain textual references (e.g. names) of database objects that are defined in DBMS 110. DBMS 110 may use database dictionary 120 or a database schema to resolve those names to actual database objects, such as a user defined function (UDF). Some database objects may be generated (i.e. defined) solely by execution of SQL statements. Other database objects are instead generated in guest programing language 140. Thus, some database objects also are guest objects.

As described later herein, and in some cases facilitated by a binding such as in a database dictionary, a guest object may be bound to a database object that is not a guest object. For example, DML statement 182 may expressly invoke a stored procedure or a UDF that is a database object that, although not a guest object, is actually implemented as (i.e. bound to) a guest object such as subroutine 170 in guest programing language 140.

For example, subroutine 170 may be an individual Python function, or an entire imperative script of Python, that is exposed as a stored procedure or UDF that DML statement 182 expressly invokes. In an embodiment not shown, database dictionary 120 contains a declaration or definition of that stored procedure or UDF for inspection such as by a query planner of DBMS 110. Mechanics and techniques for operating a language boundary between native DML statement 182 and guest subroutine 170 are discussed later herein.

As discussed above, guest programing language 140 may be implemented in DBMS 110 with components and/or layers, such as Truffle and Substrate, that are dedicated to particular (e.g. compilation) activities such as optimization. Thus, execution of guest subroutine 170 may be accelerated according to various statistical and/or incremental techniques such as: a) Futamura projection, b) just in time compilation (JIT) of only a portion of subroutine 170, and/or c) generating speculative code that has one or more deoptimization points. Speculative logic is statically or dynamically (e.g. profiling) optimized according to inferred (e.g. observed) datatypes of polymorphic variables.

Deoptimization points demark fragments of generated code that has become invalid due to unexpected datatypes, and that should be immediately replaced with less optimized (e.g. earlier) code. Partial JIT may transform a hot (i.e. repetition exceeding a threshold) fragment of subroutine 170, such as a tight loop, such as by loop unrolling. As discussed later herein, Futamura projections are architectural transformations that may include partial evaluation (i.e. logic specialization), memoization, (i.e. function result caching that usually has a compound key that contains a name or pointer of a function and its actual argument values) and/or strength reduction (i.e. semantic refactoring; e.g. a) a hotspot with a loop invariant and/or an induction variable, or b) arithmetic operation substitution).

Substrate may apply a Futamura projection such as ahead of time (AOT) code generation. For example, DDL statement 181 may eagerly (e.g. immediately) cause AOT code generation in the background (e.g. low priority) for some or all of subroutine 170, even though subroutine 170 might not be first invoked (e.g. by DML statement 182) until much later. Thus, an engineer expecting clumsy interpretation of a script may instead attain machine language for direct execution that is highly optimized for a particular version of a particular central processing unit (CPU) model, such as in a production environment that was unknown or unavailable during application development.

2.0 Example Language Deployment Process

Figure 2:
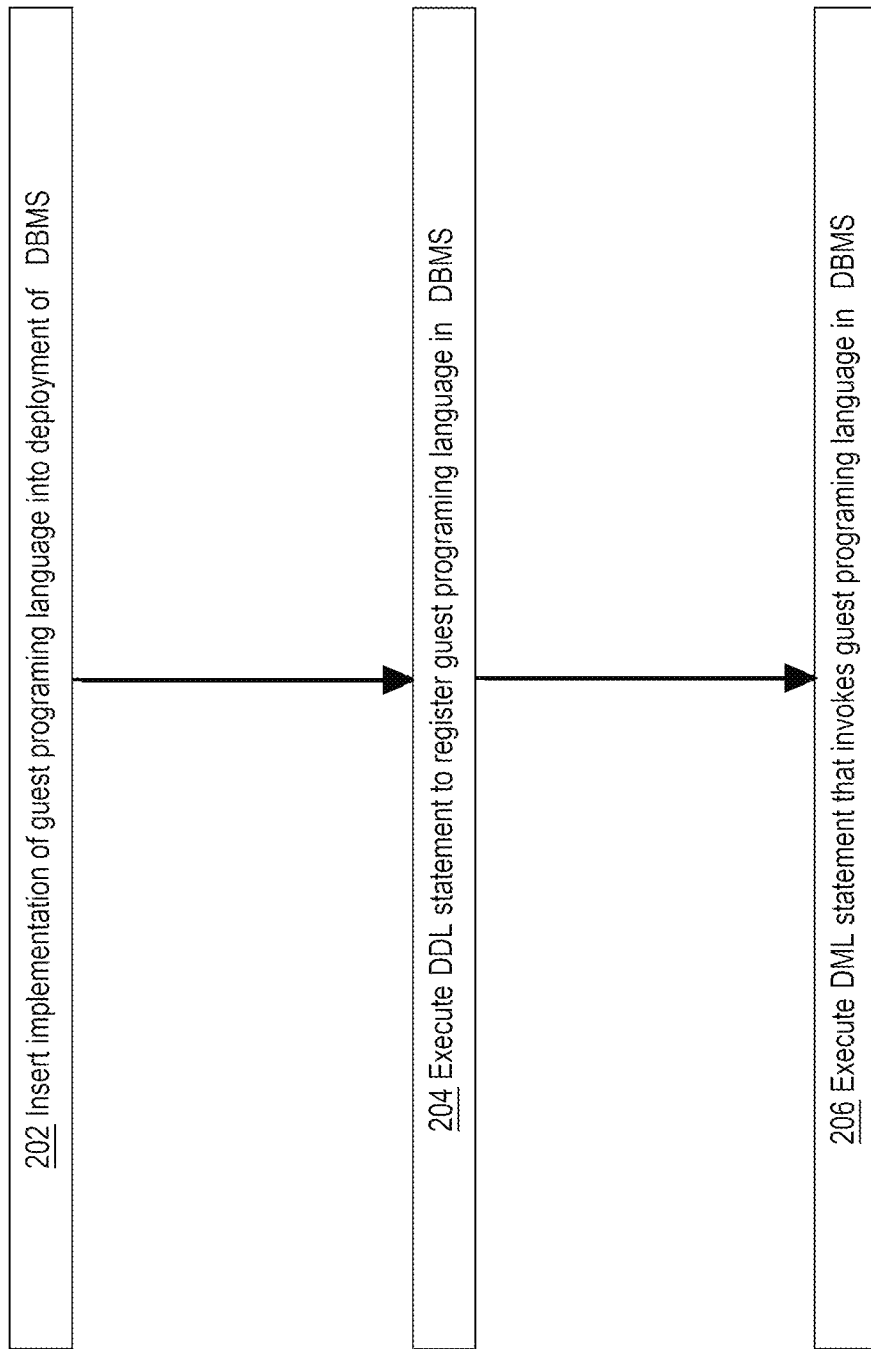
FIG. 2 is a flow diagram that depicts an example computer process for executing a DDL statement that uploads an implementation of a new guest programming language into a DBMS.

FIG. 2 is a flow diagram that depicts computer system 100 adding new guest programing language 140 into DBMS 110, in an embodiment. FIG. 2 is discussed with reference to FIG. 1.

Depending on the embodiment, steps 202 and 204 may or may not be combined into a single step. In an embodiment, step 202 may be fully, partially, or not at all implemented by DBMS 110 itself. For example, automation needed to perform step 202 may be implemented elsewhere in computer system 100 and may or may not entail manual labor by a system administrator such as a database administrator (DBA).

Step 202 inserts an implementation of guest programing language 140 into a deployment of DBMS 110. For example, DBMS 110 may have a library path, such as an ordered list of filesystem folder paths, that identifies from where DBMS 110 may find (e.g. after market) extensions to its own codebase, such as a codebase of an implementation of guest programing language 140, which may consist of loose or packed files. Automation or an administrator may stage (i.e. copy into place) the codebase file(s) of guest programing language 140 into the library path of DBMS 110. Depending on DBMS 110's implementation, DBMS 110 may or may not need to be restarted to cause DBMS 110 to become ready to load (e.g. dynamically link) the staged codebase of guest programing language 140.

In step 204, DDL statement 181 is executed to register guest programing language 140 in DBMS 110. For example a database client script or ad hoc client may send (e.g. via ODBC) DDL statement 181 from computer 190 to DBMS 110 that may be on a same or different computer(s). Depending on the embodiment, DDL statement 181 may identify any of: a) name 130 of guest programing language 140, such as for use as a naming key to be inserted into database dictionary 120, and/or b) a codebase path and/or class name of an implementation of guest programing language 140.

Execution of DDL statement 181 causes the multi-lingual engine (MLE) of DBMS 110 to instantiate memory data structures that implement guest programing language 140, which may entail class loading or script execution from the staged codebase of guest programing language 140. In an embodiment, DDL statement 181 may also perform step 202 (i.e. combined with step 204).

For example, DDL statement 181 may include a uniform resource locator (URL) or cross mounted path that locates an implementation of guest programing language 140 that need not yet be staged into DBMS 110. Staging may automatically occur based on a push or pull mechanism as follows, which is suitable for deployment to a public cloud that might deny clients direct access to the filesystem of DBMS 110 such as by a remote shell.

In a pull embodiment, DBMS 110 may process the URL to automatically upload and stage the codebase of guest programing language 140 into the deployment of DBMS 110. That embodiment may require a web server or file server running on the host that the URL points to, which may or may not be computer 190.

In a push embodiment, the client (e.g. ODBC) driver has additional logic that uploads codebase files into DBMS 110. Depending on the embodiment, that upload may be multiplexed over the driver's database connection, and DBMS 110 may save the upload into its own codebase, or the driver may use a separate network connection such as for a common gateway interface (CGI) POST to a web server that can save the upload into the codebase of DBMS 110. For example, DBMS 110 may include a web server (not shown).

After step 204, guest programing language 140 is ready to use in DBMS 110. Step 206 executes DML statement 182 that invokes guest programing language 140 in DBMS 110. For example as presented later herein, a DBA may export a subroutine of guest programing language 140 as a UDF that DML statement 182 can invoke. Thus, guest programing language 140 is indirectly available to DML queries without exposing clients to guest programing language 140. For example, a legacy query may invoke a complicated UDF that was originally implemented as suboptimal DML and eventually transparently retrofitted (e.g. reimplemented and accelerated) by guest programming language 140.

3.0 Example Language Administration

Figure 3:
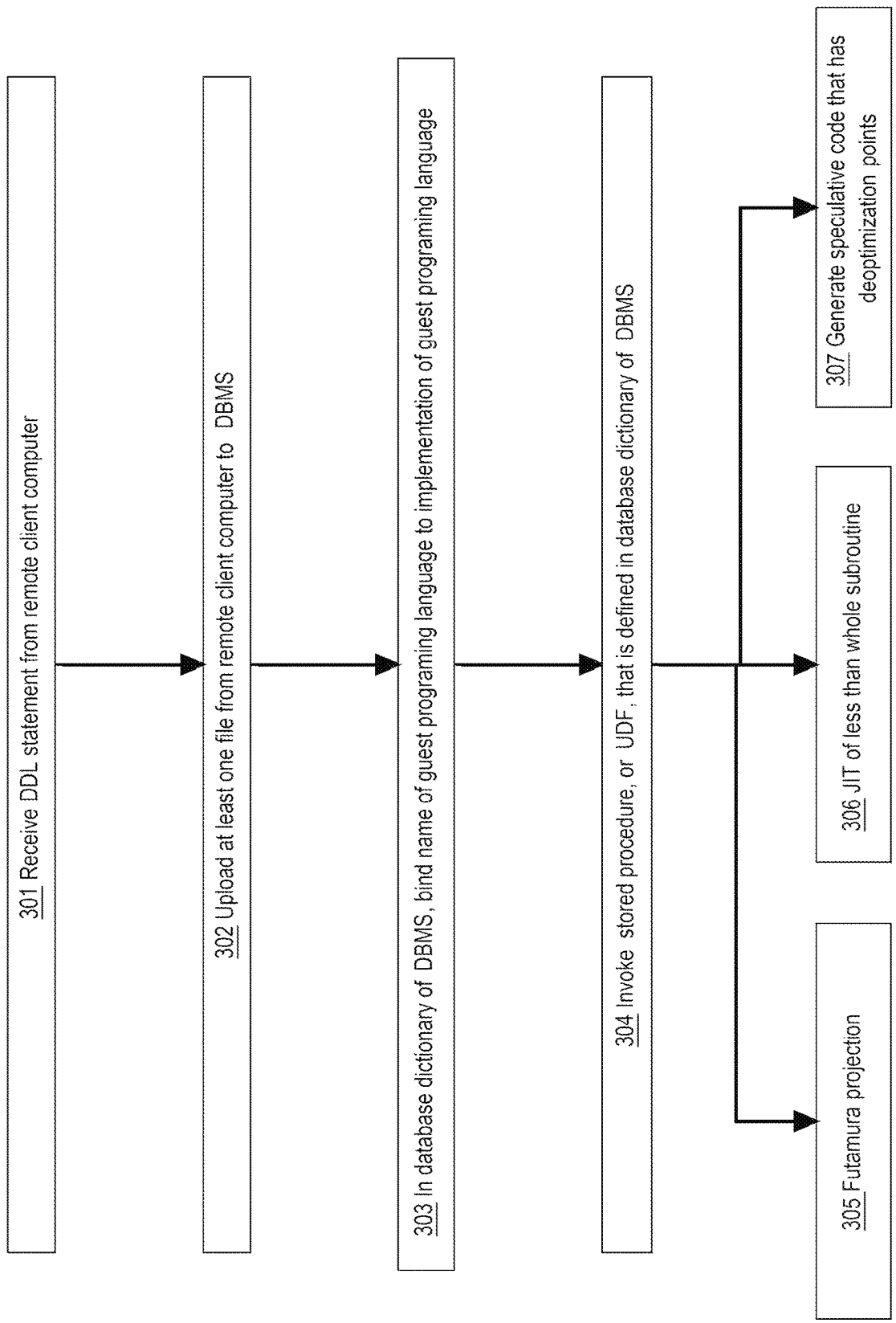
FIG. 3 is a flow diagram that depicts an example computer process for adding and using a new guest programing language in a DBMS.

FIG. 3 is a flow diagram that depicts computer system 100 adding and using new guest programing language 140 into DBMS 110, in an embodiment. FIG. 3 is discussed with reference to FIG. 1.

Steps 301-302 facilitate deployment of guest programming language 140 into a public cloud (not shown) as follows. As discussed above, DBMS 110 contains server computer(s) that may or may not include client computer 190. For example, client computer 190 may be separate from DBMS 110, and hosts client software that operates as a remote client to DBMS 110, such as with ODBC. For example, client computer 190 may be separate from a public cloud that hosts DBMS 110. Thus in step 301, DBMS 110 remotely receives DDL statement 181 from client computer 190.

Step 302 uploads codebase file(s) 150 for a guest programing language, which may automatically occur during processing of DDL statement 181. Various techniques for pushing or pulling the upload file(s) 150 are discussed earlier herein.

Steps 303-304 entail configuration metadata (not shown) for guest programing language 140 that is recorded in database dictionary 120. Step 303 binds name 130 of guest programing language 140 to a (e.g. partially) linked/loaded implementation of guest programing language 140. For example, such an implementation may be based on codebase file 150. Linking, loading, and registration within database dictionary 120 are discussed elsewhere herein.

Step 304 uses configuration metadata in database dictionary 120 to invoke guest subroutine 170. As discussed later herein, such metadata may be a call specification that wraps subroutine 170 for invocation from DML statement 182 as a stored procedure or UDF. Also as discussed later herein, another DDL statement (not shown) may generate such metadata.

Step 304 may cause one, some, or all of steps 305-307 that dynamically (re-)optimize logic. As explained earlier herein, guest programing language 140 may be an interpreted (e.g. scripting) language, such as Python, R, JavaScript, Ruby, Pig, or (e.g. Java) intermediate bytecode, all of which typically need an interpreter for execution. For example, codebase file(s) 150 may implement that interpreter. In an embodiment such as with Truffle, that interpreter is itself subjected to dynamic analysis such as partial evaluation and other interpretation, specialization and other (e.g. speculative) optimization, and JIT compilation.

Thus, the interpreter itself may mutate/evolve toward optimality for particular guest subroutine 170 and/or particular DML query 182 that invokes guest subroutine 170. Such interpreter refinement to fit particular guest logic is known as Futamura projection, of which there are several progressive degrees (i.e. projections) along a spectrum of intensity ranging from, at one end of the spectrum, optimizing the interpreter, to recasting the optimized interpreter into a compiler or, at the other end of the spectrum, to optimizing the compiler. Step 305 performs at least a first degree Futamura projection (i.e. interpreter optimization). Futamura projection efficiency may depend on massively repeated invocation of guest subroutine 140 to amortize optimization overhead (e.g. initial latency). For example, guest subroutine 140 may be invoked for each of thousands or millions of rows of a database table during execution of a same DML query 182.

Step 306 partially evaluates guest subroutine 170. For example, DBMS 110 may optimize all or some (e.g. subtree) of an AST of guest subroutine 170. For example, a tight loop within guest subroutine 170 may be isolated for semantic optimization by itself, with the remainder of guest subroutine 170 subjected to ongoing interpretation without optimization. Likewise, JIT compilation may be applied to all or some of the AST.

Step 307 generates speculative logic that represents some or all of guest subroutine 170 based on more or less tenuous assumptions, such as datatype inference, such as based on dynamic profiling of guest subroutine 170. Speculative logic may include guard(s) that dynamically verify such assumptions. For example, a guard may detect a failed (i.e. violated) assumption and react by reverting logic at deoptimization point(s), including falling back to unoptimized logic that does not require such assumptions, such as previously used and still cached logic.

4.0 Guest Module

Figure 4:
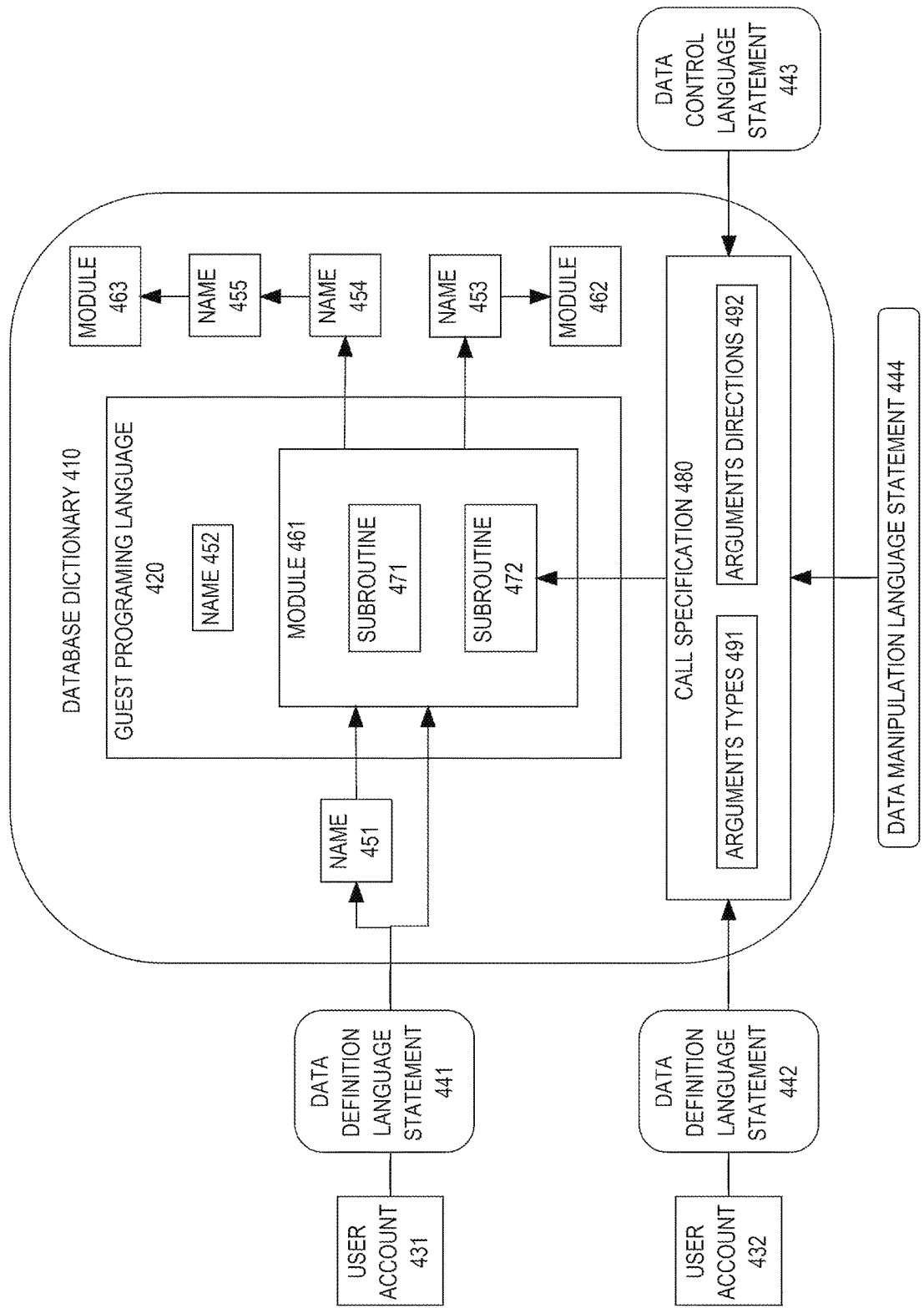
FIG. 4 is a block diagram that depicts an example DBMS for processing a single DDL statement that causes generation, for a guest programing language, of a guest module that contains multiple guest subroutines.

FIG. 4 is a block diagram that depicts an example DBMS 400, in an embodiment. Single DDL statement 441 causes DBMS 400 to generate, for guest programming language 420, guest module 461 that contains multiple guest subroutines 471-472. DBMS 400 may be an implementation of DBMS 110.

A language module, such as 461-463, is an administrative and/or lexical (i.e. scope/visibility) unit that defines object(s) such as subroutines 471-472 that are native to guest programing language 420 and available for (e.g. public) access from outside of guest module 461. Guest module 461 may contain other objects that are: a) also publicly accessible but are not subroutines, such as global variables, such as data structures, b) only accessible from within guest module 461, or c) only accessible within guest programing language 420, depending on the embodiment.

In an embodiment, DDL statement 441 may be "CREATE MLE MODULE scott.'jsmodule' LANGUAGE JAVASCRIPT AS module.exports.func=function( ) { . . . };", with details as follows. JAVASCRIPT is name 452 of guest programing language 420 for which guest module 461 is created. The name of guest module 461 is jsmodule, shown as name 451.

When created, guest module 461 is registered within a database schema (not shown). If name 451 is unqualified within DDL statement 441, then guest module 461 is registered within a default (e.g. current, global, and/or system) schema. If name has a qualifier, such as scott, then guest module 461 is instead registered within an existing schema named scott. For example, database dictionary 410 may be for a schema such as scott or default, and database dictionary 410 may contain names 451-455 as retrieval keys. Because a schema acts as a namespace, modules in different schemas may have a same unqualified name but different qualifiers.

As occurs in the example DDL statement 441 above, the new module exports (i.e. publicizes) a single object named "func" that, in this case happens to be: a) an anonymous (i.e. no guest-native name) JavaScript object, b) a function, and c) defined inline (i.e. directly in DDL statement 441 as JavaScript). The exports clause may export multiple objects, such as "AS module.exports.A=function( ){ } module.exports.B=function( ){ }", with whitespace as a separator.

The example DDL statement 441 above is a verbose (i.e. self-contained) form of a module creation statement because exported object(s) are defined inline. A module creation statement may have other forms that instead define exported object(s) by reference. The following is an example grammar for module creation statements.

```
CREATE [ OR REPLACE ] MLE MODULE
[<module-schema>.]<name>
LANGUAGE [<language-schema>.]<mle-language> [
ENV [<language-schema>.]<mle-env> ]
[ VERSION '<version-string>' ]
{USING
    {BFILE(<directory object name>,<server file name>) |
    {CLOB|BLOB|BFILE} <selection clause>} |
AS <module text>}
```

In the above grammar, a USING clause is an alternative to an AS inlining clause. A BFILE term may specify a file path or a resource URL, such as a JAR URL, such as for guest language material that is: remotely available, bundled in an archive file, and/or dynamic (e.g. HTTP CGI) content. A binary large object (BLOB) or character (i.e. text) large object (CLOB) term may specify a DML (e.g. SQL) selection clause that retrieves content from a single column of a single row of a relational table or result set. For example, DBMS 400 may be a relational DBMS (RDBMS) that maintains, in a database, a table that stores a respective JavaScript object in each row for a same column.

Depending on the embodiment, the VERSION term may be used for compatibility checking and/or for publicizing multiple versions of a same module having a same name 451. The ENV term specifies a language programing environment as explained later herein.

In an embodiment, after DDL statement 441 creates guest module 461 in guest programming language 420, then guest subroutines 471-472 are immediately available for use in some, but not all, contexts as follows. At this time with newly created guest module 461, guest subroutines 471-472 might still be undeclared in important components of DBMS 400 such as database dictionaries including 410, relational algebra machinery such as DML parsing and query planning, and guest programing languages other than 420. Depending on the embodiment, guest subroutines 471-472 may at this time be completely unavailable for use, or only visible for use in particular combinations (e.g. all) of guest programing language 420, guest module 461, and/or a current guest virtual environment (ENV) as discussed later herein.

Thus after creating guest module 461, publicizing guest subroutines 471-472 requires creation of respective call specifications such as 480. Call specification 480 is metadata that is defined in database dictionary 410 as an interlanguage binding for use by other languages such as DML and/or a (e.g. different) guest programming language. Call specification 480 may be used for: a) parsing a (e.g. DML) invocation of subroutine 472, including signature overload, b) converting datatypes of input(s) and/or output(s) of guest subroutine 472, c) operating as a placeholder or proxy for guest subroutine 472 such as in a query tree of a plan or parse, and/or d) actually invoking (i.e. transferring control flow into) guest subroutine 472. Thus, call specification 480 may sometimes operate as a passive description of guest subroutine 472 and other times operate as an active mediator (i.e. glue logic) between guest subroutine 472 and its caller.

DDL statement 442 creates call specification 480. In an embodiment, DDL statement 442 may be "CREATE OR REPLACE FUNCTION function 472 RETURN VARCHAR2 AS MLE MODULE jsmodule SIGNATURE 'subroutine 472 (str1 string, str2 string;'", with details as follows. The name of guest module 461 is jsmodule, shown as name 451. The name of guest subroutine 472 is subroutine 472. Guest subroutine 472 is publicized (e.g. renamed such as for a collision or for backward compatibility) as function 472.

Guest subroutine 472 has a signature that accepts two string parameters (i.e. string type that is native to guest programming language 420) and returns a string (i.e. string type that is native to the DML language). Execution of DDL statement 442 causes visibility of call specification 480 and callability of guest subroutine 472 to become available anywhere that guest module 461 is available, such as DML and guest programing languages other than 420.

Guest modules such as 461-463 are composable and may depend on each other as follows. For example, guest module 462 may publicize (i.e. export) an object that guest module 461 uses. For example, guest subroutine 471 in guest module 461 may import (and e.g. invoke) a guest subroutine (not shown) that is provided by guest module 462.

Techniques herein strive for flexibility and reuse, despite complications such as backward compatibility and isolation such as for multi-tenancy and/or library versioning. Thus, interdependent guest modules 461-463 are only loosely (i.e. symbolically) coupled with names 453-455 as follows. Each guest module may rename (i.e. define its own names for) dependencies (i.e. other guest modules that are imported (i.e. cross referenced)).

For example, guest module 462 is referred to within guest module 461 as name 453, which need not be an original name of guest module 462. For example, guest subroutine 471 may be defined in a Python script that has an import statement that recites (i.e. cross references) name 453 that is bound to guest module 462. Whereas, a different guest module such as 463 may import same guest module 462 by a different name, or may have a different guest module bound to same name 453.

Thus, name 453 operates as an alias. In an embodiment, aliases may be cascaded. For example within guest module 461, names 454-455 are synonymous because name 455 is bound to name 454. For example, a Python script may use either name 454 or 455 to refer to guest module 463.

Guest programming language 420 may instead be Java, which may have classes instead of scripts. Activities discussed herein for script execution may instead occur during class loading and/or class execution. In an embodiment, each Java guest module is implemented as a native Java module, such as a Java-9 module, an OpenJDK Jigsaw module, or an open service gateway initiative (OSGi) module. Each Java module has its own descriptor class that cross references other modules as dependencies. Except with OSGi, loading one Java module of many interdependent Java modules causes eager loading of the transitive closure of cross-referenced descriptor classes. Loading other implementation (e.g. helper) classes from a Java module may rely on natural class loading semantics, which is mostly or entirely lazy.

No matter how lazy is an implementation's native module loading, an embodiment of DBMS 400 may or may not enforce eager resolution of guest modules, even if guest module loading is more or less lazy. Module resolution entails mapping dependency names (i.e. aliases) to actual module implementations. For example, an embodiment with lazy module resolution may create modules in any order by issuing DDL creation statements in any order. Whereas, eager module resolution may require dependency modules be created before other modules that use those dependencies, such that circular dependencies are forbidden. For example with eager module resolution, a DDL statement to create one module will fail if any of that module's dependency names cannot be immediately resolved to other already resolved modules. Whereas, lazy module resolution may defer (e.g. failing) resolution until the dependency is actually used. In either case, whether or not module resolution includes module loading (e.g. script execution) depends on the embodiment.

As discussed above, modules 461-463 are defined within database schema(s) (not shown), which naturally provides isolation that may be important as follows. Guest object lifespan and visibility may depart from state of the art guest language concepts as follows. For example, DBMS 400 may be multi-user, multi-role, multi-tenant, and access controlled (e.g. DDL grant statement). None of those complications exist in a conventional JavaScript environment, such as a web browser. Whereas, a database schema provides substantial isolation by enforcing visibility at various granularities.

For example, each database application or application subsystem may have its own database schema that defines its own users, their roles, and their privileges. Because applications typically do not share schemas, those applications also should not share modules as follows. Multiple applications may share a same codebase (e.g. script, library) of a module, and those applications may give that module a same alias. However, because those applications have separate schemas, separate instances (i.e. copies) of that module should be loaded at runtime into the RAM of DBMS 400. For example, guest module 461 may be one of many defined instances of a same module deployment. DBMS 400 treats each instance of a same module deployment as a separate (i.e. independent) module.

Each instance for a same module deployment is initialized separately, which may entail repeated executions of a same codebase. For example, module creation DDL statement 441 creates only one module instance in one database schema. A module instance is distinguished from its codebase as follows. A module's codebase (not shown), such as a script or library, may be a unit of deployment into DBMS 400. For example, multiple instances of a same module may be created by repeatedly executing the module's script.

For example, another more or less similar DDL statement (not shown) may create another module instance of a same generalized module, but in a different schema. Both DDL statements may cause repeated execution of a same module codebase. For example, both DDL statements may specify a same Python script or a same Java archive (JAR) as a module codebase, which may cause that script to run twice, or may cause that JAR to be loaded twice by two separate class loader instances. Thus, both created module instances may have separate (i.e. independent) copies of a nominally same global variable of Python or a same static field of Java.

5.0 Example Module Creation Process

Figure 5:
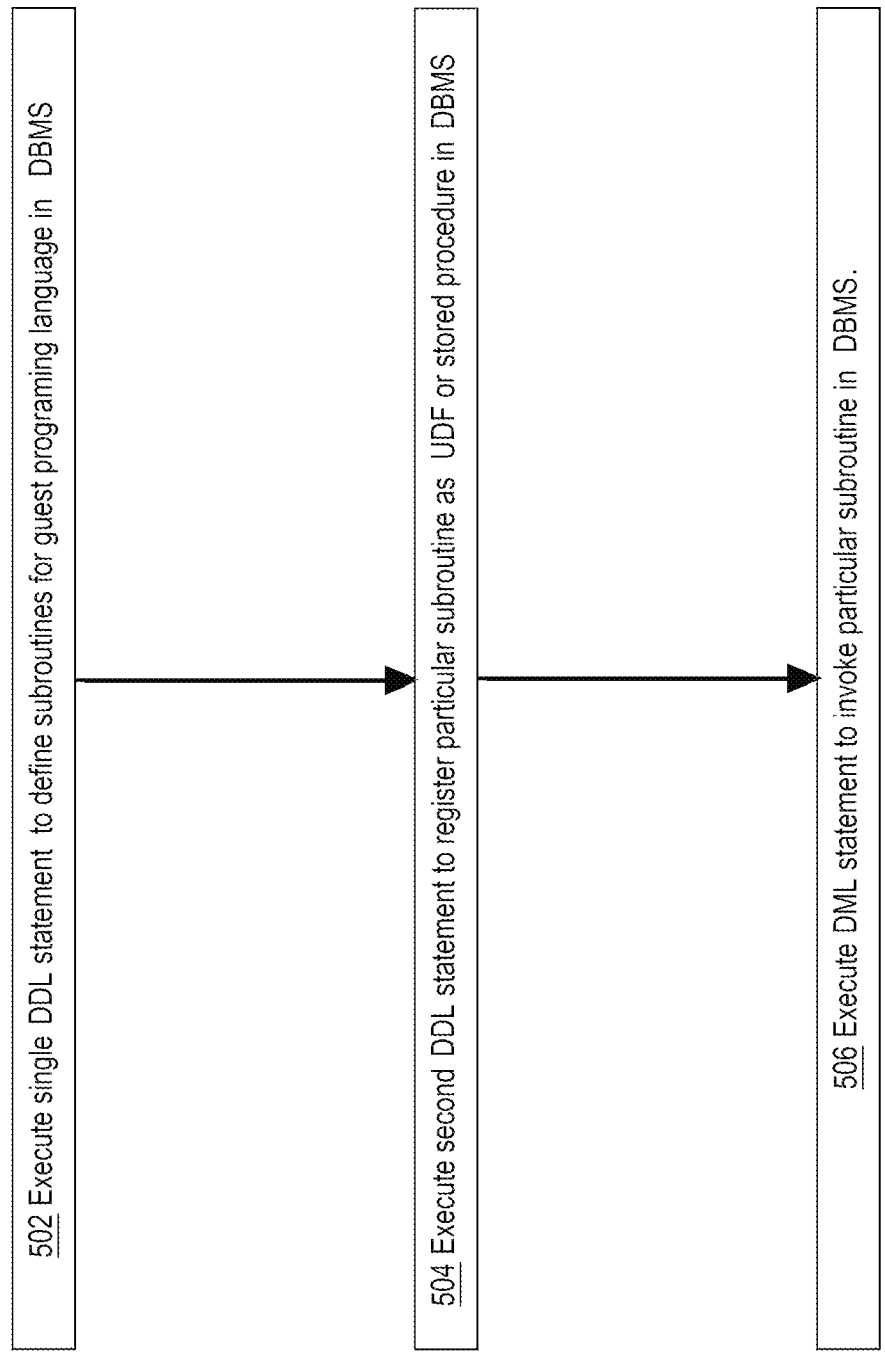
FIG. 5 is a flow diagram that depicts an example single DDL statement causing a DBMS to generate, for a guest programing language, a guest module that contains multiple guest subroutines.

FIG. 5 is a flow diagram that depicts single DDL statement 441 causing DBMS 400 to generate, for guest programing language 420, guest module 461 that contains multiple guest subroutines 471-472. FIG. 5 is discussed with reference to FIG. 4.

In the shown embodiment, preparing new guest subroutine 472 in database dictionary 410 occurs in steps 502 and 504, with each of those steps executing a respective DDL statement of 441-442 as follows. Step 502 executes DDL statement 441 that initiates bulk loading of multiple guest subroutines 471-472 to define them in database dictionary 410. DDL statement 441 creates new guest module 461 for guest programing language 420, and binds guest module 461 in database dictionary 410 to name 451 that DDL statement 441 contains.

DDL statement 441 directly or indirectly provides a (e.g. custom) codebase that (e.g. textually) defines one or more guest subroutines 471-472. For example, DDL statement 441 may contain a (e.g. quoted and character escape encoded) string that contains (e.g. Python) guest scripting statements that literally define guest subroutines 471-472 inline. In another example, DDL statement 441 refers by URL or path to a Python script file that contains those guest scripting statements.

In either case, step 502 executes those guest scripting statements to cause guest programing language 420 to internally define guest objects such as subroutines 471-472. In an embodiment, only a subset of those new guest objects 471-472 are directly provided to DBMS 400. For example, DDL statement 441 and/or the guest scripting statements may declare particular guest object(s) to export (or in an embodiment, not export).

Exporting and selective exporting are discussed elsewhere herein. For example, the multilingual engine (MLE) of DBMS 400 may have a respective exporting implementation based on guest programming language 420. For example, exports may be directly supported in a way that is more or less native to guest programing language 420, such as with Harmony (a.k.a. ECMAScript 6). Unfortunately, exports invade the guest scripting statements as explained elsewhere herein. Likewise as explained herein, Java's native module system requires (e.g. hand coded) classes to implement exports. Whereas, other implementations may properly separate concerns such as exporting and scripting. For example, the MLE of DBMS 400 may automatically generate boilerplate declarations for exports, dependencies (i.e. imports), and/or other aspects of modules, module boundaries, and/or module composition (i.e. aggregation arrangement).

Embodiments herein may separate, into distinct steps 502 and 504, exporting and publication of a guest object. As explained above, step 502 instantiates guest subroutines 471-472 and exports them to DBMS 400 and its MLE. However in an embodiment, exporting does not make guest subroutines 471-472 available for invocation from DML statement 444, because DML statement can only invoke UDFs and stored procedures, not arbitrary subroutines.

Step 504 executes DDL statement 442 to generate call specification 480 for guest subroutine 472, and register call specification 480 in database dictionary 410 for later reference by DML statements such as 444. Generation of call specification 480 is discussed earlier herein. In an embodiment not shown, there is no DDL statement 442 and no step 504, and call specifications are automatically (e.g. lazily) generated for all exported guest subroutines of guest module 461, such as during previous step 502.

Step 506 executes DML statement 444 that references call specification 480 to invoke guest subroutine 472 as explained earlier herein, such as during a database query. Step 506 extracts call site information from DML statement 444, which may include a name of a UDF or stored procedure, which may be used as a lookup key to retrieve call specification 480 from database dictionary 410. Argument ordering and datatypes may be inferred from the call site such as for signature overloading and/or alerting a semantic error such as a wrong amount of arguments, a datatype mismatch of an argument or return value, or a directional error for an OUT argument. In an embodiment, call specification 480 may have an OUT or IN/OUT argument even when guest programing language 420 does not natively support output arguments, such as when the MLE of DBMS 400 can generate or otherwise provide data structures that marshal argument(s).

As explained elsewhere herein, call specification 480 may convert a value of a return or of an argument between (e.g. somewhat similar) datatypes. Step 506 may repeatedly invoke guest subroutine 472 through call specification 480, such as per each of multiple database table rows and/or per each of multiple call sites. DML statement 444 may also invoke other call specifications for other guest subroutines, such as 471.

6.0 Example Module Lifecycle Activities

Figure 6:
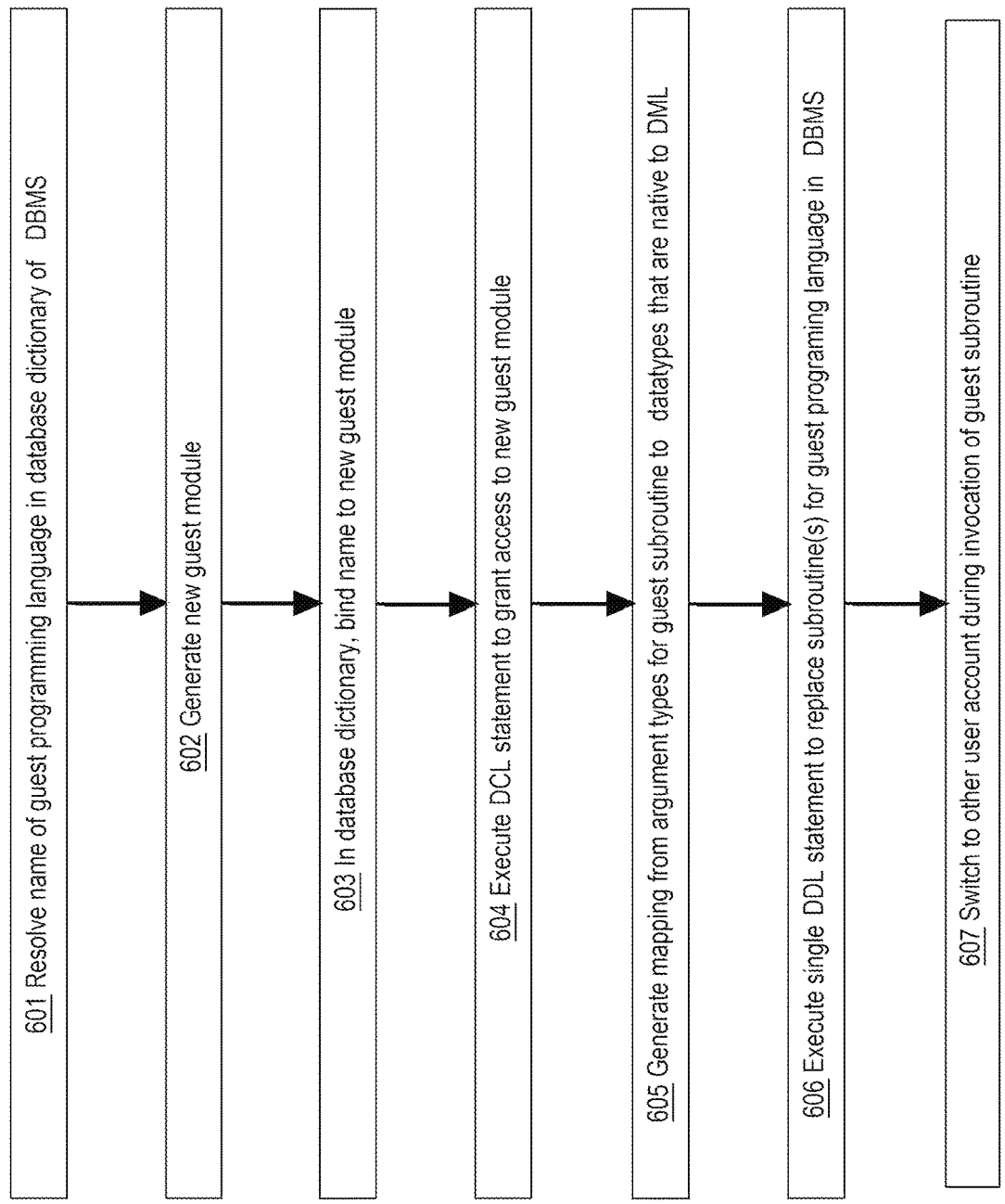
FIG. 6 is a flow diagram that depicts some example lifecycle activities of a guest module and guest subroutines.

FIG. 6 is a flow diagram that depicts some lifecycle activities of guest module 461 and guest subroutines 471-472. FIG. 6 is discussed with reference to FIG. 4.

Steps 601-605 show activities that may occur during an initial deployment of guest module 461. Steps 606 shows maintenance (e.g. patch) of guest subroutines 471-472. Step 607 shows use of guest subroutine 472.

Initial deployment of guest module 461 may entail executing a series of DDL statements, including guest module creation by DDL statement 441 in steps 601-603, guest module administration by data control language (DCL) statement 443 in step 604, and call specification generation by DDL statement 442 in step 605. In step 601, DBMS 400 receives and begins executing DDL statement 441 to create guest module 461 and guest subroutines 471-472. Because instantiating guest subroutines 471-472 requires executing guest programing language 420, DDL statement 441 should contain name 452 of guest programing language 420 that step 601 may use as a lookup key in database dictionary 410.

Step 602 creates new guest module 461, which may entail executing script(s) or class(es) in guest programming language 420. For example, DDL statement 441 may contain an inline script or may refer to a script in a file.

Step 603 binds name 451 to new guest module 461 in database dictionary 410, such as according to database object definition techniques and mechanism described elsewhere herein. DDL script 441 specifies name 451. Database dictionary 410 and its association with a (e.g. user or default) database schema are discussed elsewhere herein.

Step 604 executes DCL statement 443 to grant various permissions to various users and/or roles. For example, some users may be allowed to use, but not revise, guest module 461. Also for example, some users might be forbidden to use guest module 461.

Step 605 executes DDL statement 442 to generate call specification 480 for guest subroutine 472. For call specification 480, step 605 may generate or reuse a mapping of datatypes between DML and guest programing language 430, and may embed such mapping logic into call specification 480. Call specification 480 may specify: arguments types such as for resolution and/or overloading of signatures, arguments directions such as OUT, and/or (e.g. for optimization and/or parallelism) an indication of idempotency, cacheability, and/or thread safety.

Much later, one, some, or all of guest subroutines 471-472 may be revised. Step 606 executes a single DDL statement (not shown), such as an ALTER MODULE statement as presented elsewhere herein, to revise (i.e. replace) any or all of guest subroutines 471-472. For example, the ALTER MODULE statement may specify a revised codebase, such as inline or in a file. Step 606 replaces guest subroutines 471-472 and retains any call specifications already generated, such as 480, although some or all such call specifications may need regeneration by additional DDL statements such as for signature changes. In an embodiment, call specification 480 is automatically regenerated during step 606.

Step 607 actually invokes guest subroutine 472 during execution of DML statement 444. Guest subroutine 472 may need increased privileges to access resources, or may benefit from decreased privileges for safety, such as to avoid accidental or malicious misuse. As presented later herein, call specification 480 may declare whether guest subroutine 472 inherits privileges of whichever user account invokes call specification 480, or whether guest subroutine 472 should instead inherit privileges of an administrative user account that defined guest module 461.

That is, call specification 480 specifies under which of those two user accounts should guest subroutine 472 execute. Thus as shown, step 607 may switch to the module definer's user account when guest subroutine 472 is invoked through call specification 480. When guest subroutine 472 returns control back to executing DML statement 444, execution reverts back to the invoker's user account, which is the user that submitted DML statement 444. User accounts and guest module boundaries may be related to execution contexts, which are presented later herein.

7.0 Module Dependencies

Figure 7:
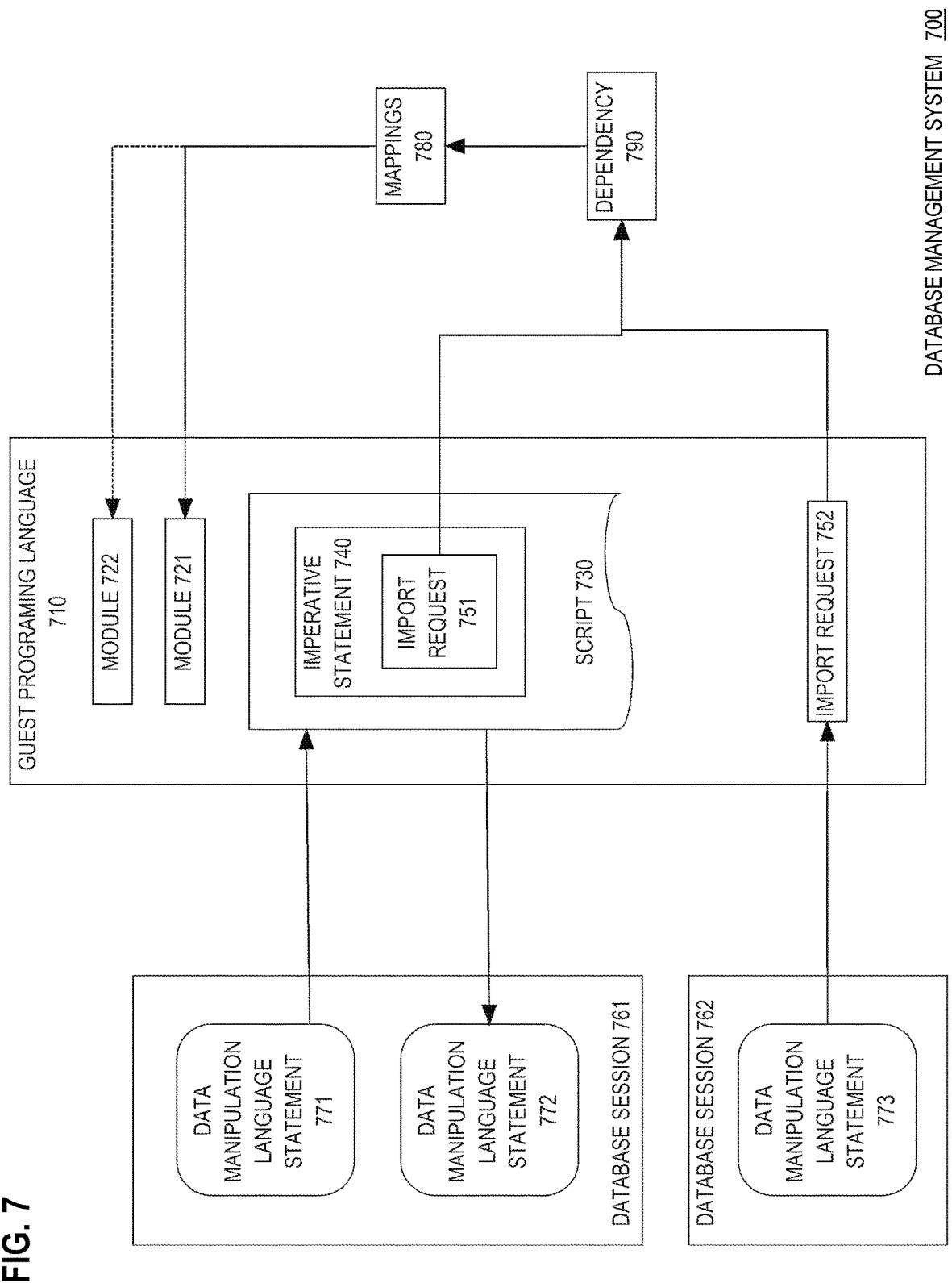
FIG. 7 is a block diagram that depicts an example DBMS for processing a request by a guest programing language to import a dependency, which causes the DBMS to provide a guest module based on a mapping.

FIG. 7 is a block diagram that depicts an example DBMS 700, in an embodiment. Native request 751 of guest programing language 710 to import dependency 790 causes DBMS 700 to provide either guest module 721 or 722 based on mapping 780 as follows. DBMS 700 may be an implementation of DBMS 110.

Guest objects such as exported subroutines are defined in guest programming language 710 of DBMS 700, such as in (e.g. Python) guest script 730. Although not shown, multiple guest objects may be distributed across one or more guest modules defined in guest programing language 710. In operation, DML statements 771-773, such as SQL, may access exported guest objects, such as in a database dictionary (not shown) of DBMS 700.

For example, a guest module may have been defined based on (e.g. Python) guest script 730 that defines one or more guest objects, such as subroutines, that are publicized (i.e. exported). Creation of those guest objects requires execution of guest script 730, which occurs each time a guest module instance is defined with a same guest module deployment.

As explained, script execution creates guest objects. A lifespan of a guest object depends on various implementations as follows. A guest object does not outlive the guest module that contains it.

Guest object lifespan and visibility may depart from state of the art guest language concepts as follows. For example, DBMS 700 may be multi-user, multi-role, multi-tenant, and access controlled (e.g. DDL grant statement). None of those complications exist in a conventional JavaScript environment, such as a web browser. DBMS 700 may have additional technical concerns such as database schemas as namespaces and multiple threads, which have visibility and sharing implications that a browser script lacks. Techniques such as guest modules and environments, as discussed elsewhere herein, may provide some needed isolation. However, an enterprise or cloud solution may need more robust isolation for additional safety (i.e. correctness such as for security or compatibility) as follows.

In an embodiment, an execution context (not shown) is an additional mechanism that provides ample isolation. An execution context is a coarse-grained control flow mechanism with operational characteristics somewhere between a lightweight thread and a heavyweight process of an operating system. Like threads, multiple execution contexts may share a same address space, such as that of DBMS 700. Like a heavyweight process, an execution context may have its own private environmental namespace from which to resolve (i.e. lookup) resource dependencies. An execution context may interoperate with database objects of DBMS 700 as follows.

DBMS 700 may have concurrent execution contexts, and each execution context is monopolized by a database session and is single threaded. An execution context may be as long-lived as its database session. An execution context may be idle at least when its database session is idle. Thus, only a fluctuating subset of execution contexts may actually be active at any moment. For example, a thread pool may have fewer total threads than an amount of execution contexts that the pool serves.

In an embodiment, multiple execution contexts do not share guest module instances. For example, a same user may have two database sessions for a same database schema, which may create two guest module instances for a same guest module deployment. For example with a same guest module deployment, a new guest module instance may be created for each execution context that uses that guest module deployment. Thus, guest module instance initialization (e.g. script execution) may be repeated each time another execution context first uses that same guest module deployment.

For example, each execution context may have its own Java class loader. Likewise, repeated instance initialization for separate execution contexts and for a same guest module deployment may repeatedly execute same (e.g. Python) guest script 730. Thus, each execution context may have its own instance of a nominally same guest global variable.

Execution context creation may occur on the following occasions. Although not shown, each exported guest subroutine has its own call specification as discussed earlier. For each database session, when a call site of a call specification of a guest module is first invoked, such as in DML statement 771, then a new execution context is created that may live as long as that session lives. Subsequent call sites for that same call specification or for other call specifications in that same guest module should reuse that execution context. In the same session, first invoking of a call site of a call specification in a different guest module causes creation of an additional execution context.

Usually, an execution context has same privileges as the session of DML statement 771. However, a DDL statement (not shown) that creates a call specification may optionally instead specify that an execution context of the session of that DDL statement should be preserved and shared (e.g. cloned) for all sessions of all users that invoke that call specification. Thus, user A may create a call specification that is bound to a guest subroutine that always executes with privileges of user A, even when the call specification is invoked by another user, thereby temporarily elevating privileges during subroutine execution.

As discussed later herein, a guest subroutine defined in one guest module may invoke a guest subroutine defined in another guest module. Usually, guest subroutines in different guest modules have different execution contexts, even for a same session. However when a first guest subroutine calls a second subroutine, there is only one call site in of DML statement 771, which is for the first subroutine. When there is only one call site, a same session has only one execution context, which an embodiment may reuse such that both subroutines invoked (i.e. one directly and the other indirectly) through a same call site should share a same execution context. Thus, a call site is a root from which a same execution context may be injected into an entire call tree of guest subroutines, regardless of guest module boundaries. An execution context is associated with a call site or call specification as follows.

In various embodiments, guest programing language 710 may have multiple instances of a same guest module, such as one per user, per session, per transaction, per (e.g. prepared, batched) DML statement, per call specification for a DML statement, or per call specification invocation site. As metadata, a call specification may be shared by some or all (e.g. non-contemporaneous) instances of a same guest module. For example, one embodiment may need multiple instances of a same call specification, and another embodiment may instead have only a shared singleton. Re-instantiating a same guest module for each DML transaction, statement, or call specification (i.e. no matter how many call sites) for the statement may increase performance efficiency by balancing between re-instantiation latency and lexical isolation (i.e. correctness/safety, e.g. security or compatibility).

In an embodiment and regardless of how many call sites are in a same DML statement, each call specification instantiates its own instance of its declared guest module. In that embodiment, no guest module outlives the execution of the DML statement that instantiated the guest module. Thus each time DML statement 771 is issued, guest script 730 runs once per referenced guest subroutine, i.e. not once per repeated (e.g. per table row) invocation, nor once per call site. For example, a particular guest module may export functions foo and bar, but not splat that comes from a different guest module. If DML statement 771 is "SELECT foo( ), foo( ), bar( ), splat( ) FROM SomeTable;", then that particular guest module is instantiated twice (i.e. once for foo and once for bar). UDF splat( ) may be an ordinary UDF implemented in SQL or may be implemented in a different guest module in a same or different guest programing language.

A guest module may use (i.e. depend on) other guest modules, but an empty guest module may be more or less useless as a dependency. Resources (i.e. guest objects) as exported by a guest module are what makes that guest module useful. For example, one guest module may contain guest script 730 that can initialize the guest module, including generating guest objects that may or may not be for exporting, such as to other guest modules.

As shown, DML statements 771-772 interact with (e.g. call) guest objects (not shown) that are generated by guest script 730 in memory of the MLE, such as RAM. Each of those guest objects may be defined by respective several lines of text in guest script 730, which is itself text.

Guest script 730 may depend on other guest modules, such as according to dependency 790 as follows. Regardless of whether execution of guest script 730 is eager, lazy, interpreted, compiled, or based on intermediate code (e.g. bytecode), execution of guest script 730 occurs one statement after another (e.g. line by line), which eventually executes imperative statement 740 in guest script 730, which is an import directive that issues import request 751 to dynamically link dependency 790 that symbolically identifies a guest module (not shown) to be resolved. Processing import request 751 may occur as follows.

8.0 Example Import Process

Figure 8:
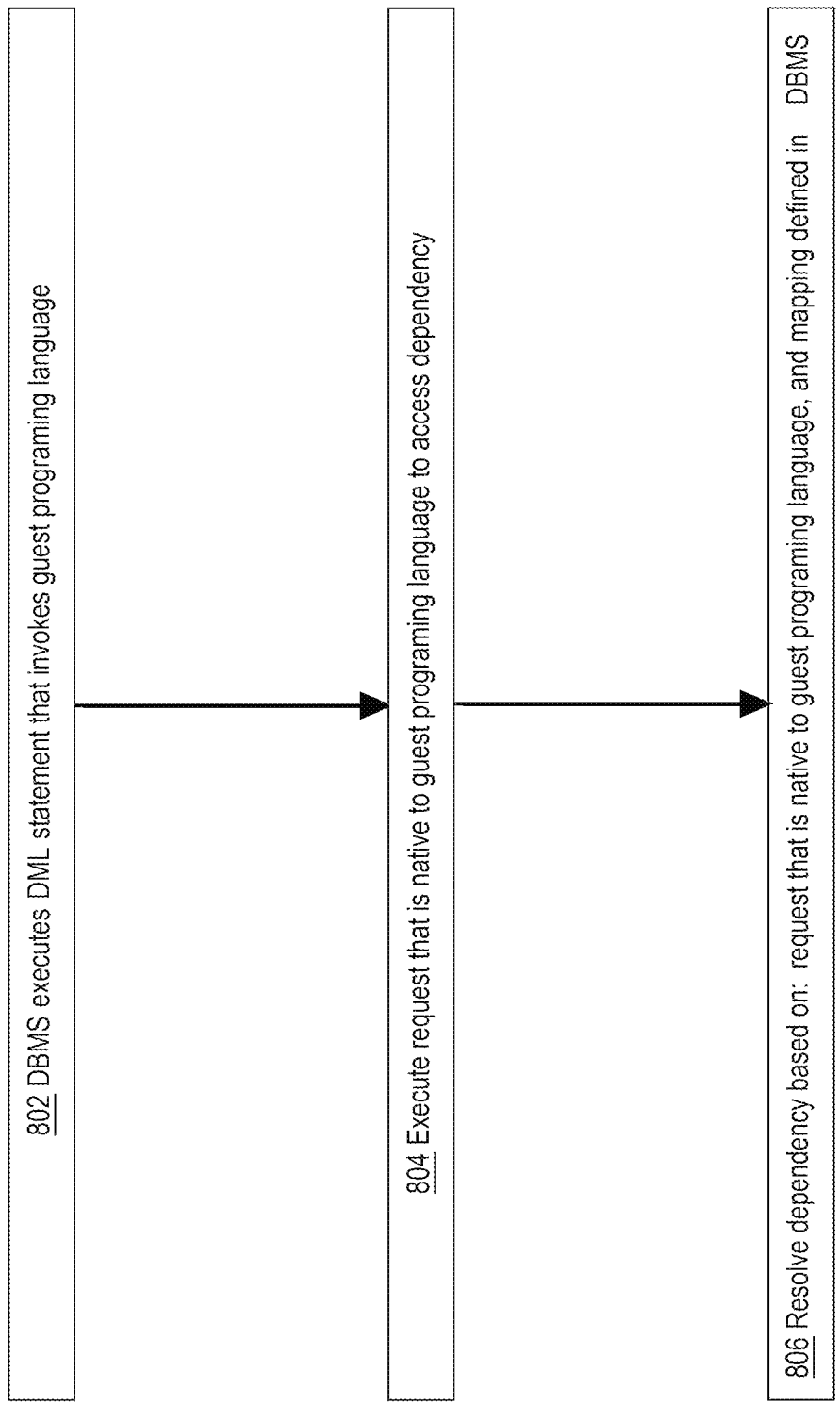
FIG. 8 is a flow diagram that depicts processing a request by a guest programing language to import a dependency, which causes a DBMS to provide a guest module based on a mapping.

FIG. 8 is a flow diagram that depicts execution of native request 751 of guest programing language 710 to import dependency 790, which causes DBMS 700 to provide either resource 721 or 722 based on mapping 780 as follows. FIG. 8 is discussed with reference to FIG. 7.

Dynamic importation of a dependency according to techniques herein may occur in three distinct scenarios that share mechanisms herein. Although not shown, one of the scenarios is caused by a DDL statement for guest module creation as follows. As shown, the other two scenarios are caused by respective alternate implementations for a same DML statement such as 771-773 as follows. Discussion of FIG. 8 addresses all three scenarios in various ways as follows.

Step 802 receives and executes a (e.g. DDL or DML) database statement that expressly (i.e. DDL) or implicitly (i.e. DML call site to a call specification) invokes guest programing language 710.

For example, a DDL statement for guest module creation may invoke a (e.g. Python) guest script 730 to eagerly instantiate guest objects such as resource 721, which may be a guest subroutine. Guest script 730 may begin with or elsewhere contain dependency import directives that typically are imperative statements, such as 740, in guest programing language 710. However as follows, some import directives may have already been statically preprocessed (i.e. inlined and removed), such as before deployment of guest script 730, such as during a build (i.e. packaging) phase.

Such a build phase is optional for techniques herein. However as with software generally, there may be both of static linking (i.e. build phase) and dynamic linking (i.e. runtime), with some dependencies fully resolved and linked (e.g. inlined) while building. For example, JavaScript has static packaging tools such as Browserify and WebPack onto which some linking may be offloaded, thereby reducing a need for dynamic import techniques herein. Although Python has not embraced static inlining, tools such as Pip can shift most linking responsibilities into build time and away from runtime.

In any case, it may be impossible or undesirable to avoid all dynamic linking, such as for reasons elsewhere herein. Thus anytime guest script 730 executes, or anytime a guest subroutine defined by guest script 730 is later invoked, import statement(s) might execute to cause dynamic linking, which occurs as follows.

In another of the scenarios, although unlikely, a body of a guest subroutine itself may contain an import statement. Thus, invoking a guest subroutine (e.g. from a DML query) may cause dynamic linking.

In another of the scenarios that is a hybrid of the other two scenarios, a guest module is more or less frequently re-instantiated, such as for multiple execution contexts as discussed later herein. For example during execution of DML statement 771, initialization of a (e.g. additional) execution context may cause another instance of a same module deployment to be instantiated in memory (e.g. RAM) of DBMS 700. Thus in the hybrid scenario, an import statement executes while executing a DML statement, as with one scenario, but import execution proceeds as described above for a module creation DDL statement as with the other scenario.

Thus, whether steps 802, 804, and 806 are caused by a DDL or DML statement depends on the scenario. Likewise, whether that entails (re-)execution of all of guest script 730, or merely entails invocation of a guest subroutine already defined by an earlier execution of guest script 730, also depends on the scenario. Furthermore, an implementation may support only one or two of the three scenarios.

Step 802 causes steps 804 and 806 as follows. Execution of guest script 730 or of one of its guest subroutines may proceed by executing individual guest statements in series, including imperative statement 740, which is an import directive that, in step 804, issues import request 751 to dynamically link dependency 790 that symbolically identifies a guest module (not shown) to be resolved.

In an embodiment, the MLE of DBMS 700 has a respective adapter in each guest programing language's implementation. During step 804, that adapter intercepts and specially handles import request 751 as follows. Although not shown, import request 751 contains a name of dependency 790, as needed for module resolution. The MLE may use that dependency name in next step 806 as follows.

Step 806 resolves dependency 790. The dependency name may be used as a lookup key into dependency mappings 780 to select a guest module that satisfies dependency 790. Dependency mappings 780 may be implemented by a guest virtual environment that participates in dependency resolution as discussed later herein. For example in mappings 780, dependency 790 may be bound to guest module 721.

9.0 Example Component Boundary Behaviors

Figure 9:
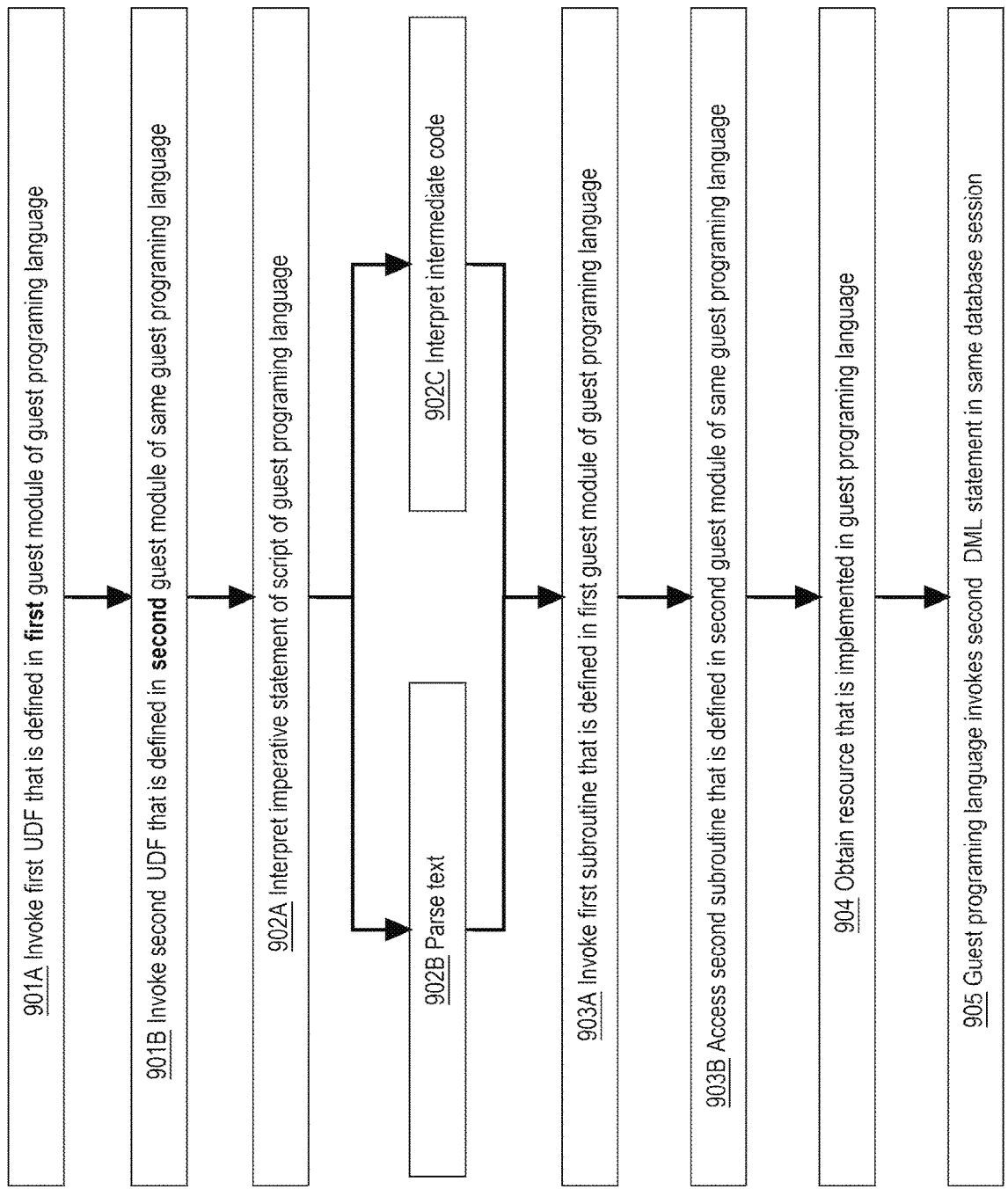
FIG. 9 is a flow diagram that depicts some example activities at boundaries of database components such as database sessions, data manipulation language (DML) statements, and guest modules.

FIG. 9 is a flow diagram that depicts example activities at boundaries of components such as database sessions 761-762, DML statements 771-773, and guest modules 721-722 as follows. FIG. 9 is discussed with reference to FIG. 7.

The steps of FIG. 9 depict multiple scenarios that may or may not occur together as follows. Steps 901A-B involve same DML statement 771 invoking two call specifications in different respective guest modules 721-722 of same guest programing language 710. In other words, DML statement 771 directly depends on multiple guest modules, which implicates execution contexts in an embodiment as follows.

As explained earlier herein, an execution context usually corresponds to a combination of a database session and a guest module. That is, invocations into a same guest module during a same database session may reuse a single execution context. For example, DML statement 771 occurs in database session 761. Execution of DML statement 771 spans steps 901A-B as follows.

During step 901A, DML statement 771 invokes a first UDF whose call specification resides in guest module 721. Thus, the first UDF is invoked in a first execution context for the combination of database session 761 and guest module 721. That first execution context is reused if already existing, and created immediately if not.

During step 901B, same DML statement 771 invokes a second UDF whose call specification resides in different guest module 722. Thus, the first execution context should not be reused to invoke the second UDF, even though both guest modules 721-722 are defined in same guest programing language 710. Instead, the second UDF is invoked in a second execution context for the combination of same database session 761 and different guest module 722. That second execution context is reused if already existing, and created immediately if not.

As explained earlier herein, each execution context that shares a deployment of guest module 721 with other execution contexts (e.g. other database sessions) may need its own guest module instance. Also as explained, each additional module instance may be separately initialized, such that guest script 730 reruns each time an additional module instance is initialized. For example, if DML statement 771 has database session 761's first use of guest module 721, then guest module 721 should be instantiated for database session 761 during execution of DML statement 771. Thus, DML statement 771 may cause guest script 730 to run, which causes steps 902A-C as follows.

As explained earlier herein, execution of guest script 730 may proceed by interpreting individual statements within guest script 730, one at a time. For example, step 902 interprets imperative statement 740 that may be an import directive. Interpretation of imperative statement 740 may entail none, one, or both of steps 902B-C as follows.

In step 902B, the implementation of guest programming language 710 parses script text, such as all text or a single text line of guest script 730. For example, step 902B may generate a Truffle AST or append to an existing Truffle AST.

Depending on guest programming language 710, imperative statement 740 may originally be bytecode or may be dynamically compiled into bytecode by step 902B. In either case, step 902C interprets intermediate code such as bytecode. Thus although not shown, step 902B may or may not cause step 902C.

DML statement 771 may invoke a UDF that invokes a guest subroutine through a call specification, such as with either of steps 901A-B. However, that guest subroutine may itself invoke other guest subroutines in other guest modules of same guest programing language 710, as shown in steps 903A-B. For example, DML statement 771 may, through a UDF and a call specification in guest module 721, directly invoke (i.e. shown as step 903A) a guest subroutine that, by its own guest logic, invokes a guest subroutine in different guest module 722, shown as step 903B.

Thus like steps 901A-B that crossed a boundary between two guest modules, steps 903A-B also cross a boundary between modules. However, steps 903A-B share a same execution context. Whereas, steps 901A-B did not share a same execution context. Thus, whether or not a boundary between guest modules causes a switch between two execution contexts depends on the scenario.

An empty guest module may be more or less useless. A dependency to, or import of, a guest module is needed only because that guest module contains a needed resource (i.e. guest object), such as a guest subroutine. However, a needed guest object need not be a subroutine, and may instead be a data object, such as an array. For example, multiple interdependent guest modules 721-722 of same guest programing language 710 may share a same array that was constructed by guest module 721. For example in step 904, logic in guest module 722 may import guest module 721 and then reference that array.

A guest subroutine or guest script may themselves issue DML statements, shown as step 905. For example, an DML statement 771 may be SQL that invokes a UDF that is implemented by a guest subroutine whose guest logic issues an additional SQL query. Thus, the MLE of DBMS 700 has a fully bidirectional interface between SQL and guest programing language 710, which may entail making database session 761 available to that guest subroutine as a current or default database session, which may be implemented as follows.

In an embodiment, because each execution context may have its own independent instance of a global variable as explained earlier herein, that global variable may store database session 761 as a current session. In another embodiment, the current database session is exported, or a factory subroutine is exported that returns the current database session, and either of those is exported from a module that operates like a guest module but is native to DBMS 700 and does not have a guest programing language, or the guest programing language is DML, such as PL/SQL or T/SQL. Guest module 721 may need to import that native module to access the current database session.

10.0 Example Dependency Resolution Process

Figure 10:
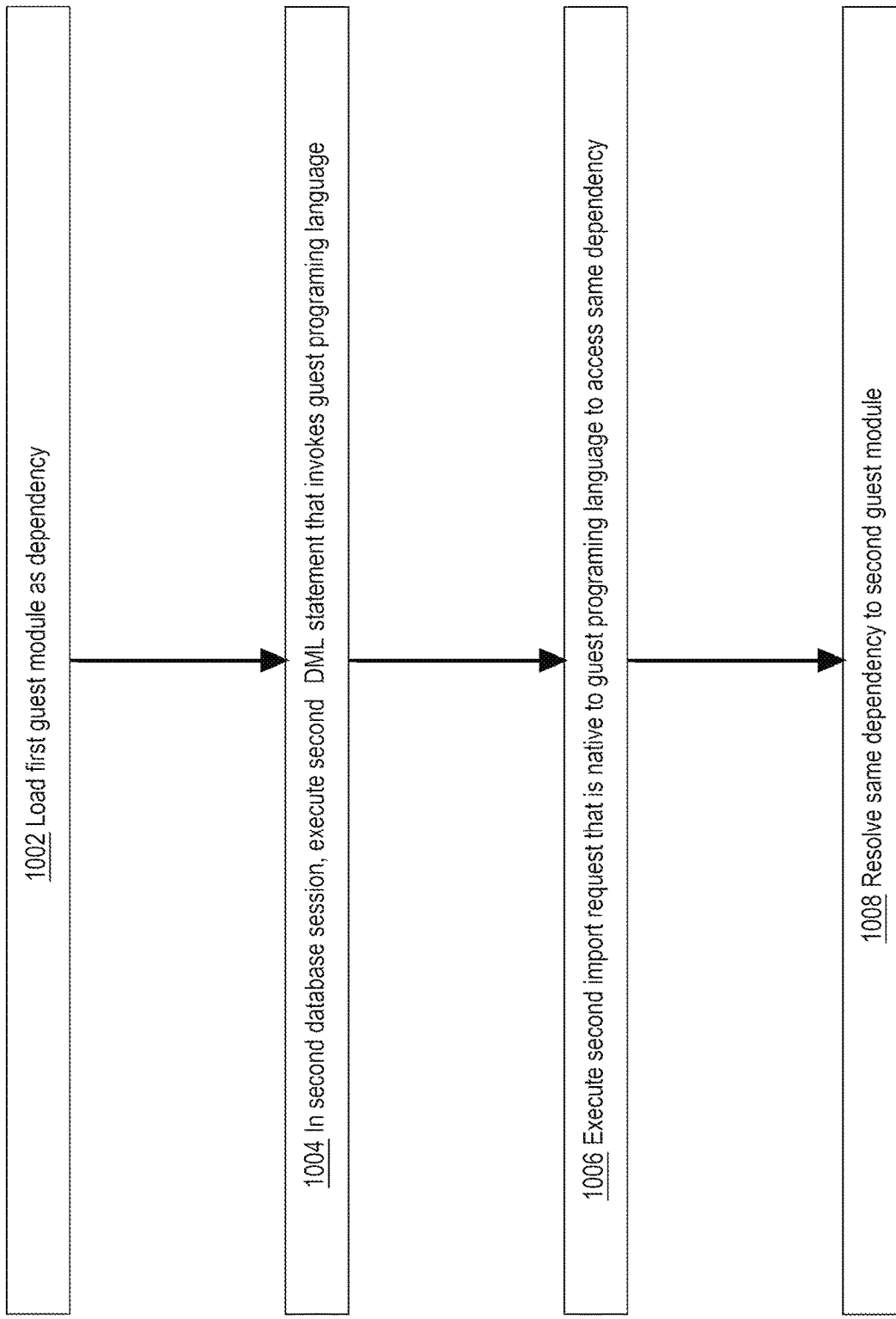
FIG. 10 is a flow diagram that depicts some example activities for satisfying a dependency.

FIG. 10 is a flow diagram that depicts example activities for satisfying dependency 790 in an embodiment. Additional dependency satisfaction techniques are presented later herein. FIG. 10 is discussed with reference to FIG. 7.

Step 1002 loads and caches guest module 722 into memory buffer 705 of DBMS 700. For example, DML statement 771 in database session 761 causes import request 751 to access dependency 790 as explained earlier herein. Also as explained, DBMS 700 uses mappings 780 to decide which actual guest module should be used to satisfy dependency 790. Implementations of mappings 780 are presented later herein. For example, guest module 722 may be selected to satisfy dependency 790.

Step 1004 may execute DML statement 773 in different database session 762, which may invoke a call specification of a UDF to invoke a guest subroutine, which may execute import request 752 to access same dependency 790, shown as step 1006. As explained elsewhere herein, which guest module will be selected for dependency 790 in step 1008 depends on mappings 780 that may be based on the current database session and/or the current execution context. Thus, dependency 790 that resolved to guest module 722 in step 1002 may instead resolve to different guest module 721 in step 1008. Additional mechanisms for such resource alternation are presented later herein, such as guest virtual environments.

11.0 Polyglot Integration

Figure 11:
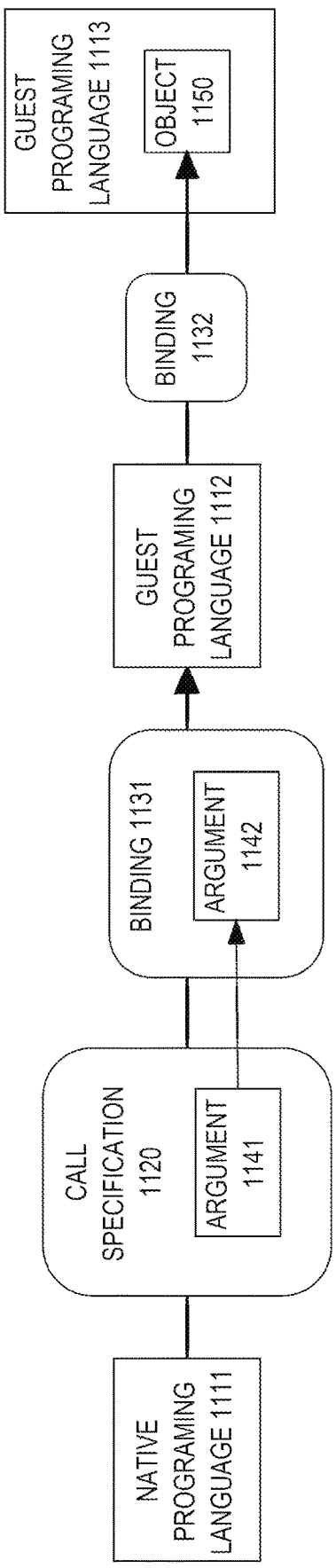
FIG. 11 is a block diagram that depicts an example DBMS that has a multilingual engine (MLE) that facilitates cooperation between different guest programing languages.

FIG. 11 is a block diagram that depicts example software container 1100, in an embodiment. Software container 1100 has a multi-lingual engine (MLE) that facilitates cooperation between different guest programming languages 1112-1113 as follows. Software container 1100 may be an implementation of DBMS 110.

Depending on the embodiment, software container 1100 may be any middleware, such as a platform as a service (PaaS) or an infrastructure as a service (IaaS), that is capable of loading and executing custom logic. For example, software container 1100 may be an application server such as a web server, an inversion of control (IoC) container such as Spring, a virtual machine (VM) such as a hypervisor or a Java VM (JVM), a programing language interpreter of scripting or bytecode, an application container such as Docker or Kubernetes, or a DBMS such as a RDBMS.

As discussed earlier herein, the MLE of software container 1100 has innovative integration mechanisms including: a) hosting of multiple guest programing languages 1112-1113, b) loading and operation of guest modules (not shown), c) resolution of symbolic dependencies (not shown) between guest modules, and d) generation and publication of call specifications such as 1120. Also as explained earlier herein, the MLE may innovatively invade (i.e. intercept) and enhance operations of guest programming languages 1112-1113 such as importing and exporting of guest objects as shared resources.

The MLE may be implemented such that, with a few language-specific adapters, much or all core functionality of the MLE is available in a language neutral way. In an embodiment, the MLE facilitates cooperation of multiple guest languages 1112-1113 in a transparent way based on cooperation of guest modules as functional units through mediation interfaces as follows. For example, a guest module of guest programming language 1112 may interact with a guest module of guest programming language 1113 without either guest module being aware of which language does the other module use. Thus, software container 1100 achieves more or less complete interface compatibility of guest languages that may cooperate, for example, to help execute a statement expressed in native programming language 1111.

Native programming language 1111 is fully integrated into software container 1100. For example when software container 1100 is a DBMS, then native programming language 1111 may be a query language such as DML such as SQL. As another example, software container 1100 may be implemented in native programming language 1111. For example when software container 1100 is Spring IoC implemented in Java, then native programming language 1111 may be Java. In an embodiment, native programming language 1111 is a domain specific language (DSL) that may or may not be proprietary to software container 1100.

As explained earlier herein such as for a DBMS, software container 1100 generates call specifications, such as 1120, for subroutines of guest programming languages 1112-1113. For example, call specification 1120 may export a subroutine of guest programming language 1112 as a UDF in native programming language 1111. UDF call specification 1120 has argument(s), such as 1141, and/or a return value with respective datatypes that are native to native programming language 1111. Call specification 1120 also includes data binding 1131 that converts arguments from datatypes of native programming language 1111 into datatypes, such as for guest argument 1142, of guest programming language 1112, and vice versa for a return value and/or OUT parameters. Thus, languages 1111-1112 are more or less completely insulated from each other's type system, such that neither language 1111-1112 is ever exposed to datatypes of the other language.

Binding 1131 is not a binding between two guest programing languages, which may instead be achieved as follows. As explained, binding 1131 may bidirectionally convert datatypes of languages 1111-1112, as a first binding. Likewise, native programming language 1111 may also have a second binding (not shown) that bidirectionally converts datatypes of languages 1111 and 1113.

In an embodiment, binding 1132 between guest programing languages 1112-1113 may be a coupling (not shown) of both the first and second bindings. Thus, datatypes of either of guest programing languages 1112-1113 are initially converted to datatypes of native programming language 1111, as an intermediate representation, and then converted into the other of guest programing languages 1112-1113. For example, binding 1132 may convert a Python string into a SQL string and then into a JavaScript string, so that a Python module may pass a value to a JavaScript module.

That approach is scalable in the sense that each guest programing language need provide only one bidirectional data binding (i.e. to native programming language 1111). In another embodiment, binding 1132 does not use native programming language 1111 datatypes as an intermediate representation, and instead binding 1132 directly converts between datatypes of guest programming languages 1112-1113. That approach may have higher runtime efficiency.

No matter how data binding 1132 is implemented, components of software container 1100 can be arranged as shown to achieve polyglot execution of a query. Integration techniques such as call specifications, data bindings, and module dependency resolution facilitate configuration of interdependent guest modules in ways that transparently achieve flows of control and/or data between modules of different guest programming languages. For example, a query for native programming language 1111 may invoke a subroutine in guest programming language 1112 that accesses a resource such as object 1150 in guest programming language 1113.

Thus, execution of the query may cross guest language boundaries to engage guest programming languages 1112-1113 in a cooperative manner. From such interoperability there may be various emergent benefits as follows.

For example, different responsibilities of a same query may be distributed according to natural strengths of guest programing languages 1112-1113. For example, uniform resource locator (URL) processing may be delegated to guest programming language 1112 that in turn delegates regular expressions to guest programming language 1113.

For example, an application developer would not be limited to any one guest programming language and thus may have a vast inventory of third-party (e.g. open source) resources of many guest programming languages for ready deployment as guest modules. That may bias a tradeoff of buy versus build away from feature development from scratch, thereby accelerating development and/or cutting development costs. In turn, that may encourage more ambitious (i.e. feature rich) database applications, and/or facilitate consolidated service topologies with fewer (e.g. middleware) tiers such as application servers, which may cut operating/administration costs and skills.

12.0 Example Guest Object Access Process

Figure 12:
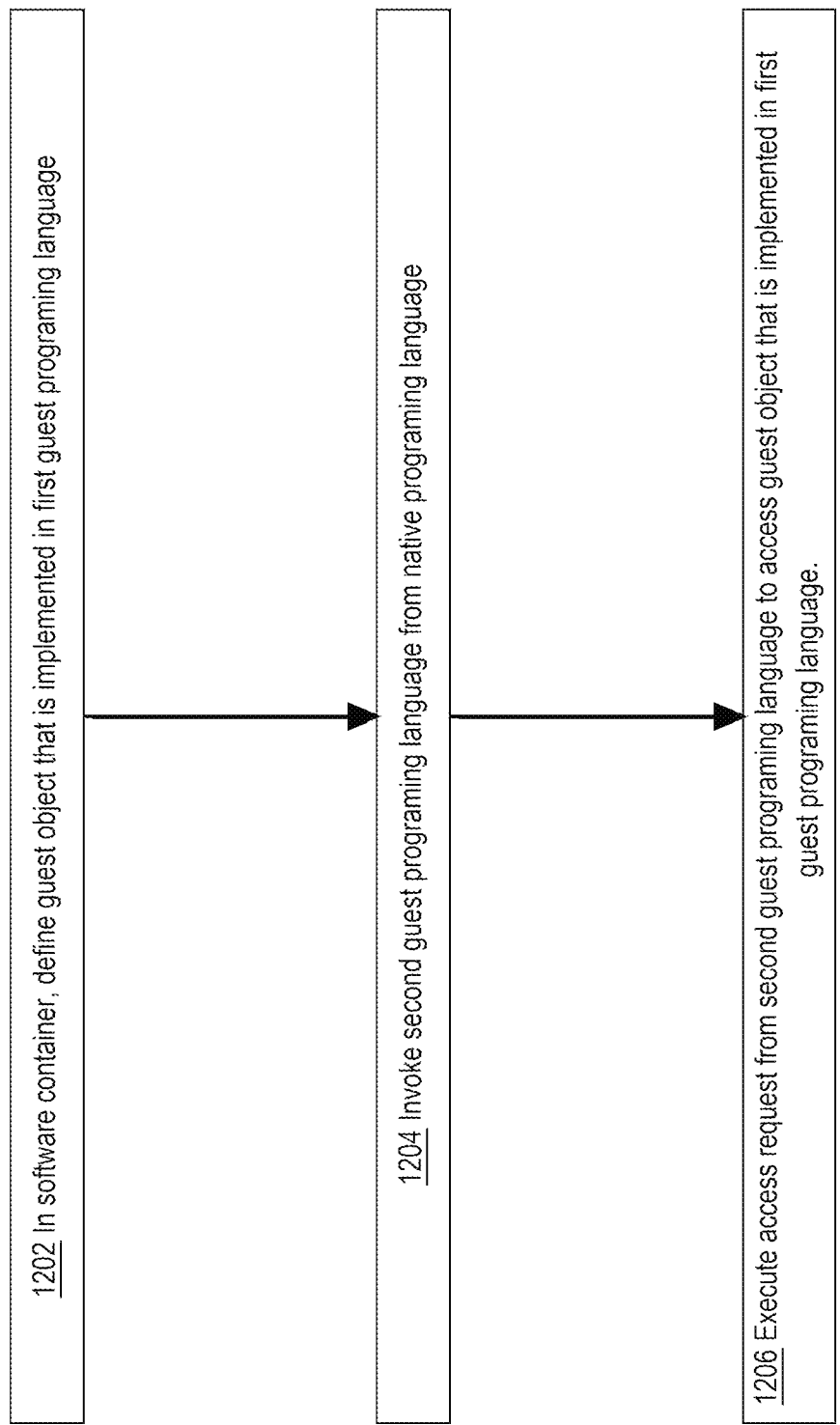
FIG. 12 is a flow diagram that depicts some example activities for accessing a guest object in a guest programing language from a different guest programing language.

FIG. 12 is a flow diagram that depicts example activities for accessing guest object 1150 in guest programming language 1113 from different guest programming language 1113 in an embodiment. FIG. 12 is discussed with reference to FIG. 11.

Step 1202 is preparatory and creates guest object 1150 in guest programming language 1113 as discussed earlier herein, including activities such as guest module instantiation, guest script execution, guest object exporting, and various database dictionary insertions. Step 1204 invokes different guest programming language 1112 from a native programming language 1111 statement as discussed earlier herein. For example, call specification 1120 may mediate between native programming language 1111 and guest programming language 1112, including operation of binding 1131 for argument datatype conversion as described above. Thus, step 1204 transfers control from native programming language 1111 to guest programming language 1112, which may or may not entail generation and/or switching of an execution context as discussed above.

Step 1206 executes a request to access guest object 1150 in guest programming language 1113 from different guest programming language 1112. Again, that may or may not entail generation and/or switching of an execution context as discussed. Step 1206 crosses a language boundary in a way more or less similar to that of step 1204 that also crossed a language barrier. As discussed above herein, crossing into a guest programming language, as with each of steps 1204 and 1206, entails some or all of: a) execution context generation and/or switching, b) guest module resolution and/or instantiation, with or without guest script execution, c) argument datatype conversion and/or validation such as by binding 1131 or 1132, d) overloaded signature resolution, and e) actual transfer of control into a guest programming language, such as invocation and interpretation or other execution of a guest subroutine.

As explained above, that guest script or guest subroutine may issue a directive to import a dependency. That issuing script or subroutine need not know which same or other guest programming language implements a guest module that can satisfy that dependency. For example and depending on dependency mappings as discussed above and below herein, a same dependency, in various scenarios presented herein, may be satisfied by different guest modules in a same or different guest programming languages. For example, due to intended substitution or due to accidental name collision, a same dependency may resolve to a Python guest module for one client, and resolve to a JavaScript guest module for another client.

Implementations of a multilingual engine may use some decoupling mechanisms, including reusable data structures and/or generated glue logic, to achieve such multilingual module pluggability. Lookup tables and hash maps provide more or less passive translation based on indirection. For example as discussed elsewhere herein, there may be a passive, eager, or lazy adapter that translates a guest programing language's native modularity framework to the guest module mechanisms and techniques taught herein. For example as discussed herein, native datatypes and other structures that are native to software container 1100 and/or native programing language 1111, such as aspects of SQL, may or may not be used as a canonical representation that all guest language datatypes are translated to or from. In an embodiment, a namespace such as a guest virtual environment facilitates module coupling as follows.

13.0 Guest Virtual Environments

Figure 13:
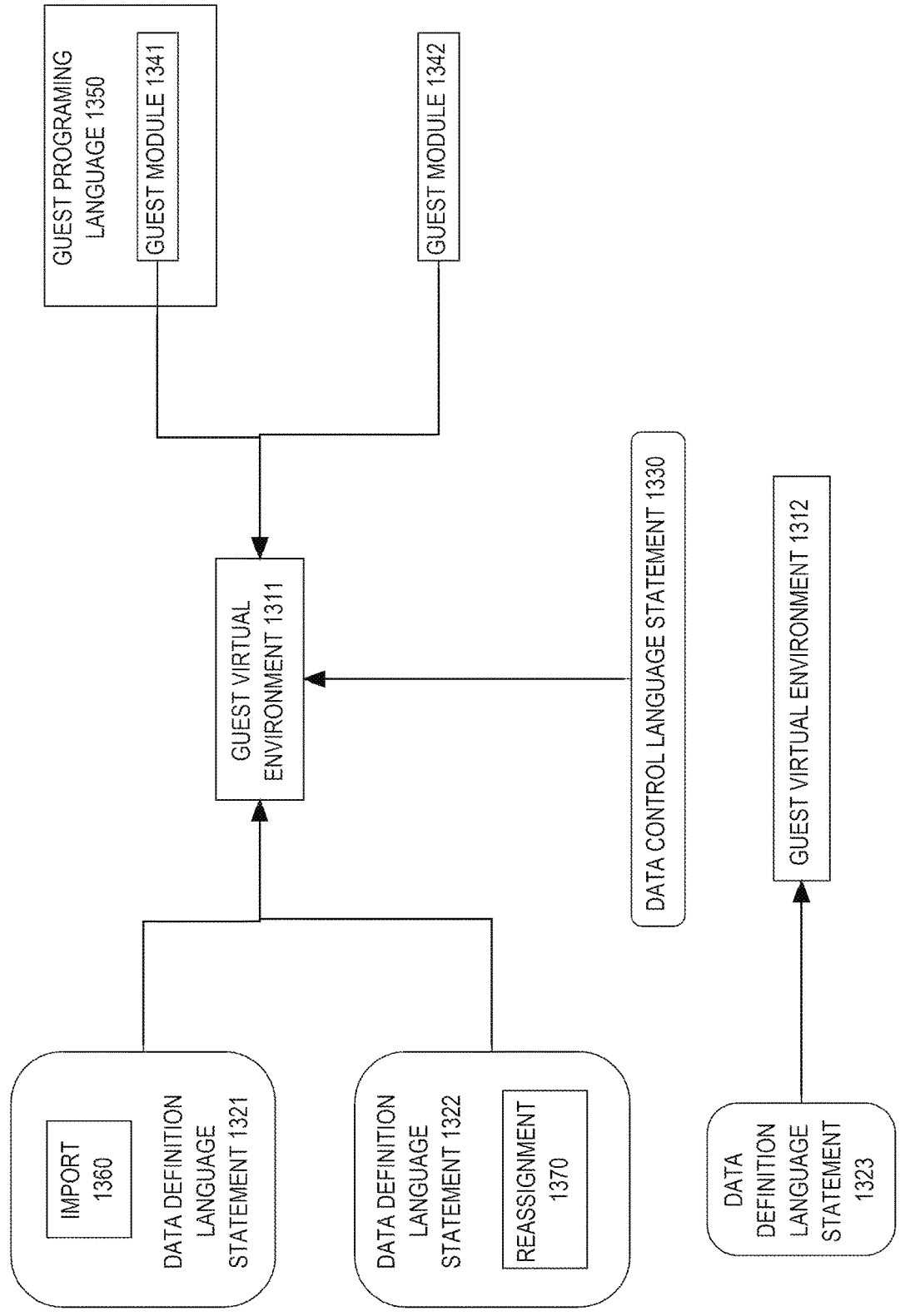
FIG. 13 is a block diagram that depicts an example DBMS that has guest virtual environments that provide alternate bindings of same named dependencies to different guest modules.

FIG. 13 is a block diagram that depicts example computer 1300, in an embodiment. Guest virtual environments 1311-1312 of computer 1300 provide alternate bindings of same named dependencies to different guest modules as follows. computer 1300 may comprise an implementation of DBMS 110.

As explained above guest modules, such as 1341-1342, may depend on another guest module to satisfy dependencies. Also as explained above, concerns such as isolation and codebase versioning may limit sharing of guest modules. For example, multiple instances of a same module deployment may be needed, or different codebases (e.g. release versions) for similar modules may be needed, and/or resource name collisions may need avoiding. Thus, computer 1300 has guest virtual environments 1311-1312 that provide isolation, such as for multi-tenancy.

Guest virtual environments 1311-1312 are namespaces that provide mappings (i.e. bindings) (not shown) between symbolic dependencies (i.e. names as discussed herein) (not shown) of some guest modules 1341-1342 and other guest modules (not shown) that serve as implementations (i.e. definitions as discussed herein) of those dependencies. In that sense, each of guest virtual environments 1311-1312 operates as a namespace through which each of guest modules 1341-1342 gains visibility to other needed guest modules. Thus, a database application may be more or less composed of cooperating guest modules. In an embodiment, each of guest virtual environments 1311-1312 is implemented as an associative data structure, such as a dictionary or hash table, that stores bindings of guest modules for lookup as follows.

In an embodiment, computer 1300 comprises an RDBMS or other DBMS. Other embodiments do not contain a DBMS. In the shown embodiment, computer 1300 receives and executes DDL statements 1321-1323, such as for a DBMS, for creating or otherwise administering guest virtual environment 1312. Other embodiments may receive and execute commands that, although not DDL and/or not for a DBMS, can also create and administer guest virtual environment 1312. The DDL statements 1321-1323 are exemplary of an implementation choice for computer 1300. Thus, the following discussion of techniques for DDL statements 1321-1323 may readily apply to implementations that do not need a DBMS nor DDL. In an embodiment, computer 1300 contains a software container that is not a DBMS, such as presented earlier herein. In an embodiment, computer 1300 needs neither a DBMS nor any other software container as described earlier herein.

DDL statement 1323 creates new guest virtual environment 1312 in computer 1300. DDL statement 1323 may specify a database schema in which to define guest virtual environment 1312, which may default to a current schema of a database session that issues DDL statement 1323. DDL statement 1323 may optionally specify an existing guest virtual environment to use as a prototype from which a clone may be generated. For example, DDL statement 1323 may specify that new guest virtual environment 1312 should be cloned from existing guest virtual environment 1311. Cloning copies all dependency bindings, and without cloning, new guest virtual environment 1312 initially has no dependency bindings at all.

DDL statement 1321 adds a new dependency binding into existing guest virtual environment 1311. For example, the details of DDL statement 1321, shown as import 1360, may specify a name of a dependency and a name of a guest module to bind to that dependency. For example, guest module 1341 in guest programing language 1350 may import a dependency by name, such as with a require( ) statement (not shown). The multi-language engine (MLE) (not shown) of computer 1300 may intercept and specially process import directives (i.e. requests), such as require( ) For example, an invocation of require( ) may specify a dependency name that the MLE may use as a lookup key to select a binding in guest virtual environment 1311. The selected binding may identify another guest module that requesting guest module 1341 should use for obtaining resources related to that require( ) invocation.

For resolving dependencies, every guest module instance has one respective guest virtual environment. For example, a DDL statement (not shown) that creates a guest module may specify an existing guest virtual environment. If a guest virtual environment is not specified, then computer 1300 provides a default guest virtual environment for the guest module.

Multiple guest modules 1341-1342 may share same guest virtual environment 1311. Such sharing may occur regardless of whether or not guest modules 1341-1342: a) have different codebases, b) are defined in different guest programing languages, c) are imported by other guest modules that are defined in different guest programing languages, and/or d) are loaded for different user accounts and/or database sessions.

Guest module 1341 may be initially assigned to guest virtual environment 1311 and then later reassigned to guest virtual environment 1312, such as by a DDL statement (not shown). In an embodiment, such reassignment causes guest module 1341 to be (e.g. lazily) reloaded based on guest virtual environment 1312. For example, a Python script that implements guest module 1341 may be rerun.

DDL statement 1322 has details, shown as reassignment 1370, that replace an existing dependency binding in guest virtual environment 1311 with a new dependency binding. Thus, a dependency can be remapped to a different guest module, such as a new release version of a guest module. In an embodiment, DDL statement 1322 is not retroactive, such that guest modules that already use guest virtual environment 1311 are not affected by changes to guest virtual environment 1311. For example, guest modules 1341-1342 may respectively use concurrent different versions of guest virtual environment 1311.

Depending on the embodiment, any of DDL statements 1321-1323 may specify: a version number of a guest programing language, a configuration setting of the guest programing language, and/or a resource loading path, such as discussed later herein. Each guest virtual environment is defined in a database schema, which may contain multiple guest virtual environments. Data control language (DCL) statement 1330 may administer usage permissions for guest virtual environment 1311.

14.0 Example Guest Virtual Environment Process

Figure 14:
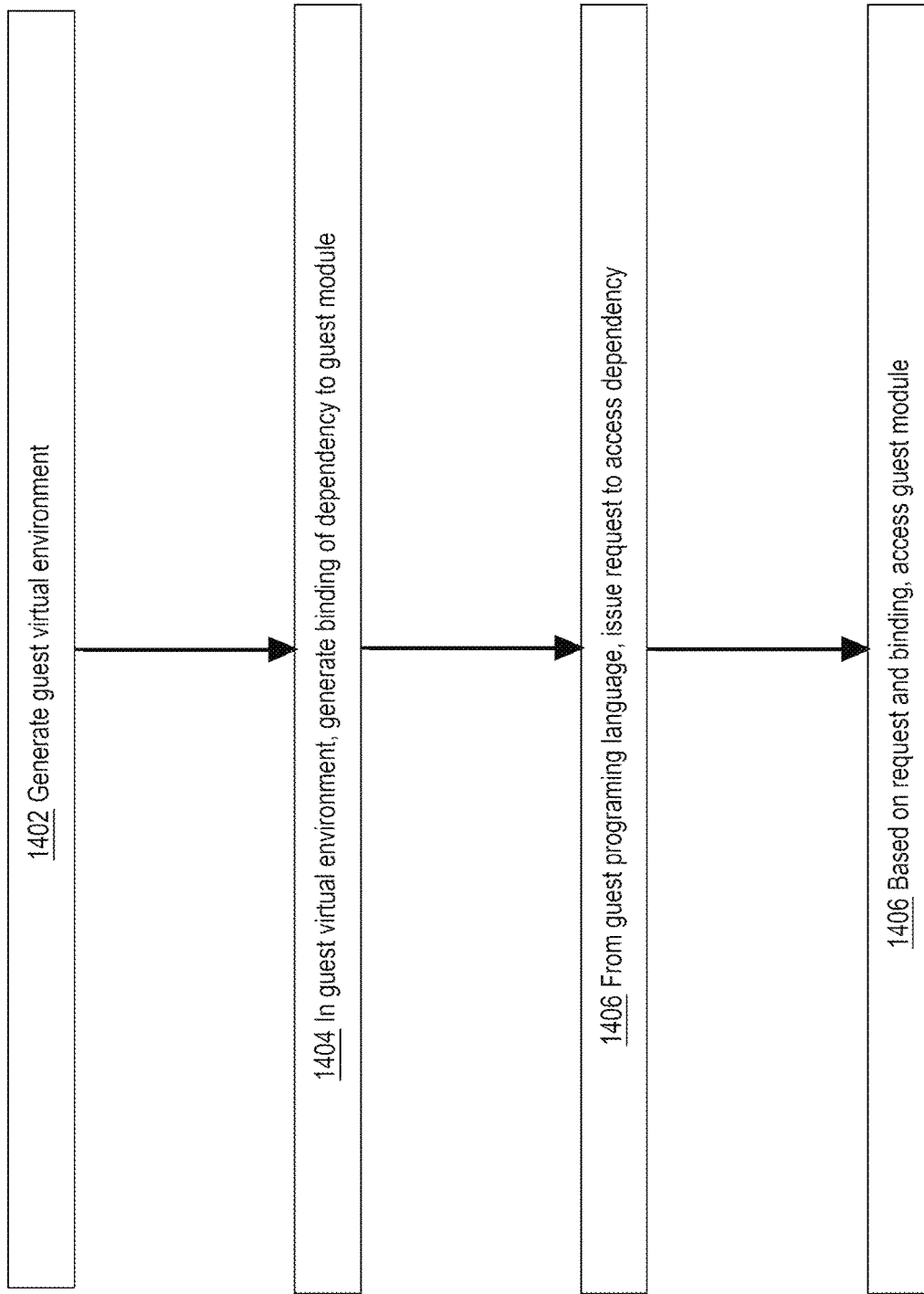
FIG. 14 is a flow diagram that depicts some example activities for generating, modifying, and using a guest virtual environment that symbolically binds guest dependencies to guest modules.

FIG. 14 is a flow diagram that depicts example activities for generating, modifying, and using guest virtual environment 1311 that symbolically binds guest dependencies to guest modules in an embodiment. FIG. 14 is discussed with reference to FIG. 13.

Step 1402 generates guest virtual environment 1311, which is initially empty (i.e. has no bindings). For example, DDL statement 1323 may be "CREATE MLE ENV scott.'myenv';" that creates guest virtual environment 1311 and names it myenv in database schema scott.

Initially-empty guest virtual environment 1311 may be more or less unready to use because its purpose is to map dependencies to respective guest modules. Into guest virtual environment 1311, step 1404 adds a binding for a dependency. For example, DDL statement 1321 may be "ALTER MLE ENV scott.'myenv' ADD IMPORT hello MODULE scott.'hello';" that specifies import 1360 that binds a dependency named hello to guest module 1341 in guest virtual environment 1311.

Guest module 1341 was or (e.g. now or later) will be instantiated in guest programming language 1350. Whereas, guest module 1342 was instantiated in a same or different programing language. In any case, execution of a guest script or guest subroutine in guest module 1342 may issue a request to access that dependency named hello, such as with an import directive, shown as step 1406. Step 1406 uses guest virtual environment 1311 to resolve that dependency named hello by selecting guest module 1341. For example, guest module 1342 may be using guest virtual environment 1311, according to metadata of guest module 1342, or according to a current execution context, current database session, or current database schema.

During step 1406, guest virtual environment 1311 is used to resolve that guest module 1342 depends on guest module 1341 for dependency hello, which may or may not also entail activities such as loading, instantiating, and/or reusing guest module 1341.

In conjunction with the MLE as described herein, guest virtual environment 1311 may: a) contain bindings to guest modules implemented in many guest programming languages, b) be used at runtime (e.g. query) for resolution by guest modules defined in many guest programming languages, and c) be used to facilitate crossing a boundary between any two guest programming languages. Thus, guest virtual environment 1311 is language neutral.

15.0 Guest Virtual Environment Sharing

Figure 15:
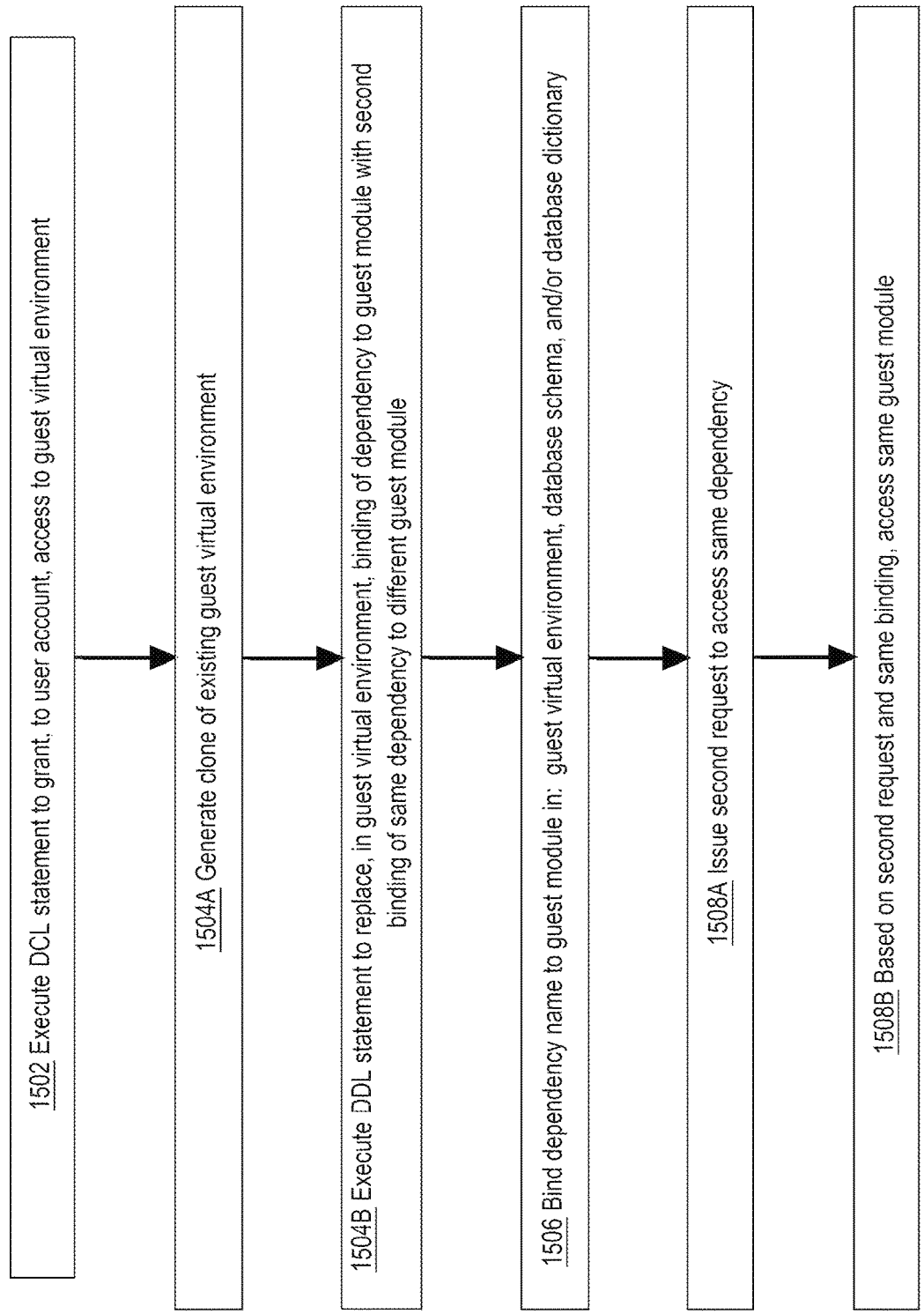
FIG. 15 is a flow diagram that depicts some example activities for sharing a guest virtual environment amongst multiple database users and multiple guest programing languages, such as in a multi-tenant environment, such as with cooperating or siloed (i.e. not cooperating) multiple database applications, such as in a private cloud of an enterprise.

FIG. 15 is a flow diagram that depicts example activities for sharing guest virtual environment 1311 amongst multiple database users and multiple guest programming languages, such as in a multi-tenant environment, such as with cooperating or siloed (i.e. not cooperating) multiple database applications, such as in a private cloud of an enterprise in an embodiment. FIG. 15 is discussed with reference to FIG. 13.

FIG. 15 presents various scenarios that may or may not be independent of each other. Step 1502 executes DCL statement 1330 to grant or revoke some access to existing guest virtual environment 1311 for some user accounts or roles in computer 1300. For example security and safety may encourage that DCL statement 1330 only be used to grant read-only access to guest virtual environment 1311 for most users.

Whereas in steps 1504A-B, a user account that lacks permission to modify guest virtual environment 1311 may approximate such modification as follows. Step 1504A executes DDL statement 1323 to generate guest virtual environment 1312 as a modifiable clone of guest virtual environment 1311. Step 1504B executes DDL statement 1322 that contains reassignment 2370 to add or replace a binding, in guest virtual environment 1312, between a named dependency and available guest module 1342.

Thus, clone guest virtual environment 1312 may be customized such as by replacing a binding between that named dependency and guest module 1341 with a new binding between that same named dependency and different guest module 1342. Thus by cloning, module substitutions are possible, such as when one database application needs a patched (e.g. third-party) library, and another database application in a same DBMS of computer 1300 must continue to use an older and more stable version of that library.

Data structures and lexical scopes for dependency binding may depend on the embodiment. For example, step 1506 may bind a dependency name to a guest module within one or more data structures such as: a guest virtual environment, a database schema, and/or a database dictionary. The MLE of computer 1300 may be designed to resolve dependencies based on such relevant data structure(s).

Those data structures, such as a guest virtual environment, facilitate sharing and reuse. For example, requests to import a same dependency name, such as during step 1508A, may resolve, during step 1508B, to a same guest module or similar instances of a same deployment of a guest module. For example, such sharing may occur even when those import requests come from different user accounts, different database sessions, or even from within different guest programing languages. That is because a binding structure, such as a guest virtual environment, can be shared or cloned or different guest virtual environments can be otherwise configured to contain some identical bindings.

16.0 Virtual File System

Figure 16:
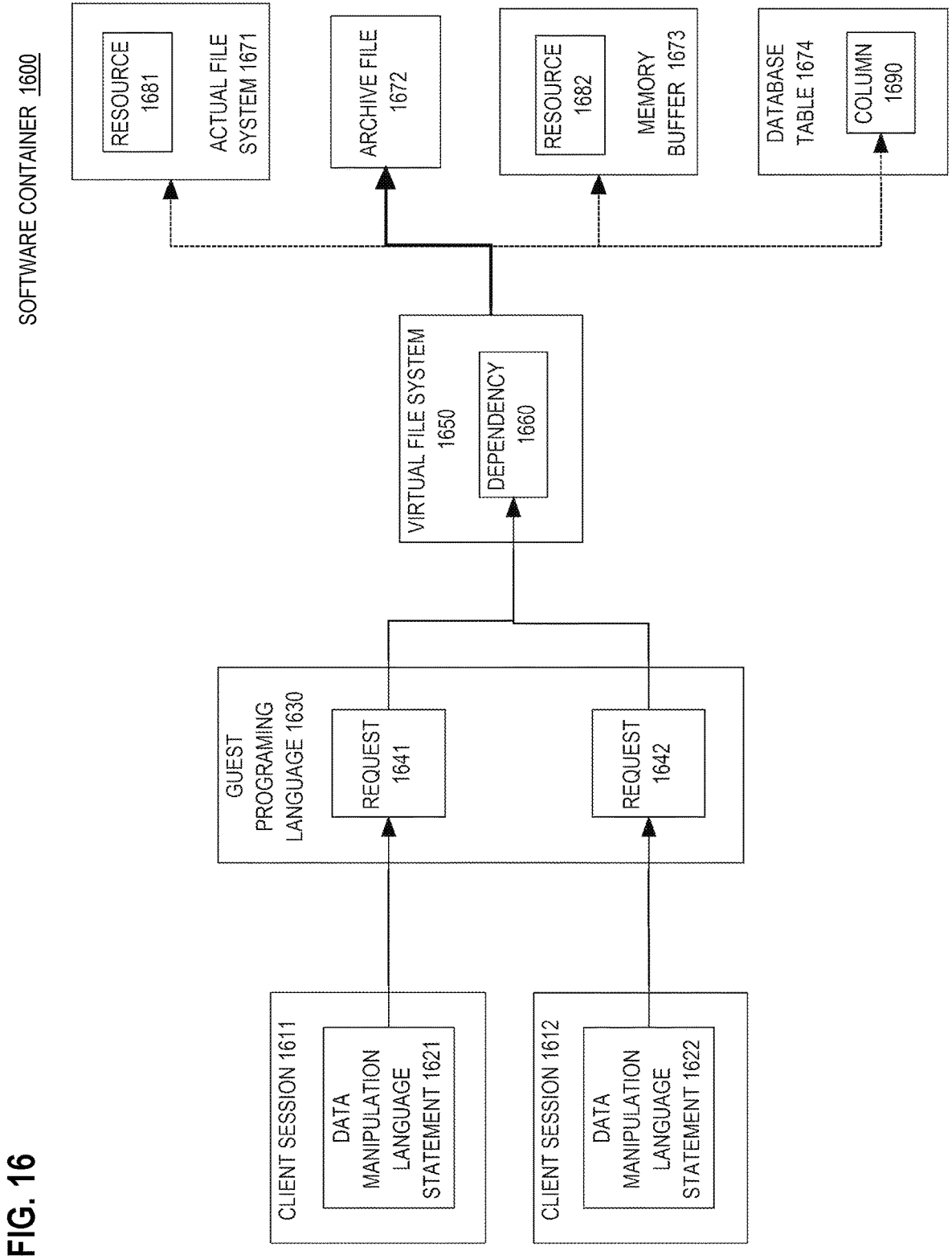
FIG. 16 is a block diagram that depicts an example DBMS that transparently retrieves resources from virtual filesystems to generalize alternate storage mechanisms.

FIG. 16 is a block diagram that depicts example software container 1600, in an embodiment. Software container 1600 transparently retrieves resources 1681-1682 from virtual filesystems, such as 1650, to generalize alternate storage mechanisms 1671-1674 as follows. Software container 1600 may be an implementation of DBMS 110. Various embodiments of software containers are discussed earlier herein, including some that do not need a DBMS or DML. Thus, techniques herein that use a DBMS or DML with software container 1600 are presented as part of an exemplary implementation choice that may be absent in other embodiments. Other embodiments may use these described techniques without needing a DBMS nor DML.

Software container 1600 has flexible durable storage of data resources such as deployments (i.e. codebases) of guest modules. Alternate storage mechanisms 1672-1674 provide features that typically are absent from actual filesystems, such as 1671. Those features may support codebase usage in special ways that may be transparent to application developers and clients such as client sessions 1611-1612 as follows. Likewise, software container 1600 may enforce permissions that are orthogonal to actual filesystem 1671. For example, software container 1600 may execute as an operating system (OS) superuser that can access all files of actual filesystem 1671 and yet refuse access by particular database clients such as according to previous data control language (DCL) grants.

For example, a guest module (not shown) may be implemented by one or multiple durable objects of code or data such as runnable scripts, class files, pictures, and/or spreadsheets, such as resources 1681-1682. Such durable objects may be stored as loose (i.e. individual) files, aggregated in monolithic archive files (i.e. libraries), or otherwise subject to bulk storage as follows. Durable objects may be collocated with metadata objects (e.g. manifest or descriptor) that virtual filesystem 1650 may analyze to facilitate resource loading.

The kind and nature of client sessions 1611-1612 depends on the embodiment. Client sessions 1611-1612 encapsulate separate (e.g. with enforced isolation) sequences of client usage that may or may not temporally overlap. In an embodiment, software container 1600 is a RDBMS or other DBMS, and client sessions 1611-1612 are database sessions. In an embodiment, each of client sessions 1611-1612 is remote and has its own separate network or inter-process connection. For example, client sessions 1611-1612 may more or less correspond to a hypertext transfer protocol (HTTP) session and/or the session layer (a.k.a. layer 5) of the open systems interconnection (OSI) network stack. In the shown embodiment, software container 1600 has client sessions 1611-1612. In other embodiments, software container does not need client sessions. For example, software container may receive commands from a queue or a controller that may comingle, obscure, or otherwise lack session boundaries. For example, multiple clients may submit commands to a same queue that software container 1600 depends on without regard for command provenance.

Software container 1600 provides highly dynamic importation (e.g. loading) of resources. Resources are usually imported during initialization of a guest module instance (not shown), such as when client session 1611 first invokes any call specification (not shown) of the module, which is somewhat dynamic. However, resource importation (e.g. require( ) script statement) may occur anytime guest logic of guest programming language 1630 executes. For example, a require( ) invocation may be conditional (e.g. in an if statement) and issued from within a guest subroutine (not shown), which is highly dynamic. In any case, DDL or DML statements such as 1621-1622 may cause loading of guest modules and/or guest objects. For example, DML statements 1621-1622 may issue respective native requests 1641-1642 to import same dependency 1660, such as with require( ) invocations.

Embodiments of software container 1600 that do not need a DBMS may accept commands that are neither DML nor DDL. Thus, DML statements 1621-1622 are exemplary for an implementation choice. In other embodiments, techniques herein may achieve similar use of virtual file system 1650 without a DBMS, DML, nor DDL.

Filesystem implementation backends 1671-1674 are mutually exclusive alternatives, shown with dashed arrows. Software container 1600 may have many virtual filesystems, such as 1650, but each virtual filesystem has only one respective implementation backend. As shown with a solid arrow, virtual filesystem 1650 uses archive file 1672 as its backing store.

For example, virtual filesystem 1650 may resolve dependency 1660 by selecting a resource (not shown) within archive file 1672 that may contain many resources. For example, archive file 1672 may be a (e.g. compressed) zip file, a tape archive (tar) file, or a Java archive (jar) file. In an embodiment, virtual filesystem 1650 extracts that resource from archive file 1672, such as with decompression and according to a manifest (not shown) within archive file 1672 that lists original files contained within archive file 1672.

In an embodiment, virtual filesystem 1650 may directly use the extracted resource. In another embodiment, virtual filesystem 1650 may explode (i.e. unpack) files from within archive file 1672 into an actual filesystem such as 1671. For example, virtual filesystems may be cascaded such that one may delegate to another for features such as unpacking and/or caching. For example, virtual filesystems may be aggregated (e.g. daisy chained) as a set of loading paths, such as a class path or a module path.

As discussed earlier herein, a parser, compiler, and/or interpreter of guest programming language 1630, as part of a multilingual engine (MLE) of software container 1600, may intercept and specially process native requests 1641-1642. For example, native request 1641 may specify a qualified or unqualified name of dependency 1660 that the MLE or guest compiler may analyze to identify a symbolic name of dependency 1660. As discussed earlier herein, a guest virtual environment (not shown) may map the symbolic dependency to an actual guest module instance. For example, dependency 1660 may map to a guest module whose codebase is archive file 1672. Thus, the MLE, the guest virtual environment, and virtual filesystem 1650 may collaborate to dynamically satisfy dependency 1660.

In an embodiment, a virtual filesystem may operate as a resource cache. For example, a virtual filesystem may be implemented by memory buffer 1673 that may cache some or all of a guest module, including resource 1682. For example, virtual filesystem 1650 may explode archive file 1672 into memory buffer 1673. Resource 1682 may be a static resource such as a picture, or may be a computed (i.e. dynamically generated) guest object, such as a JavaScript object notation (JSON) data structure that was generated by an initialization script of a guest module.

In an embodiment, an entire guest module or individual resources within that module may each be stored as a large object (i.e. BLOB or CLOB) in column 1690 of database table 1674. Thus, module resources may be administered according to database semantics instead of native filesystem semantics. A virtual filesystem may automatically emit (e.g. generate) DML needed to access database column 1690.

17.0 Example Virtual File System Process

Figure 17:
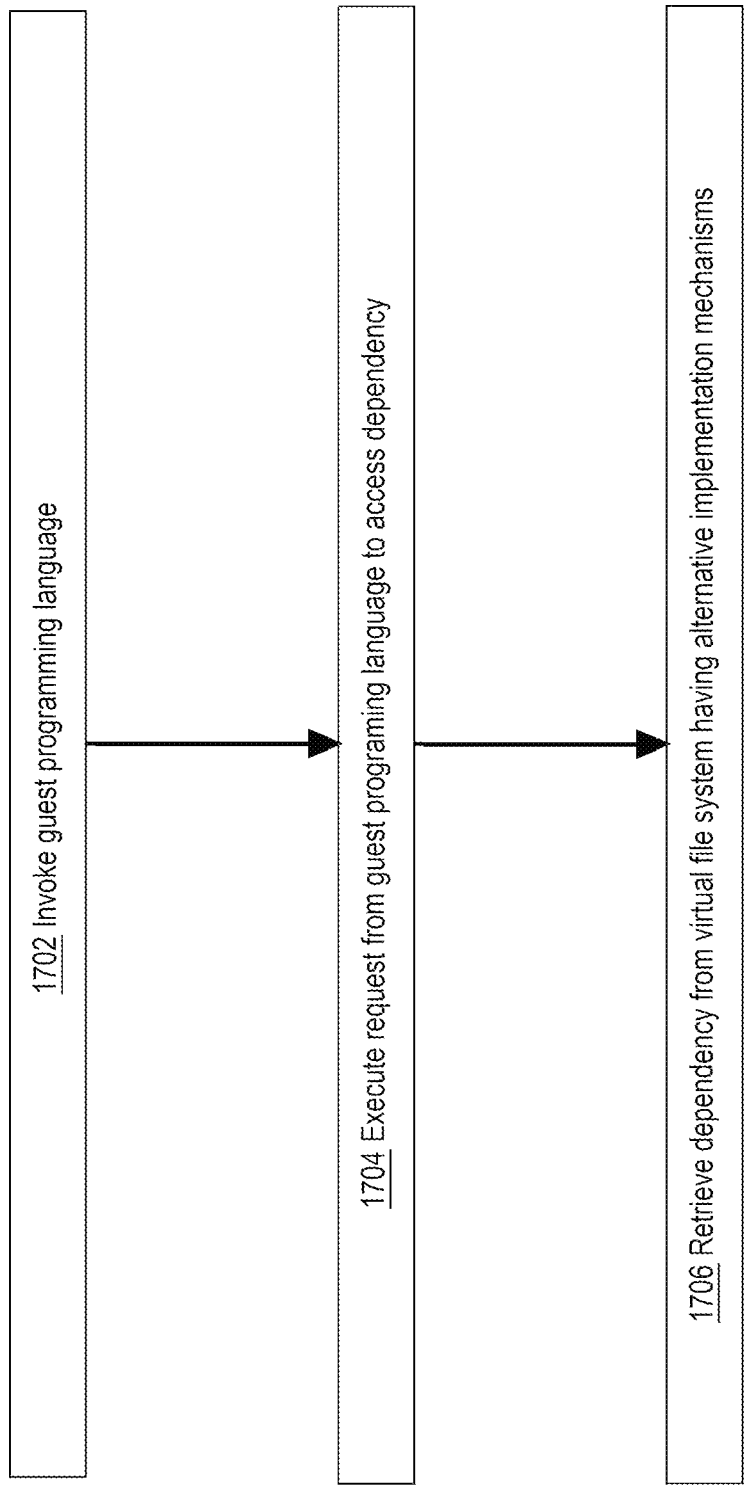
FIG. 17 is a flow diagram that depicts some example activities for a DBMS to retrieve a resource from virtualized storage such as a virtual file system.

FIG. 17 is a flow diagram that depicts example activities for software container 1600 to retrieve a resource, such as 1681-1682, from virtualized storage such as virtual file system 1650 in an embodiment. FIG. 17 is discussed with reference to FIG. 16.

Step 1702 invokes a guest programming language. For example, DML statement 1621 may execute. In step 1704, that guest programing language executes request 1641, such as an import directive, to access dependency 1660 as explained earlier herein.

Satisfaction of dependency 1660 may occur in two phases. In a first phase, the MLE of software container 1600 resolves dependency 1660 to a particular guest module (not shown), such as according to a binding such as contained in a guest virtual environment (not shown). Depending on the scenario, that guest module may or may not already be loaded.

In a second phase, step 1706 retrieves resource 1681 that satisfies dependency 1660. Step 1706 occurs if the resolved guest module is not already loaded, or may sometimes occur even if that guest module already is loaded, as explained later herein.

Step 1706 detects where and how is resource 1681 stored. Since the process of FIG. 17 typically occurs during guest module creation/instantiation, resource 1681 may be guest script(s), in the codebase of the guest module, that may be (e.g. text or class) file(s) in actual file system 1671. Alternatively, dependency 1660 may be satisfied by a resource in any of data stores 1672-1674. Thus, step 1706 detects in which data store is a needed resource kept.

As explained earlier herein, a codebase of a guest module is typically identified by whichever DDL statement created the guest module. Thus, software container 1600 may maintain metadata that describes the guest module, including details such as the location and kind of data store that contains the codebase of the guest module. Whenever that guest module is (re-)instantiated, software container 1600 may consult that metadata to detect where and how is that codebase stored.

A deployment of a guest module may be shared, such as when two database sessions each need their own instance of that guest module. For example, both database sessions may each execute a same guest script to initialize each instance of the guest module. Virtual file system 1650 is a data store adapter that both sessions may share to gain access to a same resource, such as all or part of a codebase of a guest module. As an adapter, virtual file system 1650 hides, from the rest of the MLE of software container 1600, which kind of data store is actually used for the guest module. Thus, virtual file system 1650 provides a uniform façade or interface through which resources may be retrieved without exposing retrieval mechanisms.

Software container 1600 may include virtual file system 1650 within metadata of a guest module. Thus, step 1706 may locate and retrieve a resource for a resolved dependency by accessing virtual file system 1650 that is associated with whichever guest module the dependency resolved to. For example, a DML query may need several dependencies, and the MLE of software container 1600 may resolve those dependencies to particular guest modules and transparently load those guest modules in a uniform and storage-agnostic way, even though each of those guest modules may actually reside in very different data stores.

18.0 Example Implementation

The following is an example implementation that is based on particular implementation choices. For example, the DBMS is a relational DBMS (RDBMS). Likewise, the DDL, DCL, and DML are provided by SQL.

Included in this example implementation are database statements for configuring and operating novel polyglot database components presented in this example implementation and elsewhere herein. In this example implementation, guest components may also be known as MLE components. For example, an MLE module is a guest module. This example implementation demonstrates support for the following languages: SQL, Java, JavaScript, and Python. The MLE used in this example implementation also supports the addition of more guest programing languages.

This example implementation highlights integration between the MLE and respective modularity (e.g. package) frameworks that are native and/or best of breed for the various guest programming languages. For example, guest modules may, by design, be arranged into a hierarchy of subdirectories, and package naming may reflect that hierarchy. For example, guest modules are bound and resolved by name, and such names may reflect that hierarchy. Whereas, other embodiments of an MLE need not impose hierarchy semantics upon names and/or subdirectories.

In an embodiment, virtual file systems, guest virtual environments, and/or other MLE component(s) that support guest modules can directly support hierarchy behaviors/aspects such as name tokenizing, subfolder enumeration, parent folder, case sensitivity, and/or manifest. Also as described above herein and demonstrated below herein, other features of guest native modularity that an MLE may integrate include inter-dependencies, visibility, deferred loading, unzipping, versions, and/or search order.

18.1 Creating MLE Languages

An MLE language should be added to the RDBMS before MLE functions executed in that language can be created and executed. A new MLE language can be added to the database using the CREATE MLE LANGUAGE DDL:

CREATE MLE LANGUAGE MYLANGUAGE;

This creates a schema object with an identifier matching the specified language name (MYLANGUAGE in this case). The DDL statement will register an existing MLE language implementation provided by the MLE drop-in library with the RDBMS dictionary. Instead of relying solely on pre-defined language registrations this DDL gives the user the ability to register his own MLE language implementations with the database.

18.2 Runtime State Isolation

When MLE language code, such as a dynamic MLE snippet or a function exported by an MLE module, is executed in a session, the runtime state associated with the execution is encapsulated in an execution context. Runtime state includes global variables as well as the state of a language environment. An execution context is a standalone, isolated runtime environment for one or multiple MLE languages. All code that shares an execution context has full access to all its runtime state (e.g., any global variables previously defined). Conversely, there is no way for code executing in one execution context to see or modify runtime state in another execution context.

MLE uses execution contexts for function and procedure calls from SQL and PL/SQL. Here, execution contexts separate the runtime state of different users and of different MLE modules.

18.3 Code Management with MLE Modules

MLE language code can be stored persistently as an MLE module. An MLE module is a schema object that contains code written in a single MLE language. An MLE module corresponds to the notion of "library" or "module" in the respective MLE language. For example, a JavaScript MLE module is a JavaScript UMD module.

Code in an MLE module can be used in two different ways:

Functions exported by an MLE module can be published by creating call specifications. MLE call specifications can be called from SQL and PL/SQL in the same way as PL/SQL functions and procedures.

The MLE module may be imported by other MLE code written in the same language. For example, JavaScript code executing in MLE may import a JavaScript MLE module using require( ).

Once MLE supports more languages than JavaScript, MLE modules written in one language may be imported by code written in another language.

MLE provides DDL commands to manage MLE modules in a database (e.g. create, alter, drop).

18.4 Creation of MLE Modules

MLE modules are created in the database using the CREATE MLE MODULE DDL statement, specifying name and source code of the MLE module:

CREATE MLE MODULE scott."jsmodule"
LANGUAGE JAVASCRIPT
AS module.exports.func=function( ) { . . . }

The CREATE MLE MODULE DDL statement is further discussed elsewhere herein.

Each MLE module can only contain code written in a single MLE language. This language is specified in the DDL statement when creating the module (e.g., the above DDL statement creates a JavaScript module). The specified language should be one of the MLE languages added to the database via CREATE MLE LANGUAGE.

The name of the created module can be fully qualified as in the example above, i.e., both the schema (scott) and the name of the created module within the schema ("jsmodule"). If the schema name is omitted, the module is created in the schema of the current user.

The name of the MLE module should be unique within the schema. As with other schema object identifiers, the module name is case-sensitive if enclosed in double quotes. If the enclosing double quotes are left out, the name is implicitly converted to uppercase.

The source code of the MLE module can be specified inline using the AS clause or can be obtained from a BFILE, BLOB, or CLOB.

An MLE module can be updated through replacement. This is done by specifying OR REPLACE in the module creation DDL and has the advantage that object privileges previously granted are still valid after the replacement.

CREATE OR REPLACE MLE MODULE scott."jsmodule"
LANGUAGE JAVASCRIPT
AS module.exports.bafsfunc=new function( ) { . . . }

Users should have the CREATE MLE MODULE privilege to create MLE modules in their own schema, or the CREATE ANY MLE MODULE privilege to create MLE modules in arbitrary schemas.

18.5 Structure of MLE Modules

The structure of an MLE module is language-dependent. For each MLE language, an MLE module corresponds to a code "unit" of that language (e.g., UMD modules for JavaScript, modules or packages for Python). An MLE module can also optionally bundle some or all of the dependencies of the code unit it encapsulates.

The following describes how JavaScript, Python, and Java MLE modules are structured.

18.6 Javascript MLE Modules

JavaScript MLE modules are UMD modules, a standard format for writing modules in JavaScript. UMD modules export functions (or values, more generally) by assigning them to a field of the module.exports object. UMD modules can be imported using the Node.js require( ) function. The require( ) function evaluates the contents of the module and returns the module.exports object, through which the importer can access functions exported by the imported module.

For example, the UMD module in the following logic exports a single function, squareAndAdd( ).

The module text also defines the function square( ) which is used in the implementation of squareAndAdd( ). However, this function is not exported, and is therefore not itself directly callable from code that imports this module.

```
function square(val) {
    return val * val;
}
function squareAndAdd(val1, val2) {
    return square(val1) + square(val2);
}
module.exports.squareAndAdd = squareAndAdd;
```

A UMD modules may itself import other UMD modules using require( ), and may require specific versions (or version ranges) of dependencies to work correctly. Information about all the dependencies of a JavaScript module, including names and versions, is typically contained in the package.json file. These dependencies can be installed using npm install, which reads the package.json file and fetches dependencies from a package registry.

Tools like browserify and webpack can be used to bundle a UMD module as well as all its dependencies into a single UMD module. The bundled module exports the same set of functions as the original module, but additionally inlines the code from all of its dependencies. The require( ) statements for bundled modules are removed, and all calls to their functions are replaced with calls to their inlined code.

JavaScript MLE modules are UMD modules which may bundle some or all of their dependencies. Unbundled dependencies for JavaScript MLE modules (i.e., any modules loaded via calls to require( ) in the deployed module's text) are satisfied via intra-language module imports.

The SIGNATURE clause of a call specification may refer to one of the exported functions of a JavaScript MLE module. When such a call specification is invoked, MLE loads the module in a manner analogous to the require( ) function: the contents of the module are evaluated, and the named function is looked up in the module.exports object and called.

18.7 Python MLE Modules

A Python MLE module contains a Python module or package. Modules and packages are the standard way to encapsulate code in Python, and can be imported by other Python code via the import statement.

A Python module is a collection of statements typically contained in a single source file. For instance, the following logic shows a Python module that defines two functions:

```
def _square(val):
    return val * val
def squareAndAdd(val1, val2):
    return _square(val1) + _square(val2)
```

Python modules do not explicitly export functions and values. Any identifier defined in the text of a Python module is accessible to code that imports it. However, identifier names beginning with an underscore ('_') are treated as private by convention. All other definitions in the module text constitute the public API of the module. When the module is imported, the import statement returns a module object that encapsulates all values (including functions) declared in the module text.

Python packages are a way of further organizing large code bases. Packages can be thought of as directories in the file system that contain Python modules, and may contain other packages. For instance, the contents of the module above could be di-vided into two separate modules (say, exports.py and helpers.py), and placed in a directory (say, pypackage) as follows.

This logic may be helpers.py:

```
def square(val):
    return val * val
```

This logic may be exports.py:

```
from . import helpers
def squareAndAdd(val1, val2):
    return helpers.square(val1) + helpers.square(val2)
```

Components of a package can be imported individually (e.g., import pypackage.exports), or the package itself can be imported (import pypackage). In the latter case, the import statement returns an objects whose contents are dictated by the file init.py at the top level of the package directory hierarchy. For instance, to make only the function squareAndAdd( ) available when the package pypackage is imported, the contents of init.py should resemble the following.

This logic may be init .py:
from .exports import squareAndAdd

The Python ecosystem does not have a direct counterpart to JavaScript's browserify or webpack. Dependencies are resolved at runtime by searching for and loading mod-ules and packages from a module search path. Better encapsulation of an application's dependencies can be achieved by creating a virtualenv. The virtualenv includes all dependencies of an application, and application execution within the virtualenv modifies the module search path so that only the dependency versions installed within the virtualenv are visible. Dependency versions to be installed in a virtualenv are specified via a requirements.txt file, or alternatively a Pipfile in conjunc-tion with the pipenv utility.

A Python MLE module is a zip file that contains a Python module or package, as well as all or some of the dependencies installed in the virtualenv. Bundled dependencies are placed in the .bundleddeps directory at the top level of the deployed zip. The bundled dependencies are placed on the module search path when executing the MLE module. Any dependencies that are not bundled should be satisfied via intra-language module imports.

The SIGNATURE clause of a call specification may refer to any of the functions defined in the Python MLE module:
if the Python MLE module contains a Python module, this includes all functions defined in the module, and
if the Python MLE module contains a Python package, this includes functions defined by the package at the top level (via its init .py file), or by any of its submodules or sub-packages.

Functions in submodules or sub-packages can be referred to using Python's usual dot notation (e.g., exports.squareAndAdd for the example package pypackage discussed above). When such a call specification is invoked, MLE loads the named module or package in a manner analogous to the Python import statement, looks up the named function in the returned module object, and invokes it. Note that call specifications may not refer to functions defined in any of the bundled dependencies.

18.8 Java MLE Modules

Java MLE modules contain a Java module. Java modules are a way of better encapsulating Java code. Specifically, Java modules may contain one or more Java packages. Packages defined in a Java module are internal to the module by default. Only those packages explicitly exported (by marking them as such in the module's module-info) can be accessed from outside the module. For instance, a Java module (say, jmodule) may contain two packages, com.oraclejmodule.dependencies and com.oraclejmodule.exports, each with a single class as follows.

This logic may be Helpers.java:

```
package com.oracle.jmodule.dependencies;
class Helpers {
    public static int square(int value) {
        return value * value;
    }
}
```

This logic may be Exports.java:

```
package com.oracle.jmodule.exports;
import com.oracle.jmodule.dependencies.Helpers;
class Exports {
    public static int squareAndAdd(int value1, int value2) {
        return Helpers.square(value1) +
        Helpers.square(value2);
    }
}
```

Of these, the package com.oracle.jmodule.exports can be exported via the module-info.java file located at the top level of the module:

This may be module-info.java:

```
module jmodule {
    exports com.oracle.jmodule.exports;
}
```

Java modules can require other Java modules. For example, a Java module (say, moduleA) can require another Java module (say, moduleB) by including the appropriate requires directive in its module-info:

```
module moduleA {
    requires moduleB;
}
```

ModuleB should then be present on the module path when ModuleA is executed, and ModuleA has access to any package exported by ModuleB.

A Java MLE module is a zip file containing a Java module as well as some or all of the modules it requires. These bundled dependencies are placed in the .bundleddeps directory at the top level of the deployed zip, and are placed on the module path when the MLE module is executed. Any required modules that are not bundled in should be available via intra-language module import.

The SIGNATURE clause of a call specification may refer to any public static method of a class in an exported package of a Java MLE module. The function should be referred to by its fully qualified name (e.g., com.oracle.jmodule.exports.Exports.squareAndAdd) for the example shown above. When such a call specification is invoked, MLE loads the named class and invokes the specified static method.

18.9 Creation of Call Specifications

Functions exported by deployed MLE modules can be made available for calls from PL/SQL and SQL by creating PL/SQL call specifications for them. These MLE functions can then be called from anywhere where a PL/SQL function or procedure can be called (e.g., in a SQL query, from within a PL/SQL program incl. anonymous blocks, as virtual columns).

Let us take another look at the example of the deployed module jsmodule that was depicted above. MLE module jsmodule exports two functions: the function doNothing( ) takes an input string argument and does nothing, while the function concat( ) takes two string arguments as input and returns the concatenated string as result.

As doNothing( ) does not return anything, a PL/SQL function cannot be created for it. Instead, a PL/SQL procedure is created:
CREATE OR REPLACE PROCEDURE
doNothing(str IN VARCHAR2) AS MLE MODULE jsmodule
SIGNATURE 'doNothing(str string)';

The above call specification creates a PL/SQL procedure named doNothing( ) in the schema of the current user. Executing the function executes the exported function doNothing( ) in the JavaScript module jsmodule. The MLE-specific clause MLE MODULE <module name> specifies the name of the MLE module that exports the underlying MLE language function. The SIGNATURE clause specifies the name of the exported function to call (doNothing( )), as well as its argument types. The types specified in the SIGNATURE clause are specific to the MLE language. MLE functions implemented in JavaScript use TypeScript types in the SIGNATURE clause. In this case, the function accepts a JavaScript string; the PL/SQL VARCHAR2 string is converted to a JavaScript string before invoking the underlying JavaScript implementation.

The other exported function, concat( ) can similarly be used to create a PL/SQL function:
CREATE OR REPLACE FUNCTION concat
RETURN VARCHAR2
AS MLE MODULE jsmodule
SIGNATURE 'concat(str1 string, str2 string)';

The call specification in this case additionally specifies the PL/SQL return type of the created function. The value returned by the JavaScript function concat( ) (of type string) is converted to the RDBMS datatype (VARCHAR2). The created procedures and functions can be called as usual:
SQL> CALL doNothing('unused');
SQL> SELECT concat('Hello,', 'World!') FROM dual;
SELECT
CONCAT('HELLO','World!') FROM DUAL
-----------------------------------------
Hello, World!

18.10 Support for Out and in/Out Parameters

Just like regular PL/SQL functions and stored procedures, MLE functions support IN/OUT and OUT parameters in addition to IN parameters. These are declared as IN/OUT and OUT parameters as usual in the PL/SQL call specification for the MLE function. The handling of these parameters in the underlying MLE language implementation is language-specific.

Since JavaScript does not have the notion of output parameters, the JavaScript implementation instead accepts objects that wrap the parameter value. Concretely, the shape of these wrapper objects is described by the generic interfaces InOut and Out (for IN/OUT and OUT parameters, respectively) as follows.

The InOut<T> Interface:

```
interface InOut<T> {
    value : T;
}
```

The Out<T> Interface:

```
interface Out<T> { value : T;
}
```

For instance, an MLE function that takes a single VARCHAR2 IN/OUT parameter, replaces all occurrences of World with Universe, and returns the number of occurrences of World in the original string:
CREATE OR REPLACE PROCEDURE
substituteWorld(str INOUT VARCHAR2) RETURN NUMBER AS MLE
MODULE inOutParamExample
SIGNATURE 'substituteWorld(str InOut<string>)';

The underlying JavaScript module bar can be implemented as follows:

```
CREATE OR REPLACE MLE MODULE inOutParamExample
LANGUAGE JAVASCRIPT AS
module.exports.substituteworld = function (strObj)
{
    let count = (str.value.match(/World/g) | | [ ]). length;
    str.value = str.value.replace(/World/g, ' Universe');
    return count;
}
```

The SIGNATURE clause of the call specification lists the parameter type of the JavaScript function as InOut<string>. The input VARCHAR2 value is therefore con-verted to a JavaScript string, which is then wrapped in an object and passed to the JavaScript function substituteWorld( ).

18.11 Call Specifications for Javascript MLE Modules

The SIGNATURE clause of a call specification may refer to one of the exported functions of a JavaScript MLE module. When such a call specification is invoked, MLE loads the module in a manner analogous to the require( ) function: the contents of the module are evaluated, and the named function is looked up in the module.exports object and called.

18.12 Call Specifications for Python MLE Modules

The SIGNATURE clause of a call specification may refer to any of the functions defined in the Python MLE module:
if the Python MLE module contains a Python module, this includes all functions defined in the module, and
if the Python MLE module contains a Python package, this includes functions defined by the package at the top level (via its init .py file), or by any of its submodules or sub-packages.

Functions in submodules or sub-packages can be referred to using Python's usual dot notation (e.g., exports.squareAndAdd for the example package pypackage discussed above). When such a call specification is invoked, MLE loads the named module or package in a manner analogous to the Python import statement, looks up the named function in the returned module object, and invokes it. Note that call specifications may not refer to functions defined in any of the bundled dependencies.

18.13 Call Specifications for Java MLE Modules

The SIGNATURE clause of a call specification may refer to any public static method of a class in an exported package of a Java MLE module. The function should be referred to by its fully qualified name (e.g., com.oracle.jmodule.exports.Exports.squareAndAdd) for the example shown above. When such a call specification is invoked, MLE loads the named class and invokes the specified static method.

18.14 Module Metadata

MLE modules may carry optional metadata in the form of a version string and free-form JSON-valued metadata. Both kinds of metadata are purely informational and do not influence the behavior of MLE. When creating an MLE module, a version string can be specified:

CREATE MLE MODULE scott."validator"
LANGUAGE JNVASCRIPT
VERSION '10.11.0'
AS module.exports.func=function( ) { . . . }

JSON metadata for an MLE module can be set or replaced using the ALTER MLE MODULE DDL:

ALTER MLE MODULE mymodule SET METADATA
<json-valued-metadata>

MLE does not fix a particular usage of the JSON metadata field.

18.15 Run-Time State Isolation for MLE Call Specifications

PL/SQL calls to MLE functions via call specifications are executed in execution contexts determined by the MLE module, and by the user on whose behalf the call is executed. In a session, MLE uses a dedicated execution context for each MLE module that is called from SQL or PL/SQL. MLE furthermore separates execution contexts for MLE modules by user. All SQL or PL/SQL calls on behalf of the same user to MLE functions exported by the same module are executed in the same execution context for the duration of a session. Execution contexts for a MLE module are created lazily, when the user invokes a function exported by the module from SQL or PL/SQL for the first time in the session.

Hence, the runtime state of MLE modules executing on behalf of different users and with different privilege levels is completely separated. Also, the runtime state of separate MLE modules being called from SQL or PL/SQL is completely separated.

This is best illustrated through an example having two MLE modules, ModuleA and ModuleB. ModuleA exports two functions, func1( ) and func2( ) while ModuleB exports a single function, func3( ) (signatures abbreviated):

CREATE MLE MODULE ModuleA LANGUAGE
  JAVASCRIPT AS . . . ;
CREATE FUNCTION func1( . . . ) RETURNS . . . AS
  MLE MODULE ModuleA SIGNATURE 'func1( . . . )';
CREATE FUNCTION func2( . . . ) RETURNS . . . AS
  MLE MODULE ModuleA SIGNATURE 'func2( . . . )';
CREATE MLE MODULE ModuleB LANGUAGE
  JAVASCRIPT AS . . . ;
CREATE FUNCTION func3( . . . ) RETURNS . . . AS
  MLE MODULE ModuleB SIGNATURE 'func3( . . . )';

All calls to func1( ) and func2( ) from SQL or PL/SQL executed on behalf of User1 use one execution context, while calls to the same functions from User2 use a separate execution context. Likewise, calls to func3( ) by User1 use a separate execution context from calls to func1( ) and func2( ) since func3( ) is exported by a different MLE module (ModuleB).

Thus, if PL/SQL call specifications for functions exported by an MLE module are declared (e.g. DDL) as definer's rights, there is a single execution context for the module in a session, since all execution happens with the rights of the definer. For invoker's rights call specifications, on the other hand, there will be a separate execution context per calling user.

Note that if one MLE module (say ModuleB) is imported by another MLE module (say ModuleA), code from ModuleB executes in the same execution context as ModuleA. In this case, ModuleB's code is loaded in the execution context of ModuleA.

18.16 Inter MLE Module Imports

Functions exported by MLE modules can be called from SQL and PL/SQL using call specifications. At the same time, the functionality in an MLE module can be re-used by other MLE language code outside of the MLE module itself. MLE language code in an existing execution context can import the code of an MLE module in the same language using the language's native import mechanism.

The following is a JavaScript MLE module scott.hello that exports one function format:

```
CREATE MLE MODULE scott."hello"
LANGUAGE JAVASCRIPT AS
    module.exports.format = function(person) {
        return 'Hello, ' + person + '!'
    }
```

Using a call specification, MLE module scott.hello can be used directly from SQL and PL/SQL:

CREATE FUNCTION scott.hello_format(name IN VARCHAR2)
  RETURNS VARCHAR2 AS MLE MODULE scott.
  "hello" SIGNATURE 'format';
SELECT scott.hello_format('Larry') FROM dual;

The query returns the string 'Hello, Larry!'.

The MLE JavaScript runtime provides the familiar JavaScript function require( ) to import JavaScript MLE modules. When the call require('hello') is execut-ed, MLE resolves the import name 'hello' to the MLE module schema object scott.hello, loads the source attached to scott.hello as a UMD module and returns the result.

Import names are resolved to MLE module schema objects using the environment mechanism described elsewhere herein. In the same way, the functionality of MLE module scott.hello can be used by another MLE module. Here, code in MLE module scott.mymodule imports scott.hello:

```
CREATE MLE MODULE scott."mymodule"
LANGUAGE JAVASCRIPT
ENV scott."myenv" AS
var hello = require('hello'); module.exports.printHello =
function(person) {
    console.log(hello.format(person) + ' (call spec)');
};
CREATE PROCEDURE scott.print_hello(name IN VARCHAR2) AS
MLE MODULE scott."mymodule" SIGNATURE 'printHello';
```

The import name 'hello' is resolved to the MLE module schema object scott.hello using the environment scott.myenv. Resolution of import names through environments is described elsewhere herein.

The call specification scott.print hello can then be called from PL/SQL:

```
BEGIN
    scott.print_hello('Larry');
END;
```

Executing this PL/SQL block produces the following output:

Hello, Larry! (call spec)

18.17 Module Imports and Execution Contexts

When code of an MLE module is imported, it runs in the same execution context as the importing code. In the first scenario, function format exported by MLE module hello is called from SQL. Here, the code of MLE module hello runs in a dedicated execution context. In the second scenario, the code of MLE module hello is imported by MLE module mymodule. Here, function printHello exported by module mymodule is called from PL/SQL. Hence, in line with REF, mymodule executes in a dedicated execution context. Module hello, on the other hand, is imported from mymodule into the existing execution context.

Usage of execution contexts by MLE can be summarized as follows:
- Calls from SQL and PL/SQL to functions exported by an MLE module are executed in a dedicated execution context for the MLE module and for the user on whose behalf the call is executed.
- MLE modules imported by MLE language code in an existing execution context run in the same execution context as the importing code. Code in an imported module runs with the same privileges as the importing code.

18.18 Context Environments

In this example implementation, an environment or context environment may be a guest virtual environment. MLE uses execution contexts to execute MLE language code. As described earlier, execution contexts are used both to execute dynamic MLE snippets, and to execute calls to PL/SQL call specifications. MLE allows to configure certain properties of execution contexts via environments. An execution context can be con-figured to use a specific environment. The execution context is then set up with all properties defined in the environment. Concretely, environments allow to set language options in order to customize the runtime of MLE languages in an execution context, and enable specific MLE modules to be imported in an execution context and manage dependencies.

The following describes how environments are created and how environments are used to define properties of dynamic MLE contexts as well as execution contexts for MLE modules. Also described is how to use environments to configure language options and to enable MLE module imports. Environments are first-class schema objects that can be managed on their own and reused across multiple execution contexts. An environment can be created using the CREATE MLE ENV DDL statement. It can be created as a fresh, empty environment:

CREATE MLE ENV scott."myenv";

Alternatively, an environment can also be created as an independent copy of an existing environment.

CREATE MLE ENV scott."myenv" CLONE <other-env>;

Note that when cloning an environment, subsequent modifications to the original environment are not propagated to the clone environment. Cloning of environments is particularly useful to create a modified version of the default environment provided by MLE.

Context properties as defined in an environment cannot be modified for existing execution contexts. Only the environment settings at the moment of context creation are effective for an execution context. Contexts for MLE module calls from SQL or PL/SQL are created implicitly on demand.

18.19 Default Environment

MLE provides a default environment object that specifies default properties of execution contexts. If an environment is not specified explicitly on an MLE module, the default environment is used implicitly. The default environment sets default language options. It also provides import map-pings for the built-in MLE modules described elsewhere herein.

On the database level, the default environment is defined using the initialization parameter MLE_DEFAULT_ENV. The parameter specifies the name of the schema object of the default environment. Access to the default environment needs to be granted to PUBLIC. The parameter MLE_DEFAULT_ENV can be modified for the duration of a session using the ALTER SESSION SET MLE_DEFAULT_ENV=< . . . > command. Like any initialization parameter, the current effective setting for MLE_DEFAULT_ENV can be obtained using the SHOW PARAMETERS command or the v$parameters view. Beyond the first release of MLE, future releases might configure a new default environment that sets new language options or brings new built-in MLE modules, for example. However, this will only provide a new environment object and change the default setting for MLE_DEFAULT_ENV. The schema objects for previous default environments will remain in place. Existing MLE modules refer to concrete schema objects and are not affected by new default environments.

18.20 Specifying Environments on MLE Modules

An MLE module that is called from PL/SQL via call specifications is executed in its own execution context. Each MLE module specifies the environment that defines the properties of the execution context when called from PL/SQL. Note, however, that the environment defined for a MLE module is not used when the MLE module is imported by another MLE module.

The environment for an MLE module is defined when creating a MLE module using the CREATE MLE MODULE DDL statement:

CREATE MLE MODULE mymodule LANGUAGE JAVASCRIPT
ENV scott."myenv" AS . . . ;

If the ENV clause is omitted, the default environment is used. When an MLE module is created, the environment (either specified explicitly or implicitly) is stored as part of the module definition. If an MLE module is created without specifying an environment explicitly, choosing a new default environment on the instance or session level is not effective for the MLE module. This allows MLE to provide a new default environment in future releases without breaking application code. Existing MLE modules need to be modified to use a new environment explicitly. The environment of an existing MLE module object can be changed using the ALTER MLE MODULE command:

ALTER MLE MODULE mymodule ENV myenv

18.21 Language Options

MLE allows to customize the runtime of MLE languages by setting language options. Language options can, for example, enable or disable builtins not covered by a language standard. They can also be used to select a specific version of a language standard. MLE language options can map directly to GraalVM language options. However, MLE allows only a white-listed subset of GraalVM language options that are considered stable, user-facing and supported.

Language options are configured for execution contexts via language options on environments Each execution context that is created sets all language options defined in its environment. Language options are defined on environments using the ALTER MLE ENV DDL statement. For example, an existing environment can be modified to enable JavaScript "strict" mode configuring the Graal JavaScript language option j s. strict as follows:

ALTER MLE ENV scott."myenv" SET LANGUAGE OPTIONS 'js.strict=true';

The SET LANGUAGE OPTIONS clause replaces existing language options configured on an environment. Multiple language options can be set as a comma-separated list of <option-name>=<option-value> pairs.

18.22 Import Resolution

The code of an MLE module can be imported in an existing execution context. Going back to the example above that imports another MLE module using the JavaScript require( ) function. In order to execute the call to require( ) MLE needs to resolve the import name 'hello' to the schema object scott.hello. This requires a mapping from import names to schema objects.

Environments map import names to MLE module schema objects. An environment defines the MLE modules that can be imported in an execution context using the environment, and the import names with which they can be imported. Concretely, assume an environment that contains a mapping from the import name 'hello' to a MLE module scott.hello. In any execution context that uses this environment, JavaScript code can execute require('hello') and the UMD module contained in scott.hello is loaded. Import mappings can be added to an environment using the ALTER MLE ENV DDL statement. For the example above, the import name 'hello' is added to the environment defined above:

ALTER MLE ENV scott."myenv"
ADD IMPORT hello MODULE scott."hello";

Import names in an environment have to be unique. If an import name is added to an environment that already contains the name, an error is thrown. An environment defines the complete set of MLE modules that can be imported in a given execution context. The environment has to include all transitive dependencies explicitly.

Environments decouple import names from the actual MLE module. Import names defined in the environment can be redirected to new MLE modules by updating the environment. This allows to bring in new versions of dependencies. It is the responsibility of the owner of the environment to ensure that new versions of dependencies are compatible with code using the environment. Using the ALTER MLE ENV com-mand, import mappings can be removed from an environment or modified to point to a different MLE module.

18.23 Import Names for Javascript

A JavaScript MLE module is a single UMD module In the MLE JavaScript runtime, the environment defines a search path for UMD modules: any import name defined in the environment that maps to a JavaScript MLE module (i.e. a UMD module) can be resolved with require. For example, executing require('validator') in the MLE JavaScript runtime first consults the environment of the execution context to look up the mapping for the import name validator. If the mapping refers to a JavaScript MLE module (e.g. scott.validator), the UMD module contained in that MLE module is retrieved, loaded by a UMD mod-ule loader and the resulting value is returned. If the mapping for the import name validator either does not exist or refers to a MLE module in a different MLE language, a PL/SQL runtime error is thrown.

18.24 Module Imports for Python

A Python MLE module is either a single Python module or a Python package. On creation of an execution context, the virtual environment is used as follows: for all mappings in the virtual environment that refer to Python MLE module, the code unit (i.e. a .py module or a .zip packed package) is extracted and placed in a directory in the execution context's virtual file system under the import name used in the mapping. Subsequently, the sys.path search path of the Python engine is ex-tended with all such directories. Hence, resolution of names on Python import works according to the regular Python rules based on sys.path.

18.25 Built-in MLE Modules

MLE provides built-in modules. A prominent example is the MLE SQL driver. MLE can handle built-in modules similarly to user defined MLE modules, adopting the same import mechanism. The only difference is that built-in modules are associated with the sys schema.

18.26 Creating MLE Languages

A new MLE language can be added to the database using the CREATE MLE LANGUAGE DDL:

CREATE MLE LANGUAGE [<schema>.]MYLANGUAGE;

The added language should be supported by the MLE version included with the database. MLE language objects are created in a distinct MLE namespace. Creating a new MLE language in one's own schema requires the CREATE MLE LANGUAGE privilege, while creating a new MLE language in an arbitrary schema requires the CREATE ANY MLE LANGUAGE privilege.

18.27 Dropping MLE Languages

An MLE language can be dropped from the database using the DROP MLE LANGUAGE DDL:

DROP MLE LANGUAGE [<schema>.]MYLANGUAGE;

Dropping an MLE language in one's own schema requires the DROP MLE LANGUAGE privilege, while dropping an MLE language in an arbitrary schema requires the DROP ANY MLE LANGUAGE privilege.

18.28 Managing Environments

A environment can be created using the CREATE MLE ENV DDL statement. It can be created either as a fresh, empty environment, or by cloning an existing environment. Cloning an environment creates an independent copy that is not affected to subsequent changes to the original environment. An existing environment can be dropped using the DROP MLE ENV DDL statement as follows.

DROP MLE ENV [<schema>.]<name>;

An existing environment can be modified using the ALTER MLE ENV DDL statement. Mappings for import names can be added, removed or altered. Additionally, language options can be set.

The ADD IMPORT clause adds a new mapping from an import name to a MLE module schema object. If the environment already contains the import name, an error is thrown.

The DROP IMPORT clause removes an import name from the environment. If the environment does not contain the specified import name, an error is thrown.

The ALTER IMPORT modifies an import mapping such that the import name refers to a different MLE module schema object. If the environment does not contain the import name, an error is thrown.

The LANGUAGE OPTIONS clause on an MLE environment specifies language options to be set for all execution contexts created with this environment. Language options are specified as a string literal consisting of comma-separated key-value pairs. Language options are only parsed at runtime when an execution context is created using the MLE environment. If at context creation the language options string turns out to be invalid (invalid format, unsupported options), an error is thrown.

18.29 Creating MLE Modules

An MLE module is created using the CREATE MLE MODULE DDL:

```
CREATE [ OR REPLACE ] MLE MODULE
[<module-schema>.]<name>
LANGUAGE [<language-schema>.]<mle-language> [ ENV
[<language-schema>.]<mle-env> ]
[ VERSION '<version-string>' ]
{USING
{BFILE(<directory object name>,<server file name>) |
{CLOB|BLOB|BFILE} <selection clause>} |
AS <module text>}
```

The CREATE OR REPLACE clause specifies that a new MLE module should be created (CREATE) or an existing one replaced (CREATE OR REPLACE).

The CREATE MLE MODULE (without the REPLACE clause) throws an error if an MLE module with the given name already exists. With CREATE OR REPLACE MLE MODULE, the existing module is replaced if it exists, and a new one created otherwise. When an MLE module is replaced, privileges to it do not need to be re-granted.

A user needs the CREATE MLE MODULE privilege to create or replace an MLE module in their own schema, and the CREATE ANY MLE MODULE privilege to create or replace an MLE module in another user's schema.

The name of the module to be created can be fully qualified, i.e., include both the schema, and the name of the created module within that schema. If the schema is not specified, the module is created in the current user's schema. <module-schema>, <name>, <language-schema>, and <mle-language> are automatically converted to uppercase unless enclosed in double quotation marks. Like MLE languages, MLE modules are created in the MLE namespace.

The LANGUAGE clause specifies the MLE language of the created module. The specified language should be one of the languages created via the CREATE MLE LANGUAGE DDL. An error is thrown if an unsupported MLE language is used.

The optional ENV clause specifies the MLE environment of the created module. If the specified environment schema object does not exist, an error is thrown.

The optional VERSION clause specifies a version string for the MLE module.

The USING clause enables creating MLE modules from code contained in CLOBs, BLOBs, or BFILEs.

The BFILE clause specifies the directory (<directory object name>) and file-name (<server_file_name>) of the file holding the contents of the MLE module to be deployed. The directory object should have been already created using, e.g., the CREATE DIRECTORY statement.

The CLOB|BLOB|BFILE clause specifies a subquery whose result should be a single row and column of the specified type (CLOB, BLOB, or BFILE) that holds the contents of the MLE module to be deployed. The CLOB option is available only if the deployed MLE module only contains textual data. This is true for JavaScript, the only MLE language currently supported, but may not be true for other MLE languages added in the future. For MLE modules contained in BLOBs and BFILEs, any textual data is assumed to be encoded in the Database Character Set.

The AS clause is used to specify the contents of the deployed MLE module as a sequence of characters inlined in the DDL statement. As with CLOBs, the AS clause is only available when the source of the MLE module contains only textual data. The character sequence should not be encapsulated in quotes. Instead, the character sequence is delimited by the end of the DDL statement only.

A previously deployed MLE module is dropped using the DROP MLE MODULE DDL:

DROP MLE MODULE [<schema>.]<name>

The DROP statement specifies the name, and optionally the schema of the module to be dropped. If a schema is not specified, the schema of the current user is assumed. The DROP MLE MODULE statement raises an error if the module to be dropped does not exist.

Attributes of a deployed MLE module can be assigned or altered via the ALTER MLE MODULE DDL:

ALTER MLE MODULE [<schema>.]<name> SET {ENV <mle-env>|METADATA <json>}

The ALTER MLE MODULE statement specifies the name, and optionally the schema, of the module to be altered. If a schema is not specified, the schema of the current user is assumed. The ALTER MLE MODULE statement raises an error if the module does not exist, or if an invalid attribute is specified.

The SET ENV clause configures a new environment for the MLE module. Any execution contexts created subsequently for the MLE module are configured according to the new environment. An error is thrown under the following circumstances:

If the specified environment does not exist, an error is thrown.

If the environment does not reside in the same schema as the MLE module being altered, an error is thrown.

18.30 Creation of MLE Call Specifications

Functions exported by deployed MLE modules can be used to create PL/SQL call specifications that can be called from all the places that regular PL/SQL functions and procedures can be called from. Creation of these call specifications uses the familiar CREATE FUNCTION and CREATE PROCEDURE syntax with some MLE-specific elements:

```
CREATE [ OR REPLACE ] {FUNCTION | PROCEDURE}
[<schema>.]<call_spec_name> [(param_declaration[,] ...)
]
[RETURN datatype]
[{invoker_rights_clause | DETERMINISTIC |
parallel_enable_clause | result_cache_clause}]
{ AS | IS } MLE MODULE [<schema>.]<module_name> SIGNATURE
'<function_name_in_module>[(
mle_param_declaration)]';
```

Most components of the CREATE FUNCTION and CREATE PROCEDURE statements have the same semantics as their counterparts when creating a PL/SQL UDF or stored procedure:

The OR REPLACE specifies that the function should be recreated if it already exists. This clause can be used to change the definition of an existing function without dropping, re-creating, and re-granting object privileges previously granted on the function. Users who had previously been granted privileges on a redefined function/procedure can still access the function without being re-granted the privileges.

The schema specifies the schema that will contain the call specification. If the schema is omitted, the call specification is created in the schema of the current user.

The call_spec_name specifies the name of the call specification to be created. Call specifications are created in the default namespace, unlike MLE modules and MLE languages that use the MLE namespace.

The param_declaration specifies the call specification's parameters.

The RETURN datatype is only used for UDFs, and specifies the data type of the return value of the function. The return value can have any data type supported by PL/SQL. Only the data type is specified; length, precision, or scale information should be omitted. The invoker_rights_clause specifies whether a function is invoker's or definer's rights.

The AUTHID CURRENT_USER creates an invoker's rights function, i.e., the function executes with the privileges of the CURRENT_USER The AUTHID DEFINER creates a definer's rights function, i.e, the function/procedure executes with the privileges of the owner of the schema in which the function/procedure resides, and external names resolve in that schema. This is the default.

The DETERMINISTIC is only used for UDFs, and indicates that the function returns the same result value whenever it is called with the same values for its parameters. As with PL/SQL functions, this clause should not be used for functions that accesses the database in any way that might affect the return result of the function. The results of doing so will not be captured if the database chooses not to re-execute the function.

The parallel_enable_clause is only used for UDFs, and is an optimization hint indicating that the function can be executed from a parallel execution server of a parallel query operation.

The MLE MODULE and SIGNATURE clauses are MLE-specific as follows. The MLE MODULE clause specifies the deployed MLE module that exports the underlying MLE language function for the call specification. The provided <module_name> is the name of the deployed MLE module that exports the MLE language function specified in the SIGNATURE clause, and may or may not be fully qualified. The specified module should always be in the same schema as the call specification being created. An error is thrown if the specified MLE module either does not exist or is in a different schema from the created call specification.

The SIGNATURE clause contains all the information necessary for mapping the MLE function created by this call specification to a particular function exported by the specified MLE module. In particular, it includes three pieces of information:

function_name_in_module specifies the name of the exported function in the MLE module mle_param_declaration specifies the MLE language parameter types (as opposed to the PL/SQL parameter types) for the function (Optional)

function_name_in_module can include any alphanumeric characters as well as underscores ('_') and periods ('.').

Note that the parsing and resolution of the SIGNATURE clause happens lazily when the MLE function is executed for the first time. It is only at this point that any resolution or syntax errors in the SIGNATURE clause are reported, and not when the call specification is created.

The mle_param_declaration has the following form:
mle_param_declaration::=[<argument name><MLE-language-type>[,] . . . ]

The MLE-language-type can either be a built-in type of the MLE language (e.g., string or number for JavaScript) or a type provided by MLE (e.g., OracleNumber or OracleDate).

The mle_param_declaration can be left out entirely from the SIGNATURE clause. In this case, the default PL/SQL-MLE language type mappings are used. The encoding used to specify the SIGNATURE clause should be the same as the database character set.

19.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

19.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
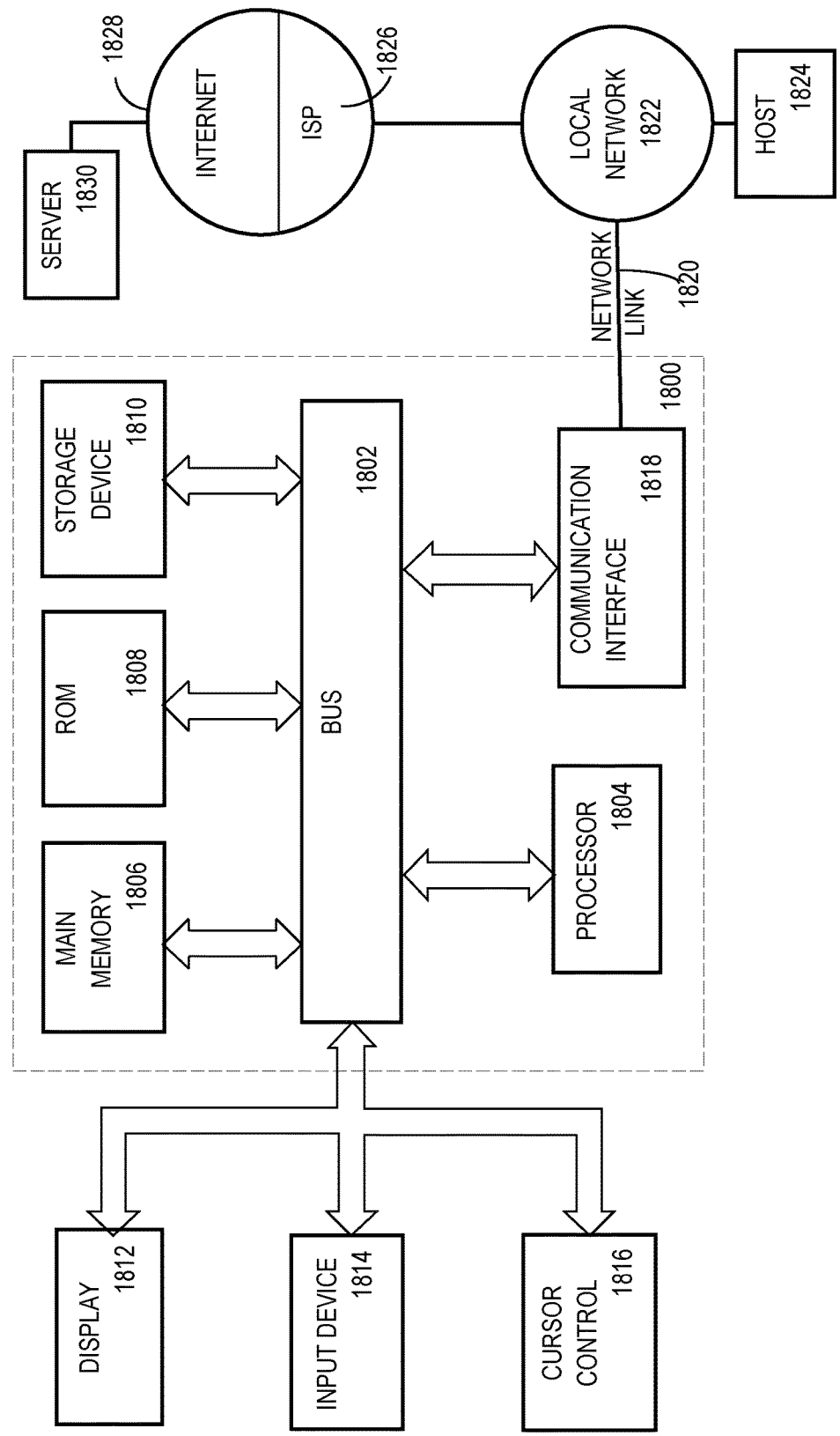
FIG. 18 is a block diagram that illustrates a computer system upon which an embodiment of the invention may be implemented.

For example, FIG. 18 is a block diagram that illustrates a computer system 1800 upon which an embodiment of the invention may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or solid-state drive is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1810. Volatile media includes dynamic memory, such as main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

Software Overview

Figure 19:
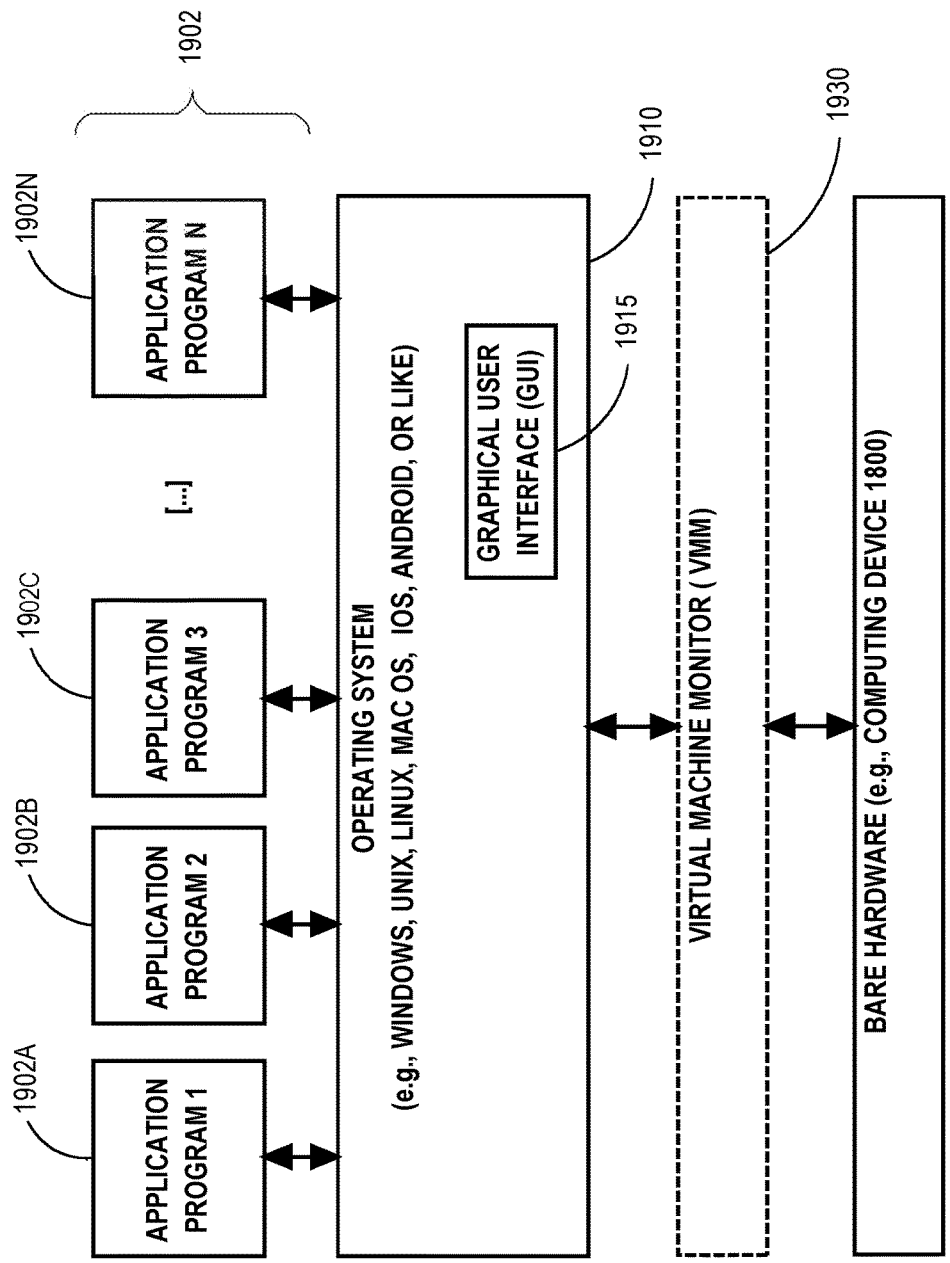
FIG. 19 is a block diagram that illustrates a basic software system that may be employed for controlling the operation of a computing system.

FIG. 19 is a block diagram of a basic software system 1900 that may be employed for controlling the operation of computing system 1800. Software system 1900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1900 is provided for directing the operation of computing system 1800. Software system 1900, which may be stored in system memory (RAM) 1806 and on fixed storage (e.g., hard disk or flash memory) 1810, includes a kernel or operating system (OS) 1910.

The OS 1910 manages low-level aspects of computer operation, including managing execution of processes, memory allocation, file input and output (I/O), and device I/O. One or more application programs, represented as 1902A, 1902B, 1902C . . . 1902N, may be "loaded" (e.g., transferred from fixed storage 1810 into memory 1806) for execution by the system 1900. The applications or other software intended for use on computer system 1800 may also be stored as a set of downloadable computer-executable instructions, for example, for downloading and installation from an Internet location (e.g., a Web server, an app store, or other online service).

Software system 1900 includes a graphical user interface (GUI) 1915, for receiving user commands and data in a graphical (e.g., "point-and-click" or "touch gesture") fashion. These inputs, in turn, may be acted upon by the system 1900 in accordance with instructions from operating system 1910 and/or application(s) 1902. The GUI 1915 also serves to display the results of operation from the OS 1910 and application(s) 1902, whereupon the user may supply additional inputs or terminate the session (e.g., log off).

OS 1910 can execute directly on the bare hardware 1920 (e.g., processor(s) 1804) of computer system 1800. Alternatively, a hypervisor or virtual machine monitor (VMM) 1930 may be interposed between the bare hardware 1920 and the OS 1910. In this configuration, VMM 1930 acts as a software "cushion" or virtualization layer between the OS 1910 and the bare hardware 1920 of the computer system 1800.

VMM 1930 instantiates and runs one or more virtual machine instances ("guest machines"). Each guest machine comprises a "guest" operating system, such as OS 1910, and one or more applications, such as application(s) 1902, designed to execute on the guest operating system. The VMM 1930 presents the guest operating systems with a virtual operating platform and manages the execution of the guest operating systems.

In some instances, the VMM 1930 may allow a guest operating system to run as if it is running on the bare hardware 1920 of computer system 1900 directly. In these instances, the same version of the guest operating system configured to execute on the bare hardware 1920 directly may also execute on VMM 1930 without modification or reconfiguration. In other words, VMM 1930 may provide full hardware and CPU virtualization to a guest operating system in some instances.

In other instances, a guest operating system may be specially designed or configured to execute on VMM 1930 for efficiency. In these instances, the guest operating system is "aware" that it executes on a virtual machine monitor. In other words, VMM 1930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
executing a data definition language (DDL) statement, wherein:
said executing the DDL statement causes copying or uploading, into a database management system (DBMS), one or more files that provide an implementation of a guest programing language, and the one or more files contain at least one selected from a group consisting of a parser for the guest programing language and a grammar for the guest programing language;
executing a data manipulation language (DML) statement, including performing:
an invocation of the guest programing language in the DBMS, and
at least one selected from the group consisting of: a Futamura projection, just in time compilation (JIT) of a subroutine after invocation of the subroutine, and generation of speculative code that has one or more deoptimization points.

2. The method of claim 1 further comprising binding, in a database dictionary of the DBMS, a name of the guest programing language to said implementation of the guest programing language.

3. The method of claim 1 wherein said invocation of the guest programming language in the DBMS comprises an invocation of a subroutine defined in a database dictionary of the DBMS, wherein the subroutine is selected from the group consisting of: a stored procedure and a user defined function (UDF).

4. The method of claim 1 wherein:
the method further comprises receiving the DDL statement from a remote client computer;
said executing the DDL statement causes uploading said one or more files from the remote client computer to the DBMS.

5. The method of claim 1 wherein said JIT of the subroutine comprises JIT of less than the whole of the subroutine.

6. A method comprising:
executing a single data definition language (DDL) statement to define a plurality of subroutines for a guest programming language in a database management system (DBMS);
executing a second DDL statement to register a particular subroutine of the plurality of subroutines as a user defined function (UDF) or a stored procedure in the DBMS, wherein said second DDL statement to register the particular subroutine comprises a designation of a user account to switch to during later invocation of the particular subroutine; and
executing a data manipulation language (DML) statement to invoke the particular subroutine in the DBMS.

7. The method of claim 6 wherein:
said single DDL statement to define the plurality of subroutines for the guest programming language comprises a name of the guest programming language;
said executing said single DDL statement to define the plurality of subroutines comprises resolving the name of the guest programming language in a database dictionary of the DBMS.

8. The method of claim 6 wherein:
said single DDL statement to define the plurality of subroutines comprises a name of a new guest module;
said executing said single DDL statement to define the plurality of subroutines comprises:
generating the new guest module, and
binding, in a database dictionary of the DBMS, the name to the new guest module.

9. The method of claim 8 further comprising executing a data control language (DCL) statement to grant access to the new guest module.

10. The method of claim 6 further comprising executing a third single DDL statement to replace said plurality of subroutines for the guest programming language in the DBMS.

11. The method of claim 6 wherein the user account comprises a user account that executed said single DDL statement to define the plurality of subroutines.

12. The method of claim 6 wherein said second DDL statement to register the particular subroutine comprises for the particular subroutine, at least one selected from the group consisting of an indication of idempotency and an indication of thread safety.

13. The method of claim 6 wherein:
said second DDL statement to register the particular subroutine comprises for the particular subroutine, arguments directions including at least out;
the guest programming language does not natively support multiple arguments directions.

14. The method of claim 6 wherein said register the particular subroutine comprises generating a mapping from argument types for the particular subroutine to datatypes that are native to said DML.

15. One or more non-transitory computer-readable media storing instructions that, when executed by one or more processors, cause:
executing a data definition language (DDL) statement, wherein:
said executing the DDL statement causes copying or uploading, into a database management system (DBMS), one or more files that provide an implementation of a guest programming language, and
the one or more files contain at least one selected from a group consisting of a parser for the guest programming language and a grammar for the guest programming language;
executing a data manipulation language (DML) statement, including performing:
an invocation of the guest programming language in the DBMS, and
at least one selected from the group consisting of: a Futamura projection, just in time compilation (JIT) of a subroutine after invocation of the subroutine, and generation of speculative code that has one or more deoptimization points.

16. One or more non-transitory computer-readable media storing instructions that, when executed by one or more processors, cause:
executing a single data definition language (DDL) statement to define a plurality of subroutines for a guest programming language in a database management system (DBMS);
executing a second DDL statement to register a particular subroutine of the plurality of subroutines as a user defined function (UDF) or a stored procedure in the DBMS, wherein said second DDL statement to register the particular subroutine comprises a designation of a user account to switch to during later invocation of the particular subroutine; and
executing a data manipulation language (DML) statement to invoke the particular subroutine in the DBMS.

17. The one or more non-transitory computer-readable media of claim 16 wherein:
said single DDL statement to define the plurality of subroutines comprises a name of a new guest module;
said executing said single DDL statement to define the plurality of subroutines comprises:
generating the new guest module, and
binding, in a database dictionary of the DBMS, the name to the new guest module.

18. The one or more non-transitory computer-readable media of claim 16, wherein said second DDL statement to register the particular subroutine, at least one selected from the group consisting of an indication of idempotency and an indication of thread safety.

19. The one or more non-transitory computer-readable media of claim 16 wherein:
said second DDL statement to register the particular subroutine comprises for the particular subroutine, arguments directions including at least out;
the guest programming language does not natively support multiple arguments directions.

20. The one or more non-transitory computer-readable media of claim 16 wherein said register the particular subroutine comprises generating a mapping from argument types for the particular subroutine to datatypes that are native to said DML.

* * * * *

UNITED STATES PATENT AND TRADEMARK OFFICE
CERTIFICATE OF CORRECTION

PATENT NO. : 11,531,652 B2
APPLICATION NO. : 16/556847
DATED : December 20, 2022
INVENTOR(S) : Fender et al.

It is certified that error appears in the above-identified patent and that said Letters Patent is hereby corrected as shown below:

In the Specification

In Column 8, Line 11, delete "ava" and insert -- .java --, therefor.

In Column 8, Line 56, delete "(e,g," and insert -- (e.g., --, therefor.

In Column 13, Line 63, delete "string;"," and insert -- string)';", --, therefor.

In Column 14, Line 13, delete "e,g." and insert -- e.g., --, therefor.

In Column 27, Line 26, delete "computer" and insert -- Computer --, therefor.

In Column 28, Line 26, delete "require( )" and insert -- require( ). --, therefor.

In Column 35, Line 64, delete "square( )" and insert -- square( ), --, therefor.

In Column 36, Line 65, delete "di-vided" and insert -- divided --, therefor.

In Column 37, Line 18, delete "init.py" and insert -- init .py --, therefor.

In Column 37, Line 21, delete "init.py" and insert -- init .py --, therefor.

In Column 37, Line 27, delete "mod-ules" and insert -- modules --, therefor.

In Column 37, Line 36, delete "conjunc-tion" and insert -- conjunction --, therefor.

In Column 38, Lines 3-4, delete "oraclejmodule" and insert -- oracle.jmodule --, therefor.

In Column 38, Line 4, delete "oraclejmodule" and insert -- oracle.jmodule --, therefor.

Signed and Sealed this
First Day of August, 2023

Katherine Kelly Vidal
*Director of the United States Patent and Trademark Office*

CERTIFICATE OF CORRECTION (continued)
U.S. Pat. No. 11,531,652 B2

In Column 40, Line 28, delete "substituteworld" and insert -- substituteWorld --, therefor.

In Column 40, Line 36, delete "con-verted" and insert -- converted --, therefor.

In Column 41, Line 12, delete "JNVASCRIPT" and insert -- JAVASCRIPT --, therefor.

In Column 41, Line 42, delete "func2( )" and insert -- func2( ), --, therefor.

In Column 41, Line 59, delete "func2( )" and insert -- func2( ), --, therefor.

In Column 42, Lines 28-29, delete "scott. "hello"" and insert -- scott."hello" --, therefor.

In Column 42, Line 34, delete "execut-ed," and insert -- executed, --, therefor.

In Column 42, Line 59, delete "scott.print hello" and insert -- scott.print_hello --, therefor.

In Column 43, Line 36, delete "con-figured" and insert -- configured --, therefor.

In Column 44, Line 6, delete "map-pings" and insert -- mappings --, therefor.

In Column 44, Line 57, delete "builtins" and insert -- built-ins --, therefor.

In Column 45, Line 4, delete "j s. strict" and insert -- js.strict --, therefor.

In Column 45, Line 46, delete "com-mand," and insert -- command, --, therefor.

In Column 45, Line 60, delete "mod-ule" and insert -- module --, therefor.

In Column 46, Line 7, delete "ex-tended" and insert -- extended --, therefor.

In Column 49, Line 20, delete "CURRENT_USER" and insert -- CURRENT_USER. --, therefor.

In Column 50, Line 2, delete "<argument name>" and insert -- <argument_name> --, therefor.

In Column 56, Line 17, delete "DbaaS" and insert -- DBaaS --, therefor.

In the Claims

In Column 58, Line 56, in Claim 18, delete "16," and insert -- 16 --, therefor.